US011082364B2

(12) United States Patent
Pope et al.

(10) Patent No.: US 11,082,364 B2
(45) Date of Patent: Aug. 3, 2021

(54) NETWORK INTERFACE DEVICE

(71) Applicant: Xilinx, Inc., San Jose, CA (US)

(72) Inventors: Steven Leslie Pope, Cambridge (GB); Neil Turton, Cambridge (GB); David James Riddoch, Fenstanton (GB); Dmitri Kitariev, Newport Beach, CA (US); Ripduman Sohan, Washington, DC (US); Derek Edward Roberts, Cambridge (GB)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 16/395,027

(22) Filed: Apr. 25, 2019

(65) Prior Publication Data
US 2020/0344180 A1    Oct. 29, 2020

(51) Int. Cl.
| | |
|---|---|
| *H04L 12/947* | (2013.01) |
| *H04L 29/06* | (2006.01) |
| *G06F 9/24* | (2006.01) |
| *G06F 9/28* | (2006.01) |
| *G06F 9/30* | (2018.01) |
| *G06F 8/41* | (2018.01) |
| *H03K 19/177* | (2020.01) |

(52) U.S. Cl.
CPC ............ *H04L 49/25* (2013.01); *G06F 9/24* (2013.01); *G06F 9/28* (2013.01); *G06F 9/30018* (2013.01); *H03K 19/177* (2013.01); *H04L 69/162* (2013.01); *H04L 63/02* (2013.01)

(58) Field of Classification Search
CPC ....... H04L 49/25; H04L 69/162; H04L 63/02; G06F 9/30018; G06F 9/24; G06F 9/28; H03K 19/177
See application file for complete search history.

(56) References Cited

U.S. PATENT DOCUMENTS

| | | |
|---|---|---|
| 6,598,063 B1 | 7/2003 | Tang et al. |
| 7,376,125 B1 | 5/2008 | Hussain et al. |
| 7,382,787 B1 | 6/2008 | Barnes et al. |
| 7,861,067 B1 | 12/2010 | Chayut |
| 7,917,876 B1 | 3/2011 | Schumacher et al. |
| 8,181,024 B2 | 5/2012 | Nagai et al. |
| 9,450,945 B1 | 9/2016 | Koeten et al. |
| 9,860,258 B1 | 1/2018 | Collins et al. |
| 9,886,072 B1 | 2/2018 | Venkataraman |
| 9,940,284 B1 * | 4/2018 | Davis ................. G06F 13/4221 |
| 10,496,593 B1 | 12/2019 | Miller et al. |
| 10,516,626 B1 * | 12/2019 | Kodeboyina ........... H04L 45/74 |

(Continued)

FOREIGN PATENT DOCUMENTS

EP    2722767 A1    4/2014

OTHER PUBLICATIONS

PCT/EP2019/080281, dated Jan. 30, 2020, International Search Report and Written Opinion.

(Continued)

*Primary Examiner* — Harry H Kim
(74) *Attorney, Agent, or Firm* — Wolf, Greenfield & Sacks, P.C.

(57) ABSTRACT

A method comprises receiving at a compiler a bit file description and a program, said bit file description comprising a description of routing of a part of a circuit. The method comprises compiling the program using said bit file description to output a bit file for said program.

18 Claims, 21 Drawing Sheets

(56) References Cited

U.S. PATENT DOCUMENTS

| | | | |
|---|---|---|---|
| 10,755,024 B1* | 8/2020 | Chow | G06F 30/327 |
| 2001/0003834 A1 | 6/2001 | Shimonishi | |
| 2003/0023838 A1 | 1/2003 | Karim et al. | |
| 2005/0159181 A1 | 7/2005 | Gadgil et al. | |
| 2006/0117126 A1 | 6/2006 | Leung et al. | |
| 2007/0171839 A1 | 7/2007 | Sankala et al. | |
| 2007/0214302 A1 | 9/2007 | Kubo et al. | |
| 2010/0183011 A1 | 7/2010 | Chao | |
| 2010/0229137 A1* | 9/2010 | Liu | G06F 30/3312 716/113 |
| 2013/0044641 A1 | 2/2013 | Koponen et al. | |
| 2013/0179485 A1 | 7/2013 | Chapman et al. | |
| 2014/0310405 A1 | 10/2014 | Pope et al. | |
| 2014/0351526 A1 | 11/2014 | Peterson | |
| 2014/0351777 A1* | 11/2014 | Chang | G06F 30/398 716/111 |
| 2015/0131456 A1 | 5/2015 | Allmendinger et al. | |
| 2015/0199461 A1* | 7/2015 | Laisne | G06F 30/398 716/108 |
| 2015/0205324 A1 | 7/2015 | Havlir et al. | |
| 2016/0134588 A1 | 5/2016 | Falkowitz et al. | |
| 2016/0323216 A1 | 11/2016 | LeVasseur et al. | |
| 2017/0180273 A1 | 6/2017 | Daly et al. | |
| 2017/0337149 A1 | 11/2017 | Onuki et al. | |
| 2018/0219800 A1 | 8/2018 | Huynh et al. | |
| 2018/0365358 A1* | 12/2018 | Clemow | G06F 30/34 |
| 2019/0005239 A1* | 1/2019 | Park | G06F 21/563 |
| 2019/0347106 A1 | 11/2019 | Kadowaki et al. | |
| 2020/0076684 A1* | 3/2020 | Naveen | H04L 41/0806 |
| 2020/0104269 A1 | 4/2020 | Pope et al. | |
| 2020/0106668 A1 | 4/2020 | Pope et al. | |
| 2020/0145376 A1 | 5/2020 | Pope et al. | |

OTHER PUBLICATIONS

[No Author Listed], CBG-BSV Third-Party Bluespec Compiler. 14 pages. https://www.cl.cam.ac.uk/~djg11/wwwhpr/toy-bluespec-compiler.html [last accessed Apr. 25, 2019].

[No Author Listed], Empowering OVS with eBPF. 4 pages. https://ovsfall2018.sched.com/event/IO7j/empowering-ovs-with-ebpf [last accessed Apr. 25, 2019].

Bershad et al., Extensibility, Safety and Performance in the SPIN Operating System. Department of Computer Science and Engineering. University of Washington. 1995. 17 pages.

McCane et al., The BSD Packet Filter: A New Architecture for User-level Packet Capture. Preprint paper for 1993 Winter USENIX Conference. Dec. 19, 1992. 11 pages.

Mogul et al., The Packet Filter: An Efficient Mechanism for User-level Network Code. Department of Computer Science. Carnegie-Mellon University. Nov. 1987. 34 pages.

Tu et al., Bringing the Power of eBPF to Open vSwitch. Kernel. 2018. 11 pages.

International Search Report and Written Opinion for International Application No. PCT/EP2019/080281 dated Jan. 30, 2020.

Li et al., Clicknp: Highly flexible and high performance network processing with reconfigurable hardware. Proceedings of the 2016 ACM SIGCOMM Conference. Aug. 22, 2016:1-14.

Extended European Search Report for European Application No. EP 19200398.6 dated Jan. 16, 2020.

Gordon, Programmable hardware for high performance SDN. Optical Fiber Communication Conference, Optical Society of America. Mar. 22, 2015:3 pages.

\* cited by examiner

NETWORK INTERFACE DEVICE

FIELD

This application relates to network interface devices for performing a function with respect to data packets.

BACKGROUND

Network interface devices are known and are typically used to provide an interface between a computing device and a network. The network interface device can be configured to process data which is received from the network and/or process data which is to be put on the network.

SUMMARY

According to an aspect, there is provided a method comprising: receiving at a compiler a bit file description and a program, said bit file description comprising a description of routing of a part of a circuit; and compiling said program using said bit file description to output a bit file for said program.

The method may comprise using said bit file to configure at least a part of said part of said circuit to perform a function associated with said program.

The bit file description may comprise information about the routing between a plurality of processing units of said part of the circuit.

The bit file description may comprise for at least one of said plurality of processing units routing information indicating at least one of: to which one or more other processing units data can be output; and from which one or more other processing units data can be received.

The bit file description may comprise routing information indicating one or more routes between two or more respective processing units.

The bit file description may comprise information indicating only routes which are usable by the compiler when compiling the program to provide the bit file for the program.

The bit file may comprise information indicating for a respective processing unit, at least one of: from which one or more of said one or more other processing unit in the bit file description for the respective processing unit an input is to be provided; to which one or more of said one or more other processing units in the bit file description for the respective processing unit an output is to be provided.

The part of the circuit may comprise at least a part of a configurable hardware module comprising a plurality of processing units, each processing unit being associated with a predefined type of operation executable in a single step, at least some of said plurality of processing units being associated with different predefined types of operation, said bit file description comprising information about the routing between at least some of the plurality of processing units wherein said method may comprise using said bit file to cause the hardware to interconnect at least some of said plurality of said processing units to provide a first data processing pipeline for processing one or more of said plurality of data packets to perform a first function with respect to said one or more of said plurality of data packets.

The bit file description may be of at least a portion of an FPGA.

The bit file description may be of a portion of an FPGA which is dynamically programmable.

The program may comprise one of an eBPF program and a P4 program.

The compiler and the FPGA may be provided in a network interface device.

According to another aspect, there is provided an apparatus comprising at least one processor and at least one memory including computer code for one or more programs, the at least one memory and the computer code configured, with the at least one processor, to cause the apparatus at least to: receive a bit file description and a program, said bit file description comprising a description of routing of a part of a circuit; and compile said program using said bit file description to output a bit file for said program.

The at least one memory and the computer code may be configured, with the at least one processor, to cause the apparatus to use said bit file to configure at least a part of said part of said circuit to perform a function associated with said program.

The bit file description may comprise information about the routing between a plurality of processing units of said part of the circuit.

The bit file description may comprise for at least one of said plurality of processing units routing information indicating at least one of: to which one or more other processing units data can be output; and from which one or more other processing units data can be received.

The bit file description may comprise routing information indicating one or more routes between two or more respective processing units.

The bit file description may comprise information indicating only routes which are usable by the compiler when compiling the program to provide the bit file for the program.

The bit file may comprise information indicating for a respective processing unit, at least one of: from which one or more of said one or more other processing units in the bit file description for the respective processing unit an input is to be provided; to which one or more of said one or more other processing units in the bit file description for the respective processing unit an output is to be provided.

The part of the circuit may comprise at least a part of a configurable hardware module comprising a plurality of processing units, each processing unit being associated with a predefined type of operation executable in a single step, at least some of said plurality of processing units being associated with different predefined types of operation, said bit file description comprising information about the routing between at least some of the plurality of processing units, wherein the at least one memory and the computer code are configured, with the at least one processor, to cause the apparatus to use said bit file to cause the hardware to interconnect at least some of said plurality of said processing units to provide a first data processing pipeline for processing one or more of said plurality of data packets to perform a first function with respect to said one or more of said plurality of data packets.

The bit file description may be of at least a portion of the FPGA.

The bit file description may be of a portion of the FPGA which is dynamically programmable.

The program may comprise one of an eBPF program and a P4 program.

According to another aspect, there is provided a network interface device comprising: a first interface, the first interface being configured to receive a plurality of data packets; a configurable hardware module comprising a plurality of processing units, each processing unit being associated with a predefined type of operation executable in a single step; a compiler, said compiler configured to receive a bit file description and a program, said bit file description comprising a description of routing of at least a part of said configurable hardware module, and to compile said program using said bit file description to output a bit file for said program, wherein said hardware module is configurable using said bit file to perform a first function associated with the program.

The network interface device may be for interfacing a host device to a network.

At least some of said plurality of processing units may be associated with different predefined types of operation.

The hardware module may be configurable to interconnect at least some of said plurality of said processing units to provide a first data processing pipeline for processing one or more of said plurality of data packets to perform the first function with respect to said one or more of said plurality of data packets.

In some embodiments, the first function comprises a filtering function. In some embodiments, the function comprises at least one of a tunnelling, encapsulation, and routing function. In some embodiments, the first function comprises an extended Berkley packet filter function.

In some embodiments, the first function comprises a distributed denial of service scrubbing operation.

In some embodiments, the first function comprises a firewall operation.

In some embodiments, the first interface is configured to receive the first data packet from the network.

In some embodiments, the first interface is configured to receive the first data packet from the host device.

In some embodiments, two or more of the at least some of the plurality of processing units are configured to perform their associated at least one predefined operation in parallel.

In some embodiments, two or more of the at least some of the plurality of processing units are configured to perform their associated predefined type of operation according to a common clock signal of the hardware module.

In some embodiments, each of two or more of the at least some of the plurality of processing units is configured to perform its associated predefined type of operation within a predefined length of time defined by a clock signal.

In some embodiments, two or more of the at least some of the plurality of processing units are configured to: access the first data packet within a time period of the predefined length of time; and in response to the end of the predefined length of time, transfer results of the respective at least one operation to a next processing unit.

In some embodiments, the results comprise at least one or more of: at least value from the one or more of the plurality of data packets; updates to map state; and metadata.

In some embodiments, each of the plurality of processing units comprises an application specific integrated circuit configured to perform the at least one operation associated with the respective processing unit.

In some embodiments, each of the processing units comprises a field programmable gate array. In some embodiments, each of the processing units comprises any other type of soft logic.

In some embodiments, at least one of the of the plurality of processing units comprises a digital circuit and a memory storing state related to processing carried out by the digital circuit, wherein the digital circuit is configured to, in communication with the memory, perform the predefined type of operation associated with the respective processing unit.

In some embodiments, the network interface device comprises a memory accessible to two or more of the plurality of processing units, wherein the memory is configured to store state associated with a first data packet, wherein during performance of the first function by the hardware module, two or more of the plurality of processing units are configured to access and modify the state.

In some embodiments, a first of the at least some of the plurality of processing units is configured to stall during access of a value of the state by a second of the plurality of processing units.

In some embodiments, one or more of the plurality of processing units are individually configurable to, based on their associated predefined type of operation, perform an operation specific to a respective pipeline.

In some embodiments, the hardware module is configured to receive an instruction, and in response to said instruction, at least one of: interconnect at least some of said plurality of said processing units to provide a data processing pipeline for processing one or more of said plurality of data packets; cause one or more of said plurality of processing units to perform their associated predefined type of operation with respect to said one or more data packets; add one or more of said plurality of processing units into a data processing pipeline; and remove one or more of said plurality of processing units from a data processing pipeline.

In some embodiments, the predefined operation comprises at least one of: loading at least one value of the first data packet from a memory; storing at least one value of a data packet in a memory; and performing a look up into a look up table to determine an action to be carried out with respect to a data packet.

In some embodiments, the hardware module is configured to receive an instruction, wherein the hardware module is configurable to, in response to said instruction, interconnect at least some of said plurality of said processing units to provide a data processing pipeline for processing one or more of said plurality of data packets, wherein the instruction comprises a data packet sent through the third processing pipeline.

In some embodiments, one or more the at least some of the plurality of processing units are configurable to, in response to said instruction, perform a selected operation of their associated predefined type of operation with respect to said one or more of the plurality of data packets.

In some embodiments, the plurality of components comprises a second of the plurality of components configured to provide the first function in circuitry different to the hardware module, wherein the network interface device comprises at least one controller configured to cause data packets passing through the processing pipeline to be processed by one of: the first of the plurality of components and the second of the plurality of components.

In some embodiments, the network interface device comprises at least one controller configured to issue an instruction to cause the hardware module to begin performing the first function with respect to data packets, wherein the instruction is configured to cause the first of the plurality of components to be inserted into the processing pipeline.

In some embodiments, the network interface device comprises at least one controller configured to issue an instruction to cause the hardware module to begin performing the first function with respect to data packets, wherein the instruction comprises a control message sent through the processing pipeline and configured to cause the first of the plurality of components to be activated.

In some embodiments, for one or more of the at least some of the plurality of processing units, the associated at least one operation comprises at least one of: loading at least one value of the first data packet from a memory of the network interface device; storing at least one value of the first data packet in a memory of the network interface device; and performing a look up into a look up table to determine an action to be carried out with respect to the first data packet.

In some embodiments, one or more of the at least some of the plurality of processing units is configured to pass at least one result of its associated at least one predefined operation to a next processing unit in the first processing pipeline, the next processing unit being configured to perform a next predefined operation in dependence upon the at least one result.

In some embodiments, each of the different predefined types of operation is defined by a different template.

In some embodiments, wherein the types of predefined operation comprise at least one of: accessing a data packet; accessing a lookup table stored in a memory of the hardware module; performing logic operations on data loaded from a data packet; and performing logic operations on data loaded from the lookup table.

In some embodiments, the hardware module comprises routing hardware, wherein the hardware module is configurable to interconnect at least some of said plurality of said processing units to provide the first data processing pipeline by configuring the routing hardware to route data packets between the plurality of processing units in a particular order defined by the first data processing pipeline.

In some embodiments, the hardware module is configurable to interconnect at least some of said plurality of said processing units to provide a second data processing pipeline for processing one or more of said plurality of data packets to perform a second function different to the first function.

In some embodiments, the hardware module is configurable to interconnect at least some of said plurality of said processing units to provide a second data processing pipeline after interconnecting at least some of the plurality of said processing units to provide the first data processing pipeline.

In some embodiments, the network interface device comprises further circuitry separate to the hardware module and configured to perform the first function for one or more of said plurality of data packets.

In some embodiments, the further circuitry comprises at least one of: a field programmable gate array; and a plurality of central processing units.

In some embodiments, the network interface device comprises at least one controller, wherein the further circuitry is configured to perform the first function with respect to data packets during a compilation process for the first function to be performed in the hardware module, wherein the at least one controller is configured to, in response to completion of the compilation process, control the hardware module to begin performing the first function with respect to data packets.

In some embodiments, the further circuitry comprises a plurality of central processing units.

In some embodiments, the at least one controller is configured to, in response to said determination that the compilation process for the first function to be performed in the hardware module is complete, control the further circuitry to cease performing the first function with respect to data packets.

In some embodiments, the network interface device comprises at least one controller, wherein the hardware module is configured to perform the first function with respect to data packets during a compilation process for the first function to be performed in the further circuitry, wherein the at least one controller is configured to determine that the compilation process for the first function to be performed in the further circuitry is complete and, in response to said determination, control the further circuitry to begin performing the first function with respect to data packets.

In some embodiments, the further circuitry comprises a field programmable gate array.

In some embodiments, the at least one controller is configured to, in response to said determination that the compilation process for the first function to performed in the further circuitry is complete, control the hardware module to cease performing the first function with respect to data packets.

In some embodiments, the network interface device comprises at least one controller configured to perform a compilation process to provide the first function to be performed in the hardware module.

In some embodiments, the compilation process comprises providing instructions to provide a control plane interface in the hardware module that responds to control messages.

According to another aspect, there is provided a computer implemented method comprising: determining routing information for at least a part of a configurable hardware module comprising a plurality of processing units, each processing unit being associated with a predefined type of operation executable in a single step, at least some of said plurality of processing units are associated with different predefined types of operation, said routing information providing information as to available routes between at least a plurality of processing units.

The configurable hardware module may comprise a substantially static part and a substantially dynamic part, said determining comprising determining routing information for said substantially dynamic part.

The determining routing information for said substantially dynamic part may comprise determining routing in said substantially dynamic part which is used by one or more of the processing units in said substantially static part.

The determining may comprises analysing a bit file description of at least a part of said configurable hardware module to determine said routing information.

According to another aspect, there is provided a non-transitory computer readable medium comprising program instructions for: determining routing information for at least a part of a configurable hardware module comprising a plurality of processing units, each processing unit being associated with a predefined type of operation executable in a single step, at least some of said plurality of processing units are associated with different predefined types of operation, said routing information providing information as to available routes between at least a plurality of processing units.

According to another aspect, there is provided a network interface device for interfacing a host device to a network, the network interface device comprising: a first interface, the first interface being configured to receive a plurality of data packets; a configurable hardware module comprising a plurality of processing units, each processing unit being associated with a predefined type of operation executable in a single step, wherein at least some of said plurality of processing units are associated with different predefined types of operation, wherein the hardware module is configurable to interconnect at least some of said plurality of said processing units to provide a first data processing pipeline for processing one or more of said plurality of data packets to perform a first function with respect to said one or more of said plurality of data packets.

In some embodiments, the first function comprises a filtering function. In some embodiments, the function comprises at least one of a tunnelling, encapsulation, and routing function. In some embodiments, the first function comprises an extended Berkley packet filter function.

In some embodiments, the first function comprises a distributed denial of service scrubbing operation.

In some embodiments, the first function comprises a firewall operation.

In some embodiments, the first interface is configured to receive the first data packet from the network.

In some embodiments, the first interface is configured to receive the first data packet from the host device.

In some embodiments, two or more of the at least some of the plurality of processing units are configured to perform their associated at least one predefined operation in parallel.

In some embodiments, two or more of the at least some of the plurality of processing units are configured to perform their associated predefined type of operation according to a common clock signal of the hardware module.

In some embodiments, each of two or more of the at least some of the plurality of processing units is configured to perform its associated predefined type of operation within a predefined length of time defined by a clock signal.

In some embodiments, two or more of the at least some of the plurality of processing units are configured to: access the first data packet within a time period of the predefined length of time; and in response to the end of the predefined length of time, transfer results of the respective at least one operation to a next processing unit.

In some embodiments, the results comprise at least one or more of: at least value from the one or more of the plurality of data packets; updates to map state; and metadata.

In some embodiments, each of the plurality of processing units comprises an application specific integrated circuit configured to perform the at least one operation associated with the respective processing unit.

In some embodiments, each of the processing units comprises a field programmable gate array. In some embodiments, each of the processing units comprises any other type of soft logic.

In some embodiments, at least one of the of the plurality of processing units comprises a digital circuit and a memory storing state related to processing carried out by the digital circuit, wherein the digital circuit is configured to, in communication with the memory, perform the predefined type of operation associated with the respective processing unit.

In some embodiments, the network interface device comprises a memory accessible to two or more of the plurality of processing units, wherein the memory is configured to store state associated with a first data packet, wherein during performance of the first function by the hardware module, two or more of the plurality of processing units are configured to access and modify the state.

In some embodiments, a first of the at least some of the plurality of processing units is configured to stall during access of a value of the state by a second of the plurality of processing units.

In some embodiments, one or more of the plurality of processing units are individually configurable to, based on their associated predefined type of operation, perform an operation specific to a respective pipeline.

In some embodiments, the hardware module is configured to receive an instruction, and in response to said instruction, at least one of: interconnect at least some of said plurality of said processing units to provide a data processing pipeline for processing one or more of said plurality of data packets; cause one or more of said plurality of processing units to perform their associated predefined type of operation with respect to said one or more data packets; add one or more of said plurality of processing units into a data processing pipeline; and remove one or more of said plurality of processing units from a data processing pipeline.

In some embodiments, the predefined operation comprises at least one of: loading at least one value of the first data packet from a memory; storing at least one value of a data packet in a memory; and performing a look up into a look up table to determine an action to be carried out with respect to a data packet.

In some embodiments, the hardware module is configured to receive an instruction, wherein the hardware module is configurable to, in response to said instruction, interconnect at least some of said plurality of said processing units to provide a data processing pipeline for processing one or more of said plurality of data packets, wherein the instruction comprises a data packet sent through the third processing pipeline.

In some embodiments, one or more the at least some of the plurality of processing units are configurable to, in response to said instruction, perform a selected operation of their associated predefined type of operation with respect to said one or more of the plurality of data packets.

In some embodiments, the plurality of components comprises a second of the plurality of components configured to provide the first function in circuitry different to the hardware module, wherein the network interface device comprises at least one controller configured to cause data packets passing through the processing pipeline to be processed by one of: the first of the plurality of components and the second of the plurality of components.

In some embodiments, the network interface device comprises at least one controller configured to issue an instruction to cause the hardware module to begin performing the first function with respect to data packets, wherein the instruction is configured to cause the first of the plurality of components to be inserted into the processing pipeline.

In some embodiments, the network interface device comprises at least one controller configured to issue an instruction to cause the hardware module to begin performing the first function with respect to data packets, wherein the instruction comprises a control message sent through the processing pipeline and configured to cause the first of the plurality of components to be activated.

In some embodiments, for one or more of the at least some of the plurality of processing units, the associated at least one operation comprises at least one of: loading at least one value of the first data packet from a memory of the network interface device; storing at least one value of the first data packet in a memory of the network interface device; and performing a look up into a look up table to determine an action to be carried out with respect to the first data packet.

In some embodiments, one or more of the at least some of the plurality of processing units is configured to pass at least one result of its associated at least one predefined operation to a next processing unit in the first processing pipeline, the next processing unit being configured to perform a next predefined operation in dependence upon the at least one result.

In some embodiments, each of the different predefined types of operation is defined by a different template.

In some embodiments, wherein the types of predefined operation comprise at least one of: accessing a data packet; accessing a lookup table stored in a memory of the hardware module; performing logic operations on data loaded from a data packet; and performing logic operations on data loaded from the lookup table.

In some embodiments, the hardware module comprises routing hardware, wherein the hardware module is configurable to interconnect at least some of said plurality of said processing units to provide the first data processing pipeline by configuring the routing hardware to route data packets between the plurality of processing units in a particular order defined by the first data processing pipeline.

In some embodiments, the hardware module is configurable to interconnect at least some of said plurality of said processing units to provide a second data processing pipeline for processing one or more of said plurality of data packets to perform a second function different to the first function.

In some embodiments, the hardware module is configurable to interconnect at least some of said plurality of said processing units to provide a second data processing pipeline after interconnecting at least some of the plurality of said processing units to provide the first data processing pipeline.

In some embodiments, the network interface device comprises further circuitry separate to the hardware module and configured to perform the first function for one or more of said plurality of data packets.

In some embodiments, the further circuitry comprises at least one of: a field programmable gate array; and a plurality of central processing units.

In some embodiments, the network interface device comprises at least one controller, wherein the further circuitry is configured to perform the first function with respect to data packets during a compilation process for the first function to be performed in the hardware module, wherein the at least one controller is configured to, in response to completion of the compilation process, control the hardware module to begin performing the first function with respect to data packets.

In some embodiments, the further circuitry comprises a plurality of central processing units.

In some embodiments, the at least one controller is configured to, in response to said determination that the compilation process for the first function to be performed in the hardware module is complete, control the further circuitry to cease performing the first function with respect to data packets.

In some embodiments, the network interface device comprises at least one controller, wherein the hardware module is configured to perform the first function with respect to data packets during a compilation process for the first function to be performed in the further circuitry, wherein the at least one controller is configured to determine that the compilation process for the first function to be performed in the further circuitry is complete and, in response to said determination, control the further circuitry to begin performing the first function with respect to data packets.

In some embodiments, the further circuitry comprises a field programmable gate array.

In some embodiments, the at least one controller is configured to, in response to said determination that the compilation process for the first function to performed in the further circuitry is complete, control the hardware module to cease performing the first function with respect to data packets.

In some embodiments, the network interface device comprises at least one controller configured to perform a compilation process to provide the first function to be performed in the hardware module.

In some embodiments, the compilation process comprises providing instructions to provide a control plane interface in the hardware module that responds to control messages.

According to another aspect, there is provided a data processing system comprising the network interface device according to the first aspect and the host device and, wherein the data processing system comprises at least one controller configured to perform a compilation process to provide the first function to be performed in the hardware module.

In some embodiments, the at least one controller is provided by one or more of: the network interface device; and the host device.

In some embodiments, the compilation process is performed in response to a determination by the at least one controller that a computer program expressing the first function is safe for execution in kernel mode of the host device.

In some embodiments, the at least one controller is configured to perform the compilation process by assigning each of the at least some of the plurality of processing units to perform in a particular order of the first data processing pipeline, at least one operation from a plurality of operations expressed by a sequence of computer code instructions, wherein the plurality of operations provides the first function with respect to the one or more of the plurality of data packets.

In some embodiments, the at least one controller is configured to: prior to completion of the compilation process, send a first instruction to cause a further circuitry of the network interface device to perform the first function with respect to data packets; and send a second instruction to cause the hardware module to, following completion of the compilation process, begin performing the first function with respect to data packets.

According to another aspect, there is provided a method for implementation in a network interface device, the method comprising: receiving, at a first interface, a plurality of data packets; and configuring a hardware module to interconnect at least some of a plurality of processing units of the hardware module so as to provide a first data processing pipeline for processing one or more of said plurality of data packets to perform a first function with respect to said one or more of said plurality of data packets, wherein each processing unit is associated with a predefined type of operation executable in a single step, wherein at least some of said plurality of processing units are associated with different predefined types of operation.

According to another aspect, there is provided a non-transitory computer readable medium comprising program instructions for causing a network interface device to perform a method comprising: receiving, at a first interface, a plurality of data packets; and configuring a hardware module to interconnect at least some of a plurality of processing units of the hardware module so as to provide a first data processing pipeline for processing one or more of said plurality of data packets to perform a first function with respect to said one or more of said plurality of data packets, wherein each processing unit is associated with a predefined type of operation executable in a single step, wherein at least some of said plurality of processing units are associated with different predefined types of operation.

According to another aspect, there is provided a processing unit configured to: perform at least one predefined operation with respect to a first data packet received at a network interface device; be connected to a first further processing unit configured to perform a first further at least one predefined operation with respect to the first data packet; be connected to a second further processing unit configured to perform a second further at least one predefined operation with respect to the first data packet; receive from the first further processing unit, results of the first further at least one predefined operation; perform the at least one predefined operation in dependence upon the results of the first further at least one predefined operation; send results of the at least one predefined operation to the second further processing unit for processing in the second further at least one predefined operation.

In some embodiments, the processing unit is configured to receive a clock signal for timing the at least one predefined operation, wherein the processing unit is configured to perform the at least one predefined operation in at least one cycle of the clock signal.

In some embodiments, the processing unit is configured to perform the at least one predefined operation in a single cycle of the clock signal.

In some embodiments, the at least one predefined operation, the first further at least one predefined operation, and the second further at least one predefined operation form part of a function performed with respect to a first data packet received at the network interface device.

In some embodiments, the first data packet is received from a host device, wherein the network interface device is configured to interface the host device to a network.

In some embodiments, the first data packet is received from a network, wherein the network interface device is configured to interface a host device to the network.

In some embodiments, the function is a filtering function.

In some embodiments, the filtering function is an extended Berkley packet filter function.

In some embodiments, the processing unit comprises an application specific integrated circuit configured to perform the at least one predefined operation.

In some embodiments, the processing unit comprises: a digital circuit configured to perform the at least one predefined operation; and a memory storing state related to the at least one predefined operation carried.

In some embodiments, the processing unit configured to access a memory accessible to the first further processing unit and the second further processing unit, wherein the memory is configured to store state associated with the first data packet, wherein the at least one predefined operation comprises modifying the state stored in the memory.

In some embodiments, the processing unit is configured during a first clock cycle to read a value of said state from the memory and provide said value to the second further processing unit for modification by the second further processing unit, wherein the processing unit is configured during a second clock cycle following the first clock cycle to stall.

In some embodiments, the at least one predefined operation comprises at least one of: loading the first data packet from a memory of the network interface device; storing the first data packet in a memory of the network interface device; and performing a look up into a look up table to determine an action to be carried out with respect to the first data packet.

According to another aspect, there is provided a method implemented in a processing unit, the method comprising: performing at least one predefined operation with respect to a first data packet received at a network interface device; connecting to a first further processing unit configured to perform a first further at least one predefined operation with respect to the first data packet; connecting to a second further processing unit configured to perform a second further at least one predefined operation with respect to the first data packet; receiving from the first further processing unit, results of the first further at least one predefined operation; performing the at least one predefined operation in dependence upon the results of the first further at least one predefined operation; and sending results of the at least one predefined operation to the second further processing unit for processing in the second further at least one predefined operation.

According to another aspect, there is provided a computer readable non-transitory storage device storing instructions that, when executed by a processing unit, cause the processing unit to perform a method comprising: performing at least one predefined operation with respect to a first data packet received at a network interface device; connecting to a first further processing unit configured to perform a first further at least one predefined operation with respect to the first data packet; connecting to a second further processing unit configured to perform a second further at least one predefined operation with respect to the first data packet; receiving from the first further processing unit, results of the first further at least one predefined operation; performing the at least one predefined operation in dependence upon the results of the first further at least one predefined operation; and sending results of the at least one predefined operation to the second further processing unit for processing in the second further at least one predefined operation.

According to another aspect, there is provided a network interface device for interfacing a host device to a network, the network interface device comprising: at least one controller; a first interface, the first interface being configured to receive data packets; first circuitry configured to perform a first function with respect to data packets received at the first interface; and second circuitry, wherein the first circuitry is configured to perform the first function with respect to data packets received at the first interface during a compilation process for the first function to be performed in the second circuitry, wherein the at least one controller is configured to determine that the compilation process for the first function to performed in the second circuitry is complete and, in response to said determination, control the second circuitry to begin performing the first function with respect to data packets received at the first interface.

In some embodiments, the at least one controller is configured to, in response to said determination that the compilation process for the first function to performed in the second circuitry is complete, control the first circuitry to cease performing the first function with respect to data packets received at the first interface.

In some embodiments, the at least one controller is configured to, in response to said determination that the compilation process for the first function to performed in the second circuitry is complete: begin performing the first function with respect to data packets of a first data flow received at the first interface; and control the first circuitry to cease performing the first function with respect to data packets of the first data flow.

In some embodiments, the first circuitry comprises at least one central processing unit, wherein each of the at least one central processing unit is configured to perform the first function with respect to at least one data packet received at the first interface.

In some embodiments, the second circuitry comprises a field programmable gate array configured to begin performing the first function with respect to data packets received at the first interface.

In some embodiments, the second circuitry comprises a hardware module comprising a plurality of processing units, each processing unit being associated with at least one predefined operation, wherein the first interface is configured to receive a first data packet, wherein the hardware module is configured to, following the compilation process for the first function to performed in the second circuitry, cause at least some of the plurality of processing units to perform their associated at least one predefined operation in a particular order so as to perform a first function with respect to the first data packet.

In some embodiments, the first circuitry comprises a hardware module comprising a plurality of processing units, each processing unit being associated with at least one predefined operation, wherein the first interface is configured to receive a first data packet, wherein the hardware module is configured to, during the compilation process for the first function to be performed in the second circuitry, cause at least some of the plurality of processing units to perform their associated at least one predefined operation in a particular order so as to perform a first function with respect to the first data packet.

In some embodiments, the at least one controller is configured to, perform the compilation process for compiling the first function to be performed by the second circuitry.

In some embodiments, the at least one controller is configured to: prior to completion of the compilation process, instruct the first circuitry to perform the first function with respect to data packets received at the first interface.

In some embodiments, the compilation process for compiling the first function to be performed by the second circuitry is performed by the host device, wherein the at least one controller is configured to determine that the compilation process has been completed in response to receiving an indication of the completion of the compilation process from the host device.

In some embodiments, comprising: a processing pipeline for processing data packets received at the first interface, wherein the processing pipeline comprises a plurality of components each configured to perform one of a plurality of functions with respect to data packets received at the first interface, wherein a first of the plurality of components is configured to provide the first function when provided by the first circuitry, wherein a second of the plurality of components is configured to provide the first function when provided by the second at least one processing unit.

In some embodiments, the at least one controller is configured to control the second circuitry to begin performing the first function with respect to data packets received at the first interface by inserting the second of the plurality of components into the processing pipeline.

In some embodiments, the at least one controller is configured to, in response to said determination that the compilation process for the first function to performed in the second circuitry is complete, control the first circuitry to cease performing the first function with respect to data packets received at the first interface by removing the first of the plurality of components from the processing pipeline.

In some embodiments, the at least one controller is configured to control the second circuitry to begin performing the first function with respect to data packets received at the first interface by sending a control message through the processing pipeline to activate the second of the plurality of components.

In some embodiments, the at least one controller is configured to, in response to said determination that the compilation process for the first function to performed in the second circuitry is complete, control the first circuitry to cease performing the first function with respect to data packets received at the first interface by sending a control message through the processing pipeline to deactivate the second of the plurality of components.

In some embodiments, the first of the plurality of components is configured to provide the first function with respect to data packets a first data flow passing through the processing pipeline, wherein the second of the plurality of components is configured to provide the first function with respect to data packets of a second data flow passing through the processing pipeline.

In some embodiments, the first function comprises filtering data packets.

In some embodiments, the first interface is configured to receive the data packets from the network.

In some embodiments, the first interface is configured to receive the data packets from the host device.

In some embodiments, a compilation time of the first function for the second circuitry is greater than a compilation time of the first function for the first circuitry.

According to another aspect, there is provided a method comprising: receiving data packets at a first interface of the network interface device; performing in first circuitry of the network interface device, a first function with respect to data packets received at the first interface; and wherein the first circuitry is configured to perform the first function with respect to data packets received at the first interface during a compilation process for the first function to be performed in the second circuitry, the method comprising: determining that the compilation process for the first function to performed in the second circuitry is complete; and in response to said determination, controlling second circuitry of the network interface device to begin performing the first function with respect to data packets received at the first interface.

According to another aspect, there is provided a non-transitory computer readable medium comprising program instructions for causing a data processing system to perform a method comprising: receiving data packets at a first interface of the network interface device; performing in first circuitry of the network interface device, a first function with respect to data packets received at the first interface, wherein the first circuitry is configured to perform the first function with respect to data packets received at the first interface during a compilation process for the first function to be performed in the second circuitry, the method comprising: determining that the compilation process for the first function to performed in the second circuitry is complete; and in response to said determination, controlling second circuitry of the network interface device to begin performing the first function with respect to data packets received at the first interface.

According to another aspect, there is provided a non-transitory computer readable medium comprising program instructions for causing a data processing system to perform the following: performing a compilation process to compile a first function to be performed by a second circuitry of a network interface device; prior to completion of the compilation process, sending a first instruction to cause a first circuitry of the network interface device to perform the first function with respect to data packets received at a first interface of the network interface device; and sending a second instruction to cause the second circuitry to, following completion of the compilation process, begin performing the first function with respect to data packets received at the first interface.

In some embodiments, the non-transitory computer readable medium comprises program instructions for causing a data processing system to perform a further compilation process to compile the first function to be performed by the first circuitry, wherein the time taken for the compilation process is longer than the time taken for the further compilation process.

In some embodiments, the data processing system comprises a host device, wherein the network interface device is configured to interface the host device with a network.

In some embodiments, the data comprising system comprises the network interface device, wherein the network interface device is configured to interface a host device with a network.

In some embodiments, the data processing system comprises a host device and the network interface device, wherein the network interface device is configured to interface the host device with a network.

In some embodiments, the first function comprises filtering data packets received at the first interface from a network.

In some embodiments, the non-transitory computer readable medium comprises comprising program instructions for causing the data processing system to perform the following: sending a third instruction to cause the first circuitry to, following completion of the compilation process, cease performing the function with respect to data packets received at the first interface.

In some embodiments, the non-transitory computer readable medium comprises program instructions for causing the data processing system to perform the following: sending an instruction to cause the second circuitry to perform the first function with respect to data packets of a first data flow; and sending an instruction to cause the first circuitry to cease performing the first function with respect to data packets of the first data flow.

In some embodiments, the first circuitry comprises at least one central processing unit, wherein prior to completion of the second compilation process, each of the at least one central processing units is configured to perform the first function with respect to at least one data packet received at the first interface.

In some embodiments, the second circuitry comprises a field programmable gate array configured to begin performing the first function with respect to data packets received at the first interface.

In some embodiments, the second circuitry comprises a hardware module comprising a plurality of processing units, each processing unit being associated with at least one predefined operation, wherein the data packets received at the first interface comprise a first data packet, wherein the hardware module is configured to, following completion of the second compilation process, perform the first function with respect to the first data packet by each processing unit at least some of the plurality of processing units performing its respective at least one operation with respect to the first data packet.

In some embodiments, the first circuitry comprises a hardware module comprising a plurality of processing units configured to provide the first function with respect to a data packet, each processing unit being associated with at least one predefined operation. wherein the data packets received at the first interface comprise a first data packet, wherein the hardware module is configured to, prior to completion of the second compilation process, perform the first function with respect to the first data packet by each processing unit of at least some of the plurality of processing units performing its respective at least one operation with respect to the first data packet.

In some embodiments, the compilation process comprises assigning each of a plurality of processing units of the second circuitry to perform, in a particular order, at least one operation associated with one of a plurality of processing stages in a sequence of computer code instructions.

In some embodiments, the first function provided by the first circuitry is provided as a component of a processing pipeline for processing data packets received at the first interface, wherein the first function provided by the second circuitry is provided as a component of the processing pipeline.

In some embodiments, the first instruction comprises an instruction configured to cause the first of the plurality of components to be inserted into the processing pipeline.

In some embodiments, the second instruction comprises an instruction configured to cause the second of the plurality of components to be inserted into the processing pipeline.

In some embodiments, the non-transitory computer readable medium comprises comprising program instructions for causing the data processing system to perform the following: sending a third instruction to cause the first circuitry to, following completion of the compilation process, cease performing the first function with respect to data packets received at the first interface, wherein the third instruction comprises an instruction configured to cause the first of the plurality of components to be removed from the processing pipeline.

In some embodiments, the first instruction comprises a control message to be sent through the processing pipeline to activate the second of the plurality of components.

In some embodiments, the second instruction comprises a control message to be sent through the processing pipeline to activate the second of the plurality of components.

In some embodiments, the non-transitory computer readable medium comprises program instructions for causing the data processing system to perform the following: sending a third instruction to cause the first circuitry to, following completion of the compilation process, cease performing the function with respect to data packets received at the first interface, wherein the third instruction comprises a control message through the processing pipeline to deactivate the first of the plurality of components.

According to another aspect, there is provided a data processing system comprising at least one processor and at least one memory including computer program code, wherein the at least one memory and the computer program code are configured, with the at least one processor, to cause the data processing system to: perform a compilation process to compile a function to be performed by a second circuitry of a network interface device; prior to completion of the compilation process, instructing a first circuitry of the network interface device to perform the function with respect to data packets received at a first interface of a network interface device; and instructing the second at least one processing unit to, following completion of the second compilation process, begin performing the function with respect to data packets received at the first interface.

According to another aspect, there is provided a method for implementation in a data processing system, the method comprising: performing a compilation process to compile a function to be performed by a second circuitry of a network interface device; prior to completion of the compilation process, sending a first instruction to cause a first circuitry of the network interface device to perform the function with respect to data packets received at a first interface of the network interface device; and sending a second instruction to cause the second circuitry to, following completion of the compilation process, begin performing the function with respect to data packets received at the first interface.

According to another aspect, there is provided a non-transitory computer readable medium comprising program instructions for causing a data processing system to assign each of a plurality of processing units to perform, in a particular order, at least one operation associated with one of a plurality of processing stages in a sequence of computer code instructions, wherein the plurality of processing stages provides a first function with respect to a first data packet received at a first interface of a network interface device, wherein each of the plurality of processing units is configured to perform one of a plurality of types of processing, wherein at least some of the plurality of processing units are configured to perform different types of processing, wherein for each of the plurality of processing units, the assigning is performed in dependence upon determining that the processing unit is configured to perform a type of processing suitable for performing the respective at least one operation.

In some embodiments, each of the types of processing is defined by one of a plurality of templates.

In some embodiments, the types of processing include at least one of: accessing a data packet received at the network interface device; accessing a lookup table stored in a memory of the hardware module; performing logic operations on data loaded from the data packet; and performing logic operations on data loaded from the look table.

In some embodiments, two or more of the at least some of the plurality of processing units are configured to perform their associated at least one operation according to a common clock signal of the hardware module.

In some embodiments, the assigning comprises assigning each of two or more of the at least some of the plurality of processing units to perform its associated at least one operation within a predefined length of time defined by a clock signal.

In some embodiments, the assigning comprises assigning two or more of the at least some of the plurality of processing units to access the first data packet within a time period of the predefined length of time.

In some embodiments, the assigning comprises assigning each of the two or more of the at least some of the plurality of processing units to, in response to the end of a time period of the predefined length of time, transfer results of the respective at least one operation to a next processing unit.

In some embodiments, the non-transitory computer readable medium comprises program instructions for causing the data processing system to perform the following: assigning at least some of the plurality of stages to occupy a single clock cycle.

In some embodiments, the non-transitory computer readable medium comprises program instructions for causing the data processing system to assign two or more of the plurality of processing units to execute their assigned at least one operation to be executed in parallel.

In some embodiments, the network interface device comprises a hardware module comprising the plurality of processing units.

In some embodiments, the non-transitory computer readable medium comprises computer program instructions for causing the data processing system to perform the following: performing a compilation process comprising the assigning; prior to completion of the compilation process, sending a first instruction to cause a circuitry of the network interface device to perform the first function with respect to data packets received at the first interface; and sending a second instruction to cause the plurality of processing units to, following completion of the compilation process, begin performing the first function with respect to data packets received at the first interface.

In some embodiments, the non-transitory computer readable medium comprises, for one or more of the at least some of the plurality of processing units, the assigned at least one operation comprises at least one of: loading at least one value of the first data packet from a memory of the network interface device; storing at least one value of the first data packet in a memory of the network interface device; and performing a look up into a look up table to determine an action to be carried out with respect to the first data packet.

In some embodiments, the non-transitory computer readable medium comprises computer program instructions for causing the data processing system to issue an instruction to configure routing hardware of the network interface device to route the first data packet between the plurality of processing units in the particular order so as to perform the first function with respect to the first data packet.

In some embodiments, the first function provided by the plurality of processing units is provided as a component of a processing pipeline for processing data packets received at the first interface.

In some embodiments, the non-transitory computer readable medium comprises computer program instructions for causing the plurality of processing units to begin performing the first function with respect to data packets received at the first interface by causing the data processing system to issue an instruction to cause the component to be inserted into the processing pipeline.

In some embodiments, the non-transitory computer readable medium comprises computer program instructions for causing the plurality of processing units to begin performing the first function with respect to data packets received at the first interface by causing the data processing system to issue an instruction to cause the component to be activated in the processing pipeline.

In some embodiments, the data processing system comprises a host device, wherein the network interface device is configured to interface the host device with a network.

In some embodiments, the data processing system comprises the network interface device.

In some embodiments, the data processing system comprises: the network interface device; and a host device, wherein the network interface device is configured to interface the host device with a network.

According to another aspect, there is provided a data processing system comprising at least one processor and at least one memory comprising computer program code, wherein the at least one memory and the computer program code are configured, with the at least one processor, to cause the data processing system to assign each of a plurality of processing units to perform, in a particular order, at least one operation associated with one of a plurality of processing stages in a sequence of computer code instructions, wherein the plurality of processing stages provides a first function with respect to a first data packet received at a first interface of a network interface device, wherein each of the plurality of processing units is configured to perform one of a plurality of types of processing, wherein at least some of the plurality of processing units are configured to perform different types of processing, wherein for each of the plurality of processing units, the assigning is performed in dependence upon determining that the processing unit is configured to perform a type of processing suitable for performing the respective at least one operation.

According to another aspect, there is provided a method comprising assigning each of a plurality of processing units to perform, in a particular order, at least one operation associated with one of a plurality of processing stages in a sequence of computer code instructions, wherein the plurality of processing stages provides a first function with respect to a first data packet received at a first interface of a network interface device, wherein each of the plurality of processing units is configured to perform one of a plurality of types of processing, wherein at least some of the plurality of processing units are configured to perform different types of processing, wherein for each of the plurality of processing units, the assigning is performed in dependence upon determining that the processing unit is configured to perform a type of processing suitable for performing the respective at least one operation.

The processing units of the hardware module have been described as executing their type of operation in a single step. However, the skilled person would recognise that this feature is a preferred feature only and it not essential or indispensable for the function of the invention.

BRIEF DESCRIPTION OF FIGURES

Some embodiments will now be described by way of example only with reference to the accompanying figures in which.

DETAILED DESCRIPTION

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

When data is to be transferred between two data processing systems over a data channel, such as a network, each of the data processing systems has a suitable network interface to allow it to communicate across the channel. Often the network is based on Ethernet technology. Data processing systems that are to communicate over a network are equipped with network interfaces that are capable of supporting the physical and logical requirements of the network protocol. The physical hardware component of network interfaces are referred to as network interface devices or network interface cards (NICs).

Most computer systems include an operating system (OS) through which user level applications communicate with the network. A portion of the operating system, known as the kernel, includes a protocol stack for translating commands and data between the applications and a device driver specific to the network interface device. The device driver may directly control the network interface device. By providing these functions in the operating system kernel, the complexities of and differences among network interface device can be hidden from the user level application. The network hardware and other system resources (such as memory) may be safely shared by many applications and the system can be secured against faulty or malicious applications.

Figure 1:
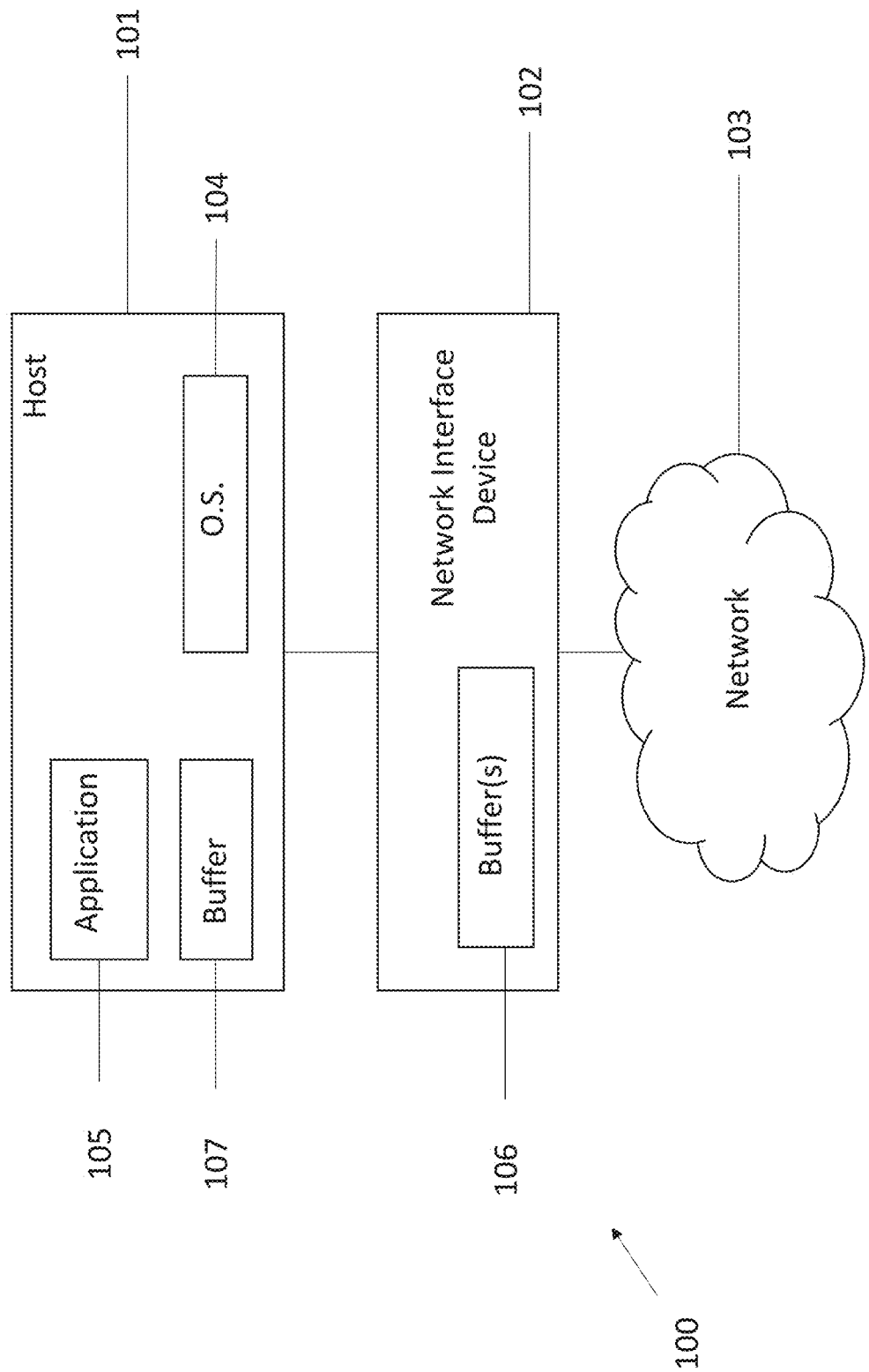
FIG. 1 shows a schematic view of a data processing system coupled to a network.

A typical data processing system 100 for carrying out transmission across a network is shown in FIG. 1. The data processing system 100 comprises a host computing device 101 coupled to a network interface device 102 that is arranged to interface the host to network 103. The host computing device 101 includes an operating system 104 supporting one or more user level applications 105. The host computing device 101 may also include a network protocol stack (not shown). For example, the protocol stack may be a component of the application, a library with which the application is linked, or be provided by the operating system. In some embodiments, more than one protocol stack may be provided.

The network protocol stack may be a Transmission Control Protocol (TCP) stack. The application 105 can send and receive TCP/IP messages by opening a socket and reading and writing data to and from the socket, and the operating system 104 causes the messages to be transported across the network. For example, the application can invoke a system call (syscall) for transmission of data through the socket and then via the operating system 104 to the network 103. This interface for transmitting messages may be known as the message passing interface.

Instead of implementing the stack in the host 101, some systems offload the protocol stack to the network interface device 102. For example, in the case that the stack is a TCP stack, the network interface device 102 may comprise a TCP Offload Engine (TOE) for performing the TCP protocol processing. By performing the protocol processing in the network interface device 102 instead of in the host computing device 101, the demand on the host system's 101 processor/s may be reduced. Data to be transmitting over the network, may be sent by an application 105 via a TOE-enabled virtual interface driver, by-passing the kernel TCP/IP stack in part or entirely. Data sent along this fast path therefore need only be formatted to meet the requirements of the TOE driver.

The host computing device 101 may comprise one or more processors and one or more memories. In some embodiments, the host computing device 101 and the network interface device 102 may communicate via a bus, for example a peripheral component interconnect express (PCIe bus).

During operation of the data processing system, data to be transmitted onto the network may be transferred from the host computing device 101 to the network interface device 102 for transmission. In one example, data packets may be transferred from the host to the network interface device directly by the host processor. The host may provide data to one or more buffers 106 located on the network interface device 102. The network interface device 102 may then prepare the data packets and transmit them over the network 103.

Alternatively, the data may be written to a buffer 107 in the host system 101. The data may then be retrieved from the buffer 107 by the network interface device and transmitted over the network 103.

In both of these cases, data is temporarily stored in one or more buffers prior to transmission over the network. Data sent over the network could be returned to the host (in a lookback).

When data packets are sent and received from over a network 103, there are many processing tasks that can be expressed as operations on a data packet either on a data packet to be transmitted over the network or on a data packet received from over the network. For example, filtering processes may be carried out on received data packets so as to protect the host system 101 from distributed denial of service (DDOS) filtering. Such filtering processes may be carried out by a simple pack examination or an extended Berkley packet filter (eBPF). As another example, encapsulation and forwarding may be carried out for data packets to be transmitted over the network 103. These processes may consume many CPU cycles and be burdensome for the conventional OS architecture.

Figure 2:
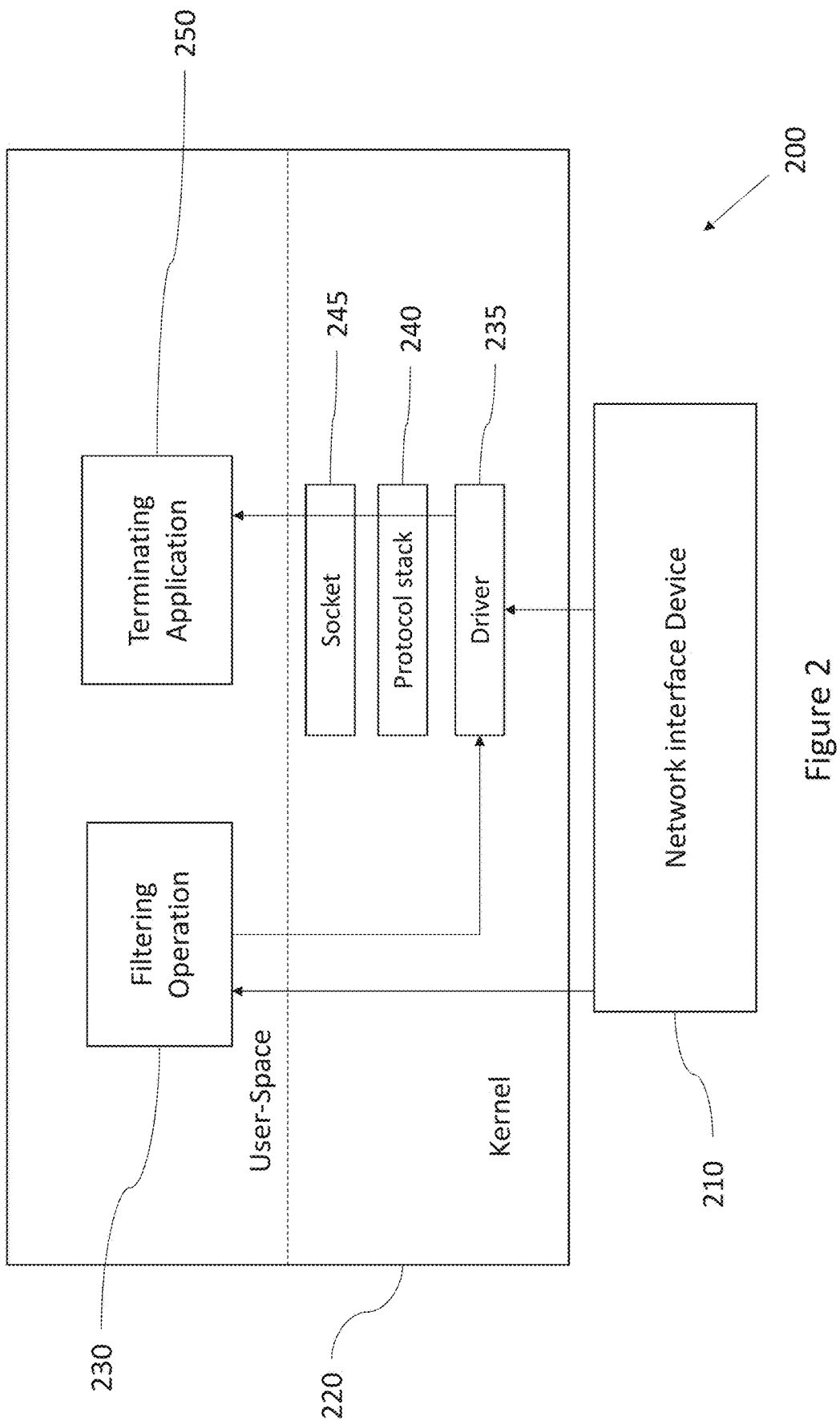
FIG. 2 shows a schematic view of a data processing system comprising a filtering operation application configured to run in user mode on a host computing device.

Reference is made to FIG. 2, which illustrates one way in which a filtering operation or other packet processing operation may be implemented in a host system 220. The processes performed by the host system 220 are shown as being performed either in user space or kernel space. A receive path for delivering data packets received from a network at the network interface device 210 to a terminating application 250 is present in kernel space. This receive path comprises a driver 235, a protocol stack 240, and a socket 245. The filtering operation 230 is implemented in user space. The incoming packets that are provided by the network interface device 210 to the host system 220 bypass the kernel (where protocol processing takes place) and are provided directly to the filtering operation 230.

The filtering operation 230 is provided with a virtual interface (which may be an ether fabric virtual interface (EFVI) or data plane development kit (DPDK) or any other suitable interface) for exchanging the data packets with other elements in the host system 220. The filtering operation 230 may perform DDOS scrubbing and/or other forms of filtering. A DDOS scrubbing process may execute on all packets which are easily recognized as DDOS candidates—for example, a sample packet, a copy of a packet, and packets which have not yet been categorized. The packets not delivered to the filtering operation 230 may be passed from the network interface to the driver 235 directly. The operation 230 may provide an extended Berkeley packet filter (eBPF) for performing the filtering. If the received packets pass the filtering provided by operation 230, the operation 230 is configured to re-inject the packets into the receive path in the kernel for processing received packets. Specifically, the packets are provided to the driver 235 or stack 240. The packets are then protocol processed by the protocol stack 240. The packets are then passed to the socket 245 associated with the terminating application 250. The terminating application 250 issues a recv( ) call to retrieve the data packets from a buffer of the associated socket.

There are, however, several issues with this approach. Firstly, the filtering operation 230 runs on the host CPU. In order to run the filtering 230, the host CPU must process the data packets at the rate at which they are received from the network. In cases, where the rate at which data is sent and received from the network is high, this can constitute a large drain on the processing resources of the host CPU. A high data flow rate to the filtering operation 230 may result in heavy consumption of other limited resources—such as I/O bandwidth and internal memory/cache bandwidth.

In the order to perform the re-injection of the data packets into the kernel, it is necessary to provide the filtering operation 230 with a privileged API for performing the re-injection. The re-injection process may be cumbersome requiring attention to packet ordering. In order to perform the re-injection, the operation 230 may in many cases require a dedicated CPU core.

The steps of providing the data to the operation and re-injecting require the data to be copied into and out of memory. This copying is a resource burden on the system.

Similar problems may occur when providing other types of operations other than filtering on data to be sent/received from over the network.

Some operations (such as DPDK type operations) may require the forwarding of processed packets back onto the network.

Figure 3:
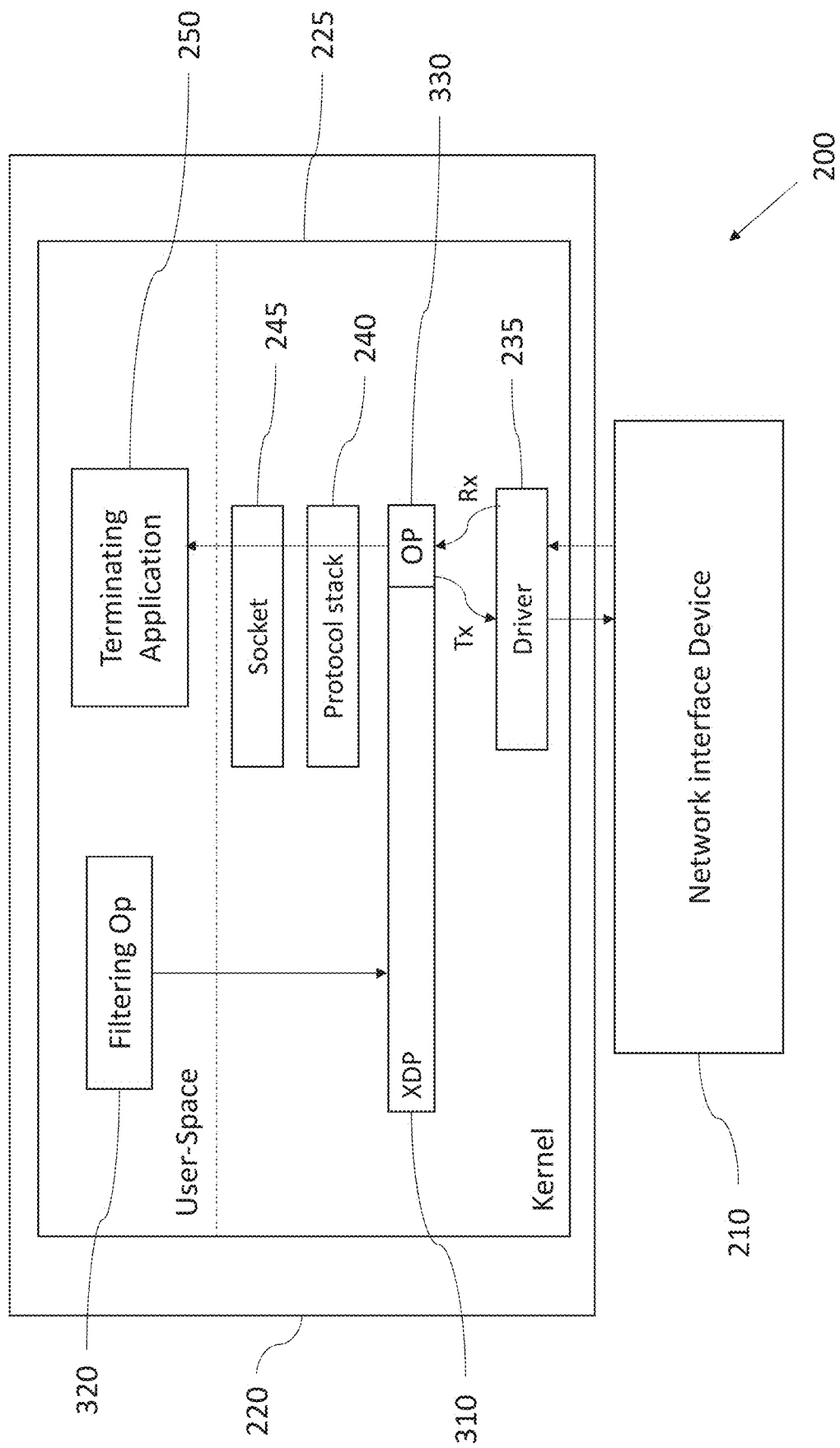
FIG. 3 shows a schematic view of a data processing system comprising a filtering operation configured to run in kernel mode on a host computing device.

Reference is made to FIG. 3, which illustrates another approach. Like elements are referred to with like reference numerals. In this example, an additional layer, known as the express data path (XDP) 310 is inserted into the transmit and receive path in the kernel. An extension to XDP 310 allows insertion into the transmit path. XDP helpers allow packets to be transmitted (as a result of a receive operation). The XDP 310 is inserted at the driver level of the operating system and allows for programs to be executed at this level so as to perform operations on the data packets received from the network prior to them being protocol processed by stack 240. The XDP 310 also allows for programs to be executed at this level so as to perform operations on data packets to be sent over the network. eBPF programs and other programs can, therefore, operate in the transmit and receive paths.

As it illustrated in FIG. 3, the filtering operation 320 may be inserted from user space into the XDP to form a program 330 that is part of the XDP 310. The operation 320 is inserted using the XDP control plane that is to be executed on the data receive path to provide a program 330 which performs the filtering operations (e.g. DDOS scrubbing) for packets on the receive path. Such a program 330 may be an eBPF program.

The program 330 is shown inserted into the kernel between the driver 235 and the protocol stack 240. However, in other examples, the program 330 may be inserted at other points in the receive path in the kernel. The program 330 may be part of a separate control path that receives data packets. The program 330 may be provided by an application by providing extensions to an application programming interface (API) of the socket 245 for that application.

This program 330 may additionally or alternatively perform one or more operations on data being sent over the transmit path. The XDP 310 then invokes the driver's 235 transmit function to send data over the network via the network interface device 210. The program 330 in this case may provide a load balancing or routing operation with respect to data packets to be sent over the network. The program 330 may provide a segment re-encapsulation and forwarding operation with respect to data packets to be sent over the network The program 330 may be used for firewalling and virtual switching or other operations not requiring protocol termination or application processing.

One advantage of the use of the XDP 310 in this way, is that the program 330 can directly access the memory buffers handled by the driver without intermediate copies.

In order to insert the program 330 for operation in the kernel in this way, it is necessary to ensure that the program 330 is safe. If an unsafe program is inserted into the kernel, this presents certain risks, such as: infinite loops that could crash the kernel; buffer overflows, uninitialized variables, compiler errors, performance issues caused by large programs.

In order to ensure that the program 330 is safe prior to insertion into the XDP 310 in this way, a verifier may run on the host system 220 to verify the safety of the program 330. The verifier may be configured to ensure that no loops exists. Backward jump operations may be permitted provided they do not cause loops. The verifier may be configured to ensure that the program 330 has no more than a predefined number (e.g. 4000) instructions. The verifier may perform checks on the validity of register usage by traversing through data paths of the program 330. If there are too many possible paths, the program 330 will be rejected as being unsafe to run in kernel mode. For example if there are more than 1000 branches, the program 330 may be rejected.

It would be appreciated by the skilled person that XDP is one example by which a safe program 330 may be installed in the kernel, and that there are other ways in which this could be accomplished.

The approach discussed above with respect to FIG. 3 may be as efficient as the approach discussed above with respect to FIG. 2 if, for example, the operation can be expressed in a safe (or sandboxed) language required for executing code in the kernel. The eBPF language can be executed efficiently on an x86 processor and JIT (Just in Time) compilation techniques enable eBPF programs to be compiled to native machine code. The language is designed to be safe, e.g. state is limited to map only constructs which are shared data structures (such as a hash table). There is limited looping allowed, instead one eBPF program is allowed to tail-call another. The state space is constrained.

However, in some implementations, with this approach there may be a large drain on the resources (e.g. I/O bandwidth and internal memory/cache bandwidth, Host CPU) of the host system 220. The operations on the data packets are still being performed by the Host CPU, which is required to perform such operations at the rate at which the data is being sent/received.

Another proposal is to perform the above discussed operations in the network interface device instead of in the host system. Doing so may free up the CPU cycles used by the host CPU when executing the operations in addition to the I/O bandwidth, memory and cache bandwidth consumed. Moving execution of the processing operation from the host to hardware of the network interface device may present some challenges.

One proposal to implement the processing in the network hardware is to provide in the network interface device a network processing unit (NPU) comprising a plurality of CPUs, which are specialized for packet processing and/or manipulation operations.

Figure 4:
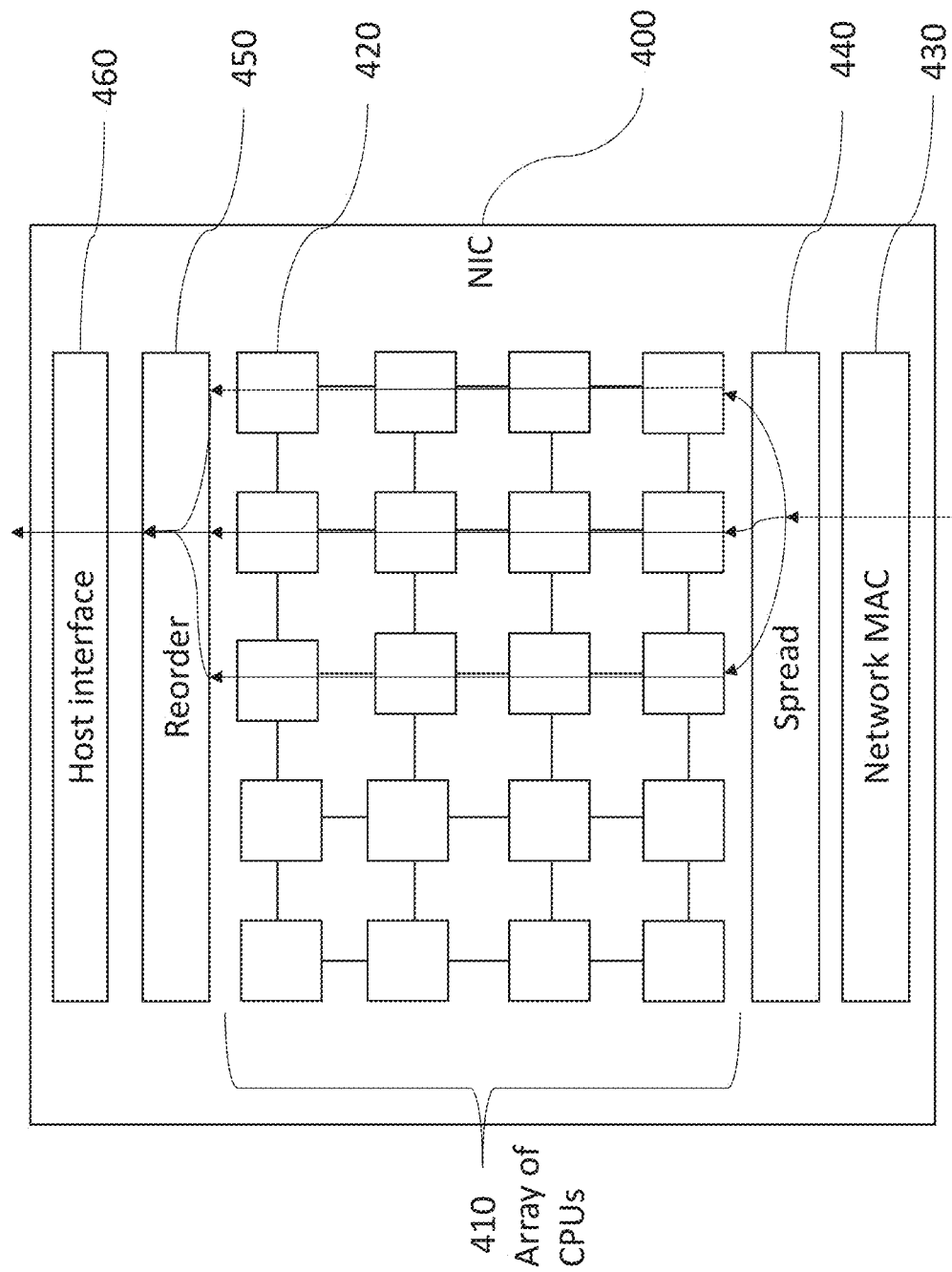
FIG. 4 shows a schematic view of a network interface device comprising a plurality of CPUs for performing a function with respect to data packets.

Reference is made to FIG. 4, which illustrates an example of a network interface device 400 comprising an array 410 of central processing units (CPUs), e.g. CPU 420. The CPUs are configured to perform functions, such as filtering data packets sent and received from the network. Each CPU of the array 410 of CPUs may be an NPU. Although not shown in FIG. 4, the CPUs may additionally or alternatively be configured to perform operations, such as load-balancing on data packets received from the host for transmission over the network. These CPUs are specialized for such packet processing/manipulation operations. The CPUs execute an instruction set which is optimized for such packet processing/manipulation operations.

The network interface device 400 additionally comprises memory (not shown) that is shared amongst and accessible to the array 410 of CPUs.

The network interface device 400 comprises a network medium access control (MAC) layer 430 for interfacing the network interface device 400 with the network. The MAC layer 430 is configured to receive data packets from over the network and send data packets over the network.

The operations on packets received at the network interface device 400 are parallelized over the CPUs. As shown, when a data flow is received at the MAC layer 430, it is passed to a spread function 440, which is configured to extract data packets from a flow and distribute them over a plurality of CPUs in the NPU 410 for the CPUs to perform processing, e.g. filtering, of these data packets. The spread function 440 may parse the received data packets so as to identify the data flows to which they belong. The spread function 440 generates for each packet, an indication of the respective packet's position in the data flow to which it belongs. The indications may, for example, be tags. The spread function 440 adds the respective indication to each packet's associated metadata. The associated metadata for each data packet may be appended to the data packet. The associated metadata could be passed to the spread function 440 as side-band control information. The indication is added in dependence upon the flow to which the data packet belongs, such that the order of data packets for any particular flow may be reconstructed.

After programming by the plurality of CPUs 410, the data packets are then passed to a re-order function 450, which re-orders the packets of the data flow into their correct order before passing them to the host interface layer 460. The re-order function 450 may re-order the data packets within a flow by comparing the indications (e.g. tags) within the data packets of the flow to reconstruct the order of the data packets. The re-ordered data packets then traverse the host interface 460 and are delivered to the host system 220.

Although FIG. 4 illustrates the array 410 of CPUs operating only on data packets received from the network, similar principles (including spreading and re-ordering) may be performed on data packets received from the host for transmission over the network, with the array 410 of CPUs performing functions (e.g. load balancing) on these data packets received from the host.

The program that is executed by the CPUs may be a compiled or transcoded version of the program that would execute on the host CPU in the example described above with respect to FIG. 3. In other words, the instruction set that would execute on a host CPU to perform the operations is translated for execution on each CPU the array of specialized CPUs in the network interface 400.

In order to achieve the parallelization over the CPUs, multiple instances of the programs are compiled and executed on multiple CPUs in parallel. Each instance of the program may be responsible for processing a different set of data packets received at the network interface device. However, each individual data packet is processed by a single CPU when providing the function of the program with respect to that data packet. The overall effect of the execution of the parallel programs may be the same as the execution of a single program (e.g. program 330) on the host CPU.

One of the specialized CPUs may process data packets at an order of 50 million packets per second. This operating speed may be lower than the operating speed of the host CPU. Therefore, parallelization may be used to achieve the same performance as would be achieved by executing an equivalent program on the host CPU. In order to perform the parallelization, the data packets are spread over the CPUs and then re-ordered after processing by the CPUs.

The requirement to process data packets of each flow in order along with the re-ordering step 450 may introduce bottlenecks, increase memory resource overheads and may limit the available throughput of the device. This requirement and the re-ordering step 450 may increase the jitter of the device, since the processing throughput may fluctuate depending on the contents of the network traffic and the degree to which the parallelism can be applied.

One advantage of the use of such specialized CPUs may be the short compile time. For example, it may be possible to compile a filtering application to run on such a CPU in less than 1 second.

There may be issues with the use of an array of CPUs when this approach is scaled to higher link speeds. Host network interfaces may be required to reach Terabit/s speeds in the near future. When scaling up such an array 410 of CPUs to these higher speeds, the amount of power required can become problematic.

Another proposal is to include in the network interface device, a field programmable gate array (FPGA) and to use the FPGA to perform the operations on data packets received from the network.

Figure 5:
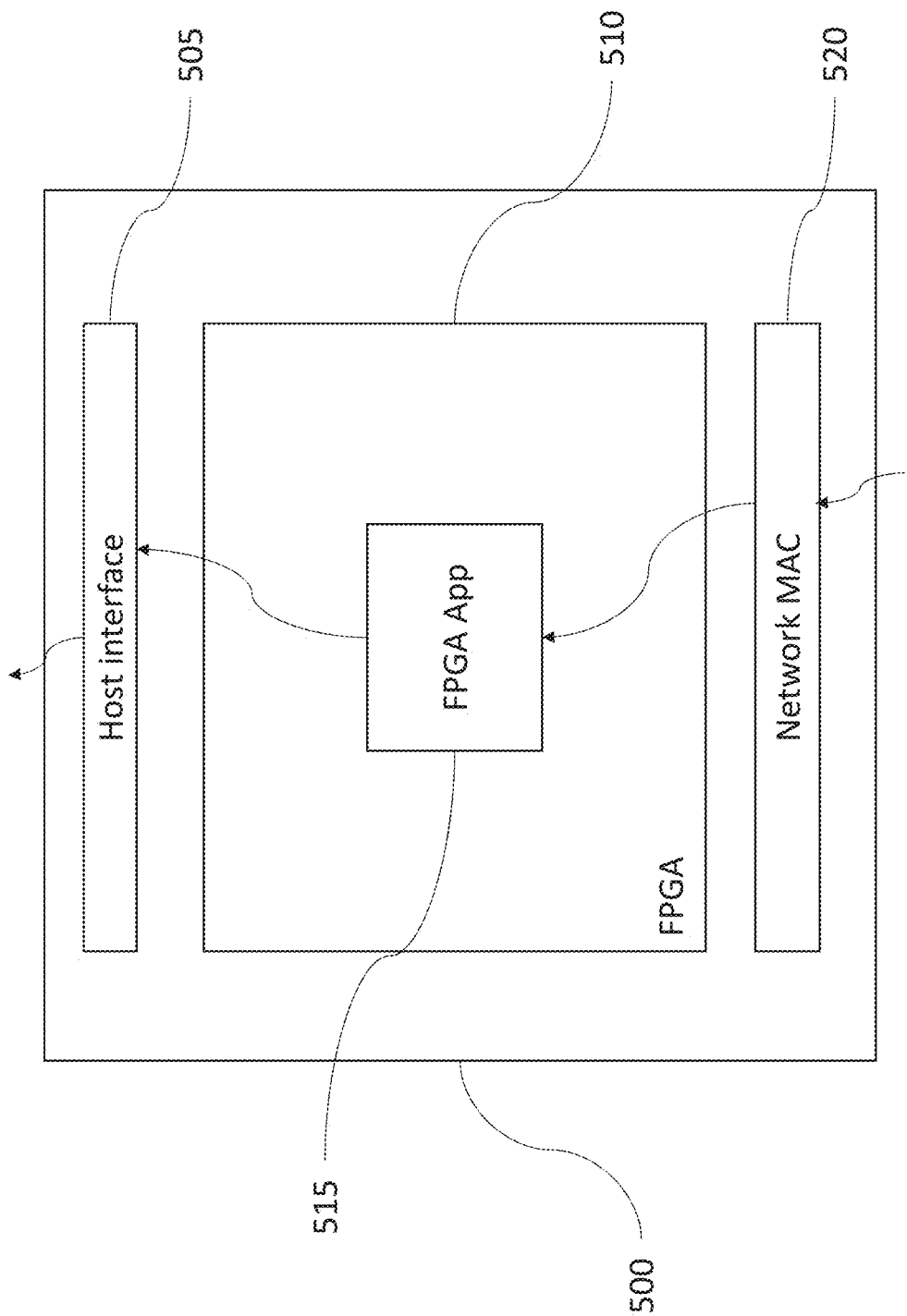
FIG. 5 shows a schematic view of a network interface device comprising a field programmable gate array running an application for performing a function with respect to data packets.

Reference is made to FIG. 5, which illustrates an example of the use, in a network interface device 500, of an FPGA 510 having an FPGA application 515 for performing operations on data packets received at the network interface device 500. Like elements as those in FIG. 4 are referred to with like reference numerals.

Although FIG. 5 illustrates the FPGA application 515 operating only on data packets received from the network, such an FPGA application 515 may be used to perform functions (e.g. load balancing and/or a firewall function) on these data packets received from the host for transmission over the network or back to the host or another network interface on the system.

The FPGA application 515 may be provided by compiling a program written in a common system-level language, such as C or C++ or scala to run on an FPGA 510.

That FPGA 510 may have network interface functionality and FPGA functionality. The FPGA functionality may provide an FPGA application 515, which may be programmed into the FPGA 510 according to the needs of the network interface device user. The FPGA application 515 may, for example, provide filtering of the messages on the receive path from the network 230 to the host. The FPGA application 515 may provide a firewall.

The FPGA 510 may be programmable to provide the FPGA application 515. Some of the network interface device functionality may be implemented as "hard" logic within the FPGA 510. For example, the hard logic may be application specific integrated circuit (ASIC) gates. The FPGA application 515 may be implemented as "soft" logic. The soft logic may be provided by programming the FPGA LUTs (look up tables). The hard logic may be capable of being clocked at a higher rate as compared to the soft logic.

The network interface device 500 comprises a host interface 505 configured to send and receive data with the host. The network interface device 520 comprises a network medium access control (MAC) interface 520 configured to send and receive data with the network.

When a data packet is received from the network at the MAC interface 520, the data packet is passed to the FPGA application 515, which is configured to perform a function, such as filtering, with respect to the data packet. The data packet (if it passes any filtering) is then passed to the host interface 505 from where it is passed to the host. Alternatively, the data packet FPGA application 515 may determine to drop or re-transmit the data packet.

One issue with this approach of using an FPGA to perform a function with respect to data packets is the relatively long compile time required. The FPGA is composed of many logic elements (e.g. logic cells) which individually represent a primitive logic operation, such as AND, OR, NOT, etc. These logic elements are arranged into a matrix with a programmable interconnect. In order to provide a function, these logic cells may need to operate together to implement the circuit definition and synchronous clock timing constraints. Placing each logic cell and routing between cells may algorithmically be a difficult challenge. When compiling on an FPGA having lower levels of utilisation, the compile time may be less than ten minutes.

However, as the FPGA device becomes more utilised by various applications, the challenge of place and route may grow such that the time to compile a given function onto the FPGA increases. As such, adding additional logic to an FPGA, which already has most of its routing resources consumed, may take hours of compilation time.

One approach is to design hardware using specific processing primitives, such as parse, match and action primitives. These may be used to construct a processing pipeline where all packets undergo each of the three processes. Firstly, a packet is parsed to construct a metadata representation of the protocol headers. Secondly, the packet is flexibly matched against rules held in tables. Finally, when a match is found the packet is actioned in dependence upon the entry from the table selected in the match operation.

In order to implement functions using the parse/match/action model, the P4 programming language (or a similar language) may be used. The P4 programming language is target independent, meaning that a program written in P4 can be compiled to run in different types of hardware such as CPUs, FPGAs, ASICs, NPUs, etc. Each different type of target is provided with its own compiler that maps the P4 source code into the appropriate target switch model. P4 may be used to provide a programming model which allows a high-level program to express packet processing operations for a packet processing pipeline. This approach works well for operations which naturally express themselves in a declarative style. In the P4 language, the programmer expresses the parsing, matching, and action stages as operations to be performed for the received data packets. These operations are gathered together for dedicated hardware to perform efficiently. However, this declarative style may not be appropriate for expressing programs of an imperative natures, such as eBPF programs.

In a network interface device, a sequence of eBPF programs may be required to execute serially. In this case, a chain of eBPF programs are generated, one calling another. Each program can modify state and the output is as if the entire chain of programs has executed serially. It may be challenging for a compiler to gather all the parsing, matching and actioning steps. However, even in the case that the chain of eBPF programs has already been installed, it might be necessary to install, remove, or modify the chain, which may present further challenges.

Figure 10:
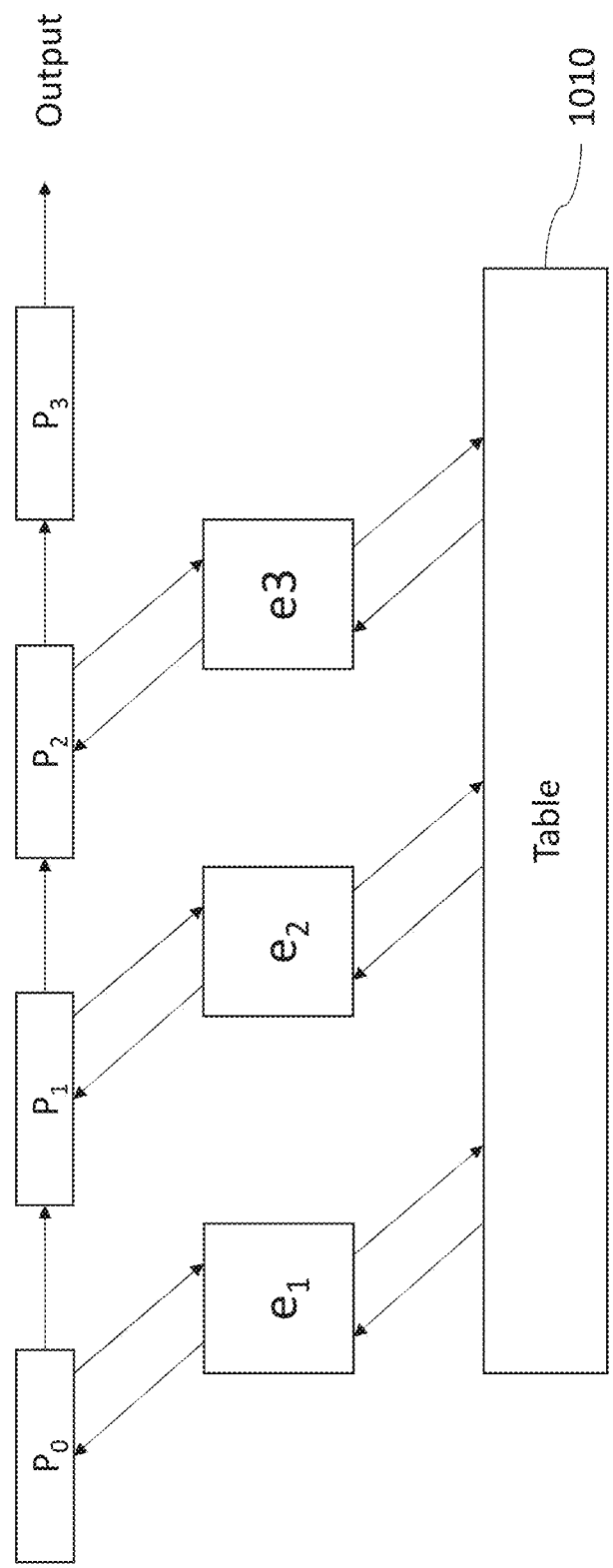
FIG. 10 illustrates an example of processing a data packet by a series of programs.

To provide an example of such a program requiring repeat execution, reference is made to FIG. 10, which illustrates an example of a sequence of programs $e_1$, $e_2$, $e_3$, that are configured to process a data packet. Each of the programs may be an eBPF program, for example. Each of the programs is configured to parse the receive data packet, perform look up into table 1010 to determine an action in matching entry in the table 1010, and then perform the action with respect to the data packet. The action may comprise modifying the packet. Each of the eBPF programs may also perform an action in dependent upon local and shared state. The data packet $P_0$ is initially processed by eBPF program $e_1$, before being passed, modified, to the next program $e_2$ in the pipeline. The output of the sequence of programs, is the output of the final program in the pipeline, i.e. $e_3$.

Combining the effect of each of n such programs into a single P4 program may be complex for a compiler. Additionally, certain programming models (such as XDP) may require programs to be dynamically inserted and removed at any point in the sequence of programs quickly in response to changing circumstances.

According to some embodiments of the application, there is provided a network interface device comprising a plurality of processing units. Each processing unit is configured to perform at least one predefined operation in hardware. Each processing unit comprises a memory storing its own local state. Each processing unit comprises a digital circuit modifying this state. The digital circuit may be an application specific integrated circuit. Each processing unit is configured to run a program comprising configurable parameters so as to perform the respective plurality of operations. Each processing unit may be an atom. An atom is defined by the specific programming and routing of a pre-defined template. This defines its specific operational behaviour and logical place in the flow provided by the connected plurality of processing units. Where the term 'atom' is used in the specification, this may be understood to refer to a data processing unit that is configured to execute its operations in a single step. In other words, the atom executes its operations as an atomic operation.

An atom may be regarded as a collection of hardware structures which can be configured to repeatedly perform one of a range of computations, taking one or more inputs and producing one or more outputs.

An atom is provided by hardware. An atom may be configured by a compiler. An atom may be configured to perform computations.

During compilation, at least some of the plurality of processing units are arranged to perform operations such that a function is performed with respect to a data packet received at the network interface device by the at least some of the plurality of processing units. Each of the at least some of the plurality of processing units is configured to perform its respective at least one predefined operation so as to perform the function with respect to a data packet. In other words, the operations which the connected processing units are configured to perform are performed with respect to a received data packet. The operations are performed sequentially by the at least some of the plurality of processing units. Collectively, the performance of each of the plurality of operations provides a function, e.g. filtering, with respect to the received packet.

By arranging each of the atoms to execute their respective at least one predefined operation so as to perform the function, the compilation time may be reduced as compared to the FPGA application example described above with respect to FIG. 5. Furthermore, by performing the function using processing units specifically dedicated to performing particular operations in hardware, the speed at which the function can be performed may be improved with respect to using a CPU executing software in the network interface device to perform the function for each data packet as discussed above with respect to FIG. 4.

Figure 6:
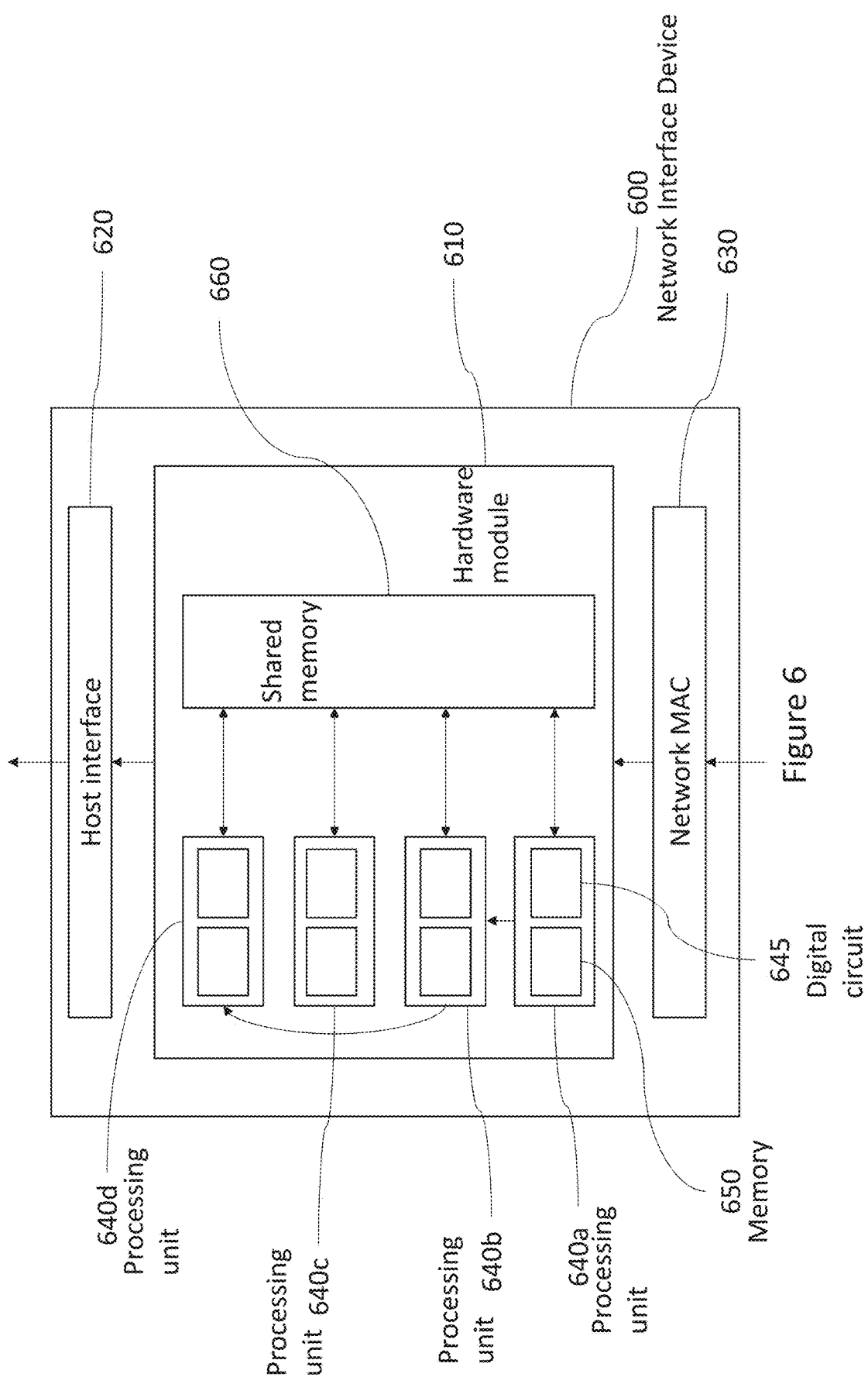
FIG. 6 shows a schematic view of a network interface device comprising a hardware module for performing a function with respect to data packets.

Reference is made to FIG. 6, which illustrates an example of a network interface device 600 according to embodiments of the application. The network interface device comprises a hardware module 610 configured to perform the processing of data packets received at an interface of the network interface device 600. Although, FIG. 6 illustrates the hardware module 610 performing a function (e.g. filtering) for data packets on the receive path, the hardware module 610 may also be used for performing a function (e.g. load balancing or a firewall) for data packets on the transmit path that are received from the host.

The network interface device 600 comprises a host interface 620 for sending and receiving data packets with the host and a network MAC interface 630 for sending and receiving data packets with the network.

The network interface device 600 comprises a hardware module 610 comprising a plurality of processing units 640a,

640*b*, 640*c*, 640*d*. Each of the processing units may be an atom processing unit. The term atom is used in the description to refer to processing units. Each of the processing units is configured to perform at least one operation in hardware. Each of the processing units comprises a digital circuit 645 configured to perform the at least one operation. The digital circuit 645 may be an application specific integrated circuit. Each of the processing units additionally comprises a memory 650 storing state information. The digital circuit 645 updates the state information when executing the respective plurality of operations. In addition to the local memory, each of the processing units has access to a shared memory 660, which may also store state information accessible to each of the plurality of processing units.

The state information in the shared memory 660 and/or the state information in the memory 650 of the processing units may include at least one of: metadata which is passed between processing units, temporary variables, the contents of the data packets, the contents of one or more shared maps.

Together, the plurality of processing units are capable of providing a function to be performed with respect to data packets received at the network interface device 600. The compiler outputs instructions to configure the hardware module 610 to perform a function with respect to incoming data packets by arranging at least some of the plurality of processing units to perform their respective at least one predefined operation with respect to each incoming data packet. This may be achieved by chaining (i.e. connecting) together the at least some of the processing units 640*a*, 640*b*, 640*c*, 640*d* so that each of the connected processing units will perform their respective at least one operation with respect to each incoming data packet. Each of the processing units performs their respective at least one operation in a particular order so as to perform the function. The order may be such that two or more of the processing units execute in parallel with each other, i.e. at the same time. For example, one processing unit may read from a data packet during a time period (defined by a periodic signal (e.g. clock signal) of the hardware module 610) in which a second processing unit also reads from a different location in the same data packet.

In some embodiments, the data packet passes through each stage represented by the processing units in a sequence. In this case, each processing unit completes its processing before passing the data packet to the next processing unit for performing its processing.

In the example shown in FIG. 6, processing units 640*a*, 640*b*, and 640*d* are connected together at compile time, such that each of them performs their respective at least one operation so as to perform a function, e.g. filtering, with respect to the received data packet. The processing units 640*a*, 640*b*, 640*d* form a pipeline for processing the data packet. The data packet may move along this pipeline in stages, each having an equal time period. The time period may be defined according to a period signal or beat. The time period may be defined by a clock signal. Several periods of the clock may define one time period for each stage of the pipeline. The data packet moves along one stage in the pipeline at the end of each occurrence of the repeating time period. The time period may be a fixed interval. Alternatively, each time period for a stage in the pipeline may take a variable amount of time. A signal indicating the next stage in the pipeline may be generated when the previous processing stage has finished an operation, which may take a variable amount of time. A stall may be introduced at any stage in the pipeline by delaying the signal for some predetermined amount of time Each of the processing units 640*a*, 640*b*, 640*d* may be configured to access shared memory 660 as part of their respective at least one operation. Each of the processing units 640*a*, 640*b*, 640*d* may be configured to pass metadata between one another as part of their respective at least one operation. Each of the processing units 640*a*, 640*b*, 640*d* may be configured to access the data packet received from the network as part of their respective at least one operation.

In this example, the processing unit 640*c* is not used to perform processing of received data packets so as to provide the function, but is omitted from the pipeline.

A data packet received at the network MAC layer 630 may be passed to the hardware module 610 for processing. Although not shown in FIG. 6, the processing performed by the hardware module 610 may be part of a larger processing pipeline providing additional functions with respect to the data packet other than the function provided by the hardware module 610. This is illustrated with respect to FIG. 14, and will be explained in more detail below.

The first processing unit 640*a* is configured to perform a first at least one operation with respect to the data packet. This first at least one operation may comprise at least one of: reading from the data packet, reading and writing to shared state in memory 660, and/or performing a look up into a table to determine an action. The first processing unit 640*a* is then configured to produce results from its at least one operation. The results may be in the form of metadata. The results may comprise a modification to the data packet. The results may comprise a modification to shared state in memory 660. The second processing unit 640*b* is configured to perform its at least one operation with respect to the first data packet in dependence upon the results from the operation carried out by the first processing unit 640*a*. The second processing unit 640*b* produce results from its at least one operation and passes the results to a third processing unit 640*d* that is configured to perform its at least one operation with respect to the first data packet. Together the first 640*a*, second 640*b*, and third 640*d* processing units are configured to provide a function with respect to a data packet. The data packet may then be passed to the host interface 620, from where it is passed to the host system.

Therefore, it may be seen that the connected processing units form a pipeline for processing a data packet received at the network interface device. This pipeline may provide the processing of an eBPF program. The pipeline may provide the processing of a plurality of eBPF programs. The pipeline may provide the processing of a plurality of modules which execute in a sequence.

The connecting together of processing units in the hardware module 610 may be performed by programming a routing function of a pre-synthesised interconnection fabric of the hardware module 610. This interconnection fabric provides connections between the various processing units of the hardware module 610. The interconnection fabric is programmed according to the topology supported by the fabric. A possible example topology is discussed below with reference to FIG. 15.

The hardware module 610 supports at least one bus interface. The at least one bus interface receives data packets at the hardware module 610 (e.g. from the host or network). The at least one bus interface outputs data packets from the hardware module 610 (e.g. to the host or network). The at least one bus interface receives control messages at the hardware module 610. The control messages may be for configuring the hardware module 610.

The example shown in FIG. 6 has the advantage of a reduced compile time with respect to the FPGA application

515 shown in FIG. 5. The hardware module 610 of FIG. 6 may require less than 10 seconds to compile a filtering function, for example. The example shown in FIG. 6 has the advantage improved processing speed with respect to the example of an array of CPUs shown in FIG. 4.

An application may be complied for execution in such a hardware module 610 by mapping a generic program (or multiple programs) to a pre-synthesised data path. The compiler builds the data-path by linking an arbitrary number of processing stage instances, where each instance is built from one of the pre-synthesised processing stage atoms.

Each of the atoms is built from a circuit. Each circuit may be defined using an RTL (register transfer language) or high level language. Each circuit is synthesised using a compiler or tool chain. The atoms may be synthesised into hard-logic and so be available as a hard (ASIC) resource in a hardware module of the network interface device. The atoms may be synthesised into soft-logic. The atoms in soft-logic may be provided with constraints which allocate and maintain the place and route information of the synthesised logic on the physical device. An atom may be designed with configurable parameters that specifies an atom's behaviour. Each parameter may be a variable, or even a sequence of operations (a micro-program), which may specify at least one operation to be performed by a processing unit during a clock cycle of the processing pipeline. The logic implementing the atoms may be synchronously or asynchronously clocked.

The processing pipeline of atoms itself may be configured to operate according to a periodic signal. In this case, each the data packet and metadata moves one stage along the pipeline in response to each occurrence of the signal. The processing pipeline may operate in an asynchronous manner. In this case, back pressure at higher levels in the pipeline will cause each downstream stage to start processing only when data from an upstream stage has been presented to it.

When compiling a function to be executed by a plurality of such atoms, a sequence of computer code instructions is separated into a plurality of operations, each of which is mapped to a single atom. Each operation may represent a single line of disassembled instruction in the computer code instruction. Each operation is assigned to one of the atoms to be carried out by one of the atoms. There may be one atom per expression in the computer code instructions. Each atom is associated with a type of operation, and is selected to carry out at least one operation in the computer code instructions based on its associated type of operation. For example, an atom may be preconfigured to perform a load operation from a data packet. Therefore, such an atom is assigned to carry out an instruction representing a load operation from a data packet in the computer code.

One atom may be selected per line in the computer code instructions. Therefore, when implementing a function in a hardware module containing such atoms, there may be 100 s of such atoms, each performing their respective operations so as to perform the function with respect to that data packet.

Each atom may be constructed according to one of a set of processing stage templates that determine its associated type of operation/s. The compilation process is configured to generate instructions to control each atom to perform a specific at least one operation based on its associated type. For example, if an atom is preconfigured to perform packet access operations, the compilation process may assign to that atom, an operation to load certain information (e.g. the packet's source ID) from the header of the packet. The compilation process is configured to send instructions to the hardware module, in which the atoms are configured to perform the operations assigned to them by the compilation process.

The processing stage templates that specify an atom's behaviour are logic stage templates (e.g. providing operations over registers, scratch pad memory, and stack, as well as branches) packet access state templates (e.g. providing packet data loads and/or packet data stores), and map access stage templates (e.g. map lookup algorithms, map table sizes).

A packet access stage can comprise at least one of: reading a sequence of bytes from the data packet; replacing one sequence of bytes with a different sequence of bytes in the data packet; inserting bytes into a data packet; and deleting bytes in the data packet.

A map access stage can be used to access different types of map (e.g. a lookup table), including direct indexed array and associative array. A map access stage may comprise at least one of: reading a value from a location; writing a value to a location; replacing a value at a location in the map with a different value. A map access stage may comprise a compare operation in which a value is read from a location in the map and compared with a different value. If the value read from the location is less than the different value, then a first action (e.g. do nothing, exchange the value at the location for the different value, or add the values together) may be performed. Otherwise, a second action (e.g. do nothing, exchange or add a value) may be performed. In either case, the value read from the location may be provided to the next processing stage.

Figure 17:
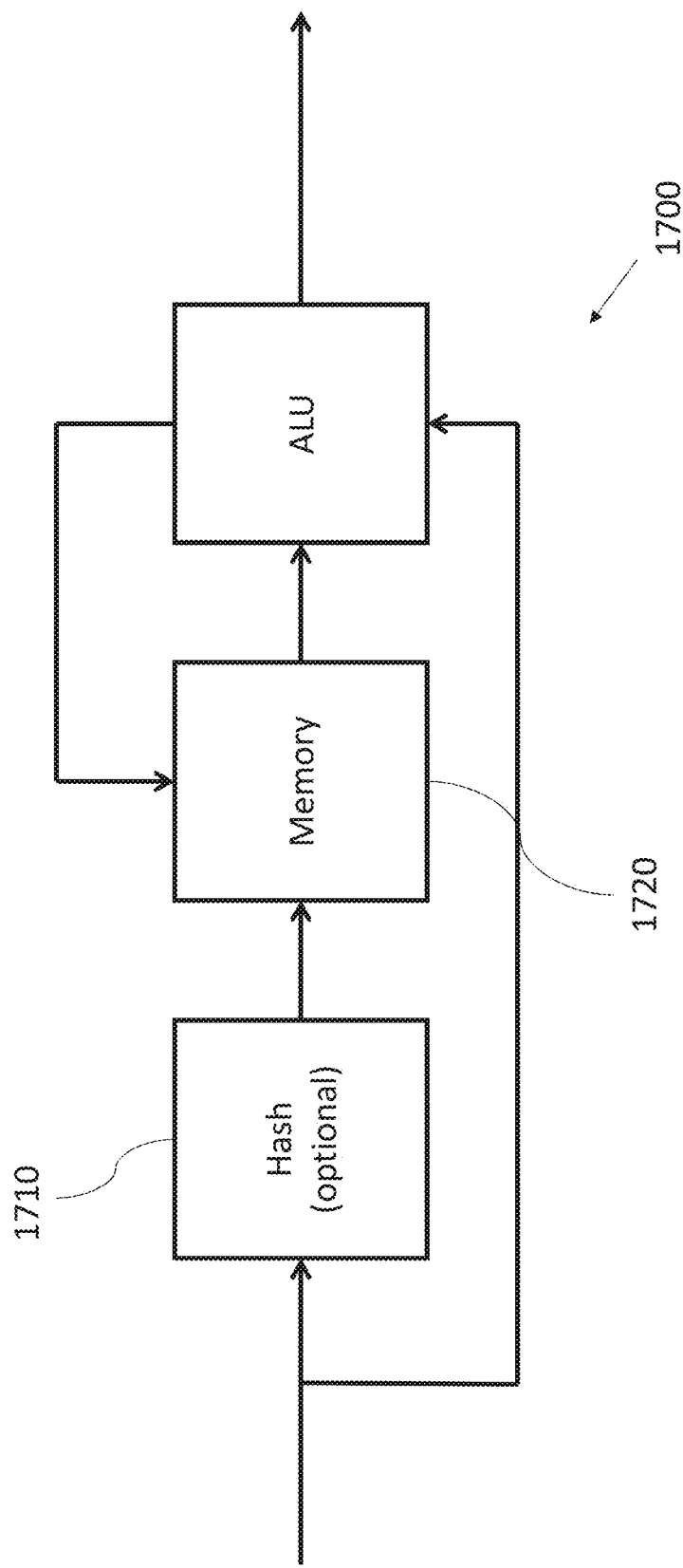
FIG. 17 illustrates an example of a stateful processing unit.

Each map access stage may be implemented in a stateful processing unit. Reference is made to FIG. 17, which illustrates an example of the circuitry 1700 that may be included in an atom configured to perform processing of a map access stage. The circuitry 1700 may include a hash function 1710 configured to perform a hash of input values that are used as an input to a lookup table. The circuitry 1700 includes a memory 1720 configured to store state associated with the atom's operations. The circuitry 1700 includes an arithmetic logic unit 1730 configured to perform an operation.

A logic stage may perform computations on the values provided by the preceding stages. The processing units configured to implement a logic stage may be stateless processing units. Each stateless processing unit can perform a simple arithmetic operation. Each processing unit may perform, for example, an 8-bit operation.

Figure 18:
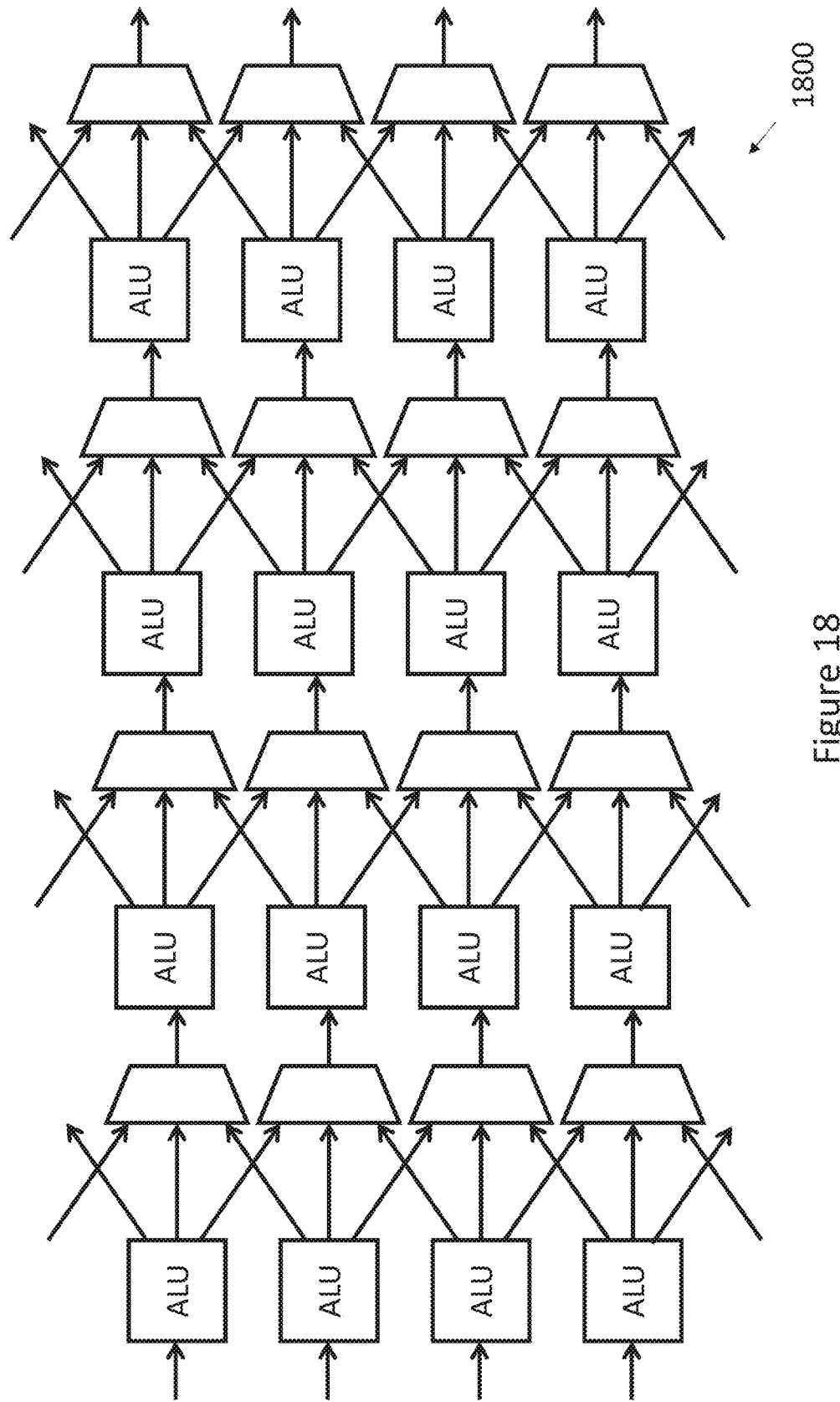
FIG. 18 illustrates an example of a stateless processing unit.

Each logic stage may be implemented in a stateless processing unit. Reference is made to FIG. 18, which illustrates an example of circuitry 1800 that may be included in an atom configured to perform processing of a logic stage. The circuitry 1800 comprises an array of arithmetic logic unit (ALUs) and multiplexers. The ALUs and multiplexors are arranged in layer, with the outputs of one layer of processing by the ALUs being used by the multiplexors to provide the inputs to the next layer of ALUs.

A pipeline of stages implemented in the hardware module may comprise a first packet access stage (pkt0), followed by a first logic stage (logic0), followed by a first map access stage (map0), followed by a second logic stage (logic1), followed by a second packet access stage (pkt1), and so on. It may, therefore, take the following form:

pkt0→logic0→map0→logic1→pkt1

In some examples, Stage pkt0 extracts the required information from the packet Stage pkt0 passes this information to stage logic0. Stage logic0 determines whether the packet is a valid IP packet. In some case logic0 forms the map request and sends the map request to map0, which carries out the map operation. Stage map0 may perform an update to the look up table. Stage logic1 then collects the result from map operation and decides whether to drop the packet as a result.

In some cases, the map request is disabled to cover the case where a map operation should not be performed for this packet. In the case where the map operation is not performed, logic0 indicates to logic1 whether or not the packet should be dropped in dependence upon whether or not the packet is a valid IP packet. In some examples, the look up table contains 256 entries where each entry is an 8-bit value.

This example described includes only five stages. However, as noted many more may be used. Furthermore, operations need not all be carried out in sequence, but some operations with respect to the same data packet may be carried out simultaneously by different processing units.

The hardware module 610 shown in FIG. 6 illustrates a single pipeline of atoms for performing a function with respect to data packets. However, a hardware module 610 may comprise a plurality of pipelines for processing data packets. Each of the plurality of pipelines may perform a different function with respect to data packets. The hardware module 610 is configurable to interconnect a first set atoms of the hardware module 610 to form a first data processing pipeline. The hardware module 610 is also configurable to interconnect a second set of atoms of the hardware module 610 to form a second data processing pipeline.

In order to compile a function to be implemented in the hardware module comprising the plurality of processing units, a series of steps starting from a sequence of computer code may be carried out. The compiler, which may run on a processor on the host device or on the network interface device, has access to the disassembled sequence of computer code.

Firstly, the compiler is configured to split the sequence of computer code instructions into separate stages. Each stage may comprise operations according to one of the processing stage templates described above. For example, one stage may provide a read from the data packet. One stage may provide an update of map data. Another stage may make a pass drop decision.

The compiler assigns each of the plurality of operations expressed by the code to one of the plurality of stages.

Secondly, the compiler is configured to assign each of the processing stages determined from the code to be performed by a different processing unit. This means that each of the respective at least one operation of a processing stage is carried out by a different processing stage. The output of the compiler can then be used to cause the processing units to perform the operations of each stage in a particular order so as to perform the function.

The output of the compiler comprises generated instructions which are used to cause the processing units of the hardware module to carry out the operations associated with each processing stage.

The output of the compiler may also be used to generate logic in the hardware module that responds to control messages for configuring the hardware module 610. Such control messages are described in more detail below with respect to FIG. 14.

The compilation process for compiling a function to be executed on the network interface device 600 may be performed in response to determining that the process for providing the function is safe for execution in the kernel of the host device. The determination of the safety of the program may be carried out by a suitable verifier as described above with respect to FIG. 3. Once the process has been determined to be safe for execution in the kernel, the process may be compiled for execution in the network interface device.

Figure 15:
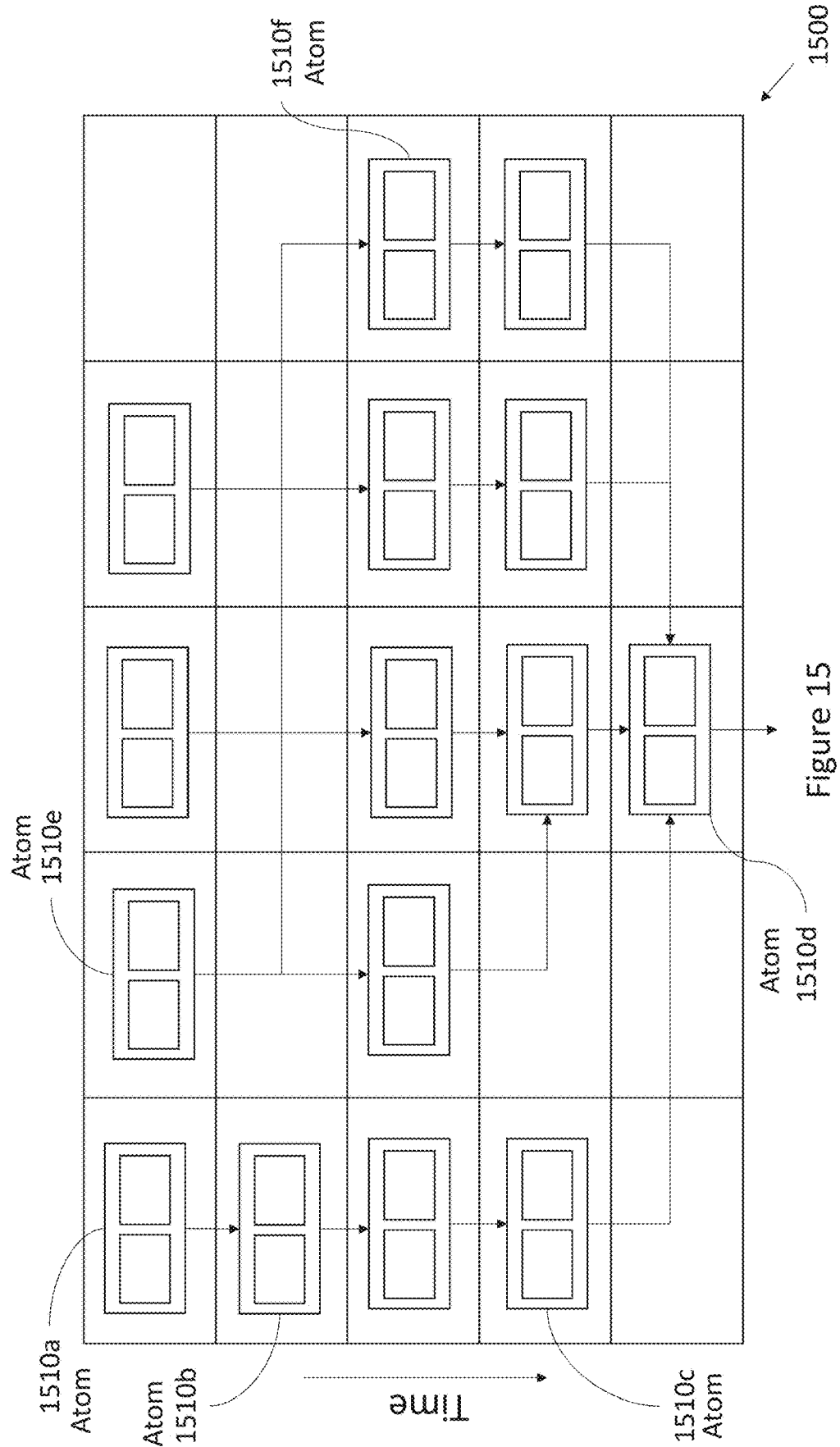
FIG. 15 illustrates an example representation of the arrangement and order of processing of plurality of processing units.

Reference is made to FIG. 15, which illustrates a representation of at least some of the plurality of processing units that perform their respective at least one operation in order to perform the function with respect to a data packet. Such a representation may be generated by the compiler and used to configure the hardware module to perform the function. The representation indicates the order in which the operations may be carried out and how some of the processing units perform their operations in parallel.

The representation 1500 is in the form of a table having rows and columns. Some of the entries of the table show atoms, e.g. atom 1510a, configured to perform their respective operation. The row to which a processing unit belongs indicates the timing of the operation performed by that processing unit with respect to a particular data packet. Each row may correspond to a single time period represented by one or more cycles of a clock signal. Processing units belonging to the same row, perform their operations in parallel.

Inputs to the logic stage are provided in row 0 and computation flows forward into the later rows. By default an atom receives the result from the processing by the atom in the same columns as itself but in the previous row. For example, atom 1510b receives results from the processing by atom 1510a, and performs its own processing on dependence upon these results.

When using local routing resources, atoms may also access outputs from atoms in the previous row for which the column number differs by no more than two. For example, the atom 1510d may receive the results from the processing performed by atom 1510c.

When using global routing resources, atoms may also access outputs from atoms in the previous two rows and in any column. This may be performed using global routing resources. For example, the atom 1510f may receive the results from the processing performed by atom 1510e.

These constraints as to routing between atoms are given as an example and other constraints may be applied. Applying, more restrictive restraints may make routing of information between atoms easier. Applying, less restrictive restraints may make scheduling easier. If the number of atoms of a given type (e.g. map, logic or packet access) is exhausted or the routing between atoms cannot be made, then the compilation of the function into the hardware module will fail.

The particular constraints are determined by the topology supported by the interconnection fabric supported by the hardware module. The interconnection fabric is programed to cause the atoms of the hardware module to execute their operations in a particular order and provide data between each other within the constraints. FIG. 15 shows one particular example of how the interconnection fabric may be so programmed.

A place and route algorithm is used during synthesis of an FPGA application 515 onto an FPGA (as illustrated in FIG. 5). However, in this case, the solution space is constrained and so the algorithm has a short bounded execution time.

There exists a trade-off between processing speed or efficiency and compile time. According to embodiments of the application, it may be desirable to initially compile and run a program on at least one processing unit (which may be a CPU or an atom as described above with respect to FIG. 6) for providing a function with respect to received data packets. The at least one processing unit may then run and perform the function with respect to received data packets during a first time period. During operation of the network interface device, a second at least one processing unit (which may be an FPGA application or a template type of processing unit as described above with respect to FIG. 6) may be configured to perform the function with respect to data packets. The function can then be migrated from the first at least one processing unit to the second at least one processing unit, such that the second at least one processing unit then performs the function for subsequently received data packets at the network interface device. The slower compilation time of the second at least one processing unit, therefore, does not prevent the network interface device from performing the function with respect to data packets before the function has been compiled for the second at least one processing unit, since the first at least one processing unit can be compiled faster and can be used for performing the function with respect to data packets whilst the function is compiled for the second at least one processing unit. Since the second at least one processing unit typically has a faster processing time, migrating to the second at least one processing unit when it is compiled allows faster processing of the data packets received at the network interface device.

According to embodiments of the application compilation processes may be configured to run on at least one processor of the data processing system, wherein the at least one processor is configured to send instructions for the first at least one processing unit and the second at least one processing unit to perform the at least one function with respect to a data packet at appropriate times. The at least one processor may comprise a host CPU. The at least one processor may comprise a control processor on the network interface device. The at least one processor may comprise a combination of one or more processors on the host system and one or more processors on the network interface device.

Accordingly the at least one processor is configured to perform a first compilation process to compile a function to be performed by a first at least one processing unit of a network interface device. The at least one processing unit is also configured perform a second compilation process to compile the function to be performed by a second at least one processing unit of the network interface device. Prior to completion of the second compilation process, the at least one processing unit instructs the first at least one processing unit to perform the function with respect to data packets received from a network. Subsequently, following the completion of the second compilation process the at least one processing unit instructs the second at least one processing unit to begin performing the function with respect to data packets received from the network.

Performing these steps enables the network interface device to perform the function using the first at least one processing unit (which may have a shorter compile time but slower and/or less efficient processing) whilst waiting for the second compilation process to complete. When the second compilation process is complete, the network interface device may then perform the function using the second at least one processing unit (which may have a longer compile time but faster and/or more efficient processing) in addition to or instead of the first at least one processing unit.

Figure 7:
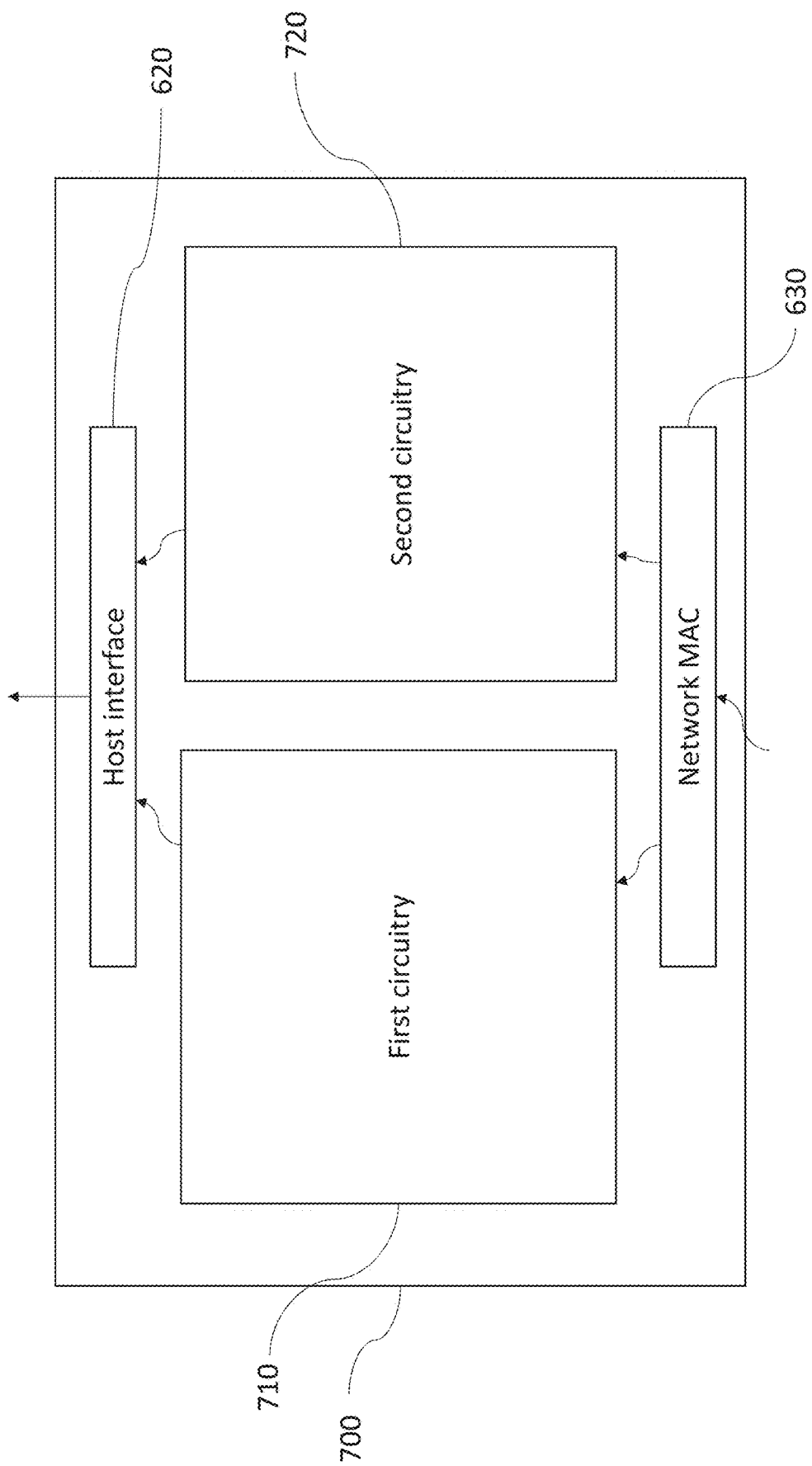
FIG. 7 shows a schematic view of a network interface device comprising a field programmable gate array and at least one processing unit for performing a function with respect to data packets.

Reference is made to FIG. 7, which illustrates an example network interface device 700 in accordance with embodiments of the application. Like reference elements to those shown in the previous Figures are indicated with like reference numerals.

The network interface device comprises a first at least one processing unit 710. The first at least one processing unit 710 may comprise the hardware module 610 shown in FIG. 6, which comprises a plurality of processing units. The first at least one processing unit 710 may comprise one or more CPUs, such as shown in FIG. 4.

The function is compiled to run on the first at least one processing unit 710 such that, during a first time period, the function is performed by the first at least one processing unit 710 with respect to data packets received from the network. The first at least one processing unit 710 is, prior to completion of the second compilation process for the second at least one processing unit, instructed by the at least one processor to perform the function with respect to data packets received from the network.

The network interface device comprises a second at least one processing unit 720. The second at least one processing unit 720 may comprise an FPGA having an FPGA application (such as is illustrated in FIG. 5) or may comprise the hardware module 610 shown in FIG. 6, which comprises a plurality of processing units.

During the first time period, the second compilation process is carried out to compile the function for running on the second at least one processing unit. That is, the network interface device is configured to compile the FPGA application 515 on the fly.

Subsequent to the first time period (i.e. subsequent to the completion of the second compilation process), the second at least one processing unit 720 is configured to begin performing the function with respect to the data packets received from the network.

Subsequent to the first time period, the first at least one processing unit 710 may cease performing the function with respect to the data packets received from the network. In some embodiments, the first at least one processing unit 710 may, in part, cease performing the function with respect to the data packets. For example, if the first at least one processing unit comprises a plurality of CPUs, subsequent to the first time period, one or more of the CPUs may cease performing the processing with respect to the data packets received from the network, with the remaining CPUs of the plurality of CPUs continuing to perform the processing.

The first at least one processing unit 710 may be configured to perform the function with respect to data packets of a first data flow. When the second compilation process is completed, the second at least one processing unit 720 may begin to perform the function with respect to the data packets of the first data flow. When the second compilation process is complete, the first at least one processing unit may cease performing the function with respect to the data packets of the first data flow.

Different combinations are possible for the first at least one processing unit and the second at least one processing unit. For example, in some embodiments the first at least one processing unit 710 comprises a plurality of CPUs (as illustrated in FIG. 4) whilst the second at least one processing unit 720 comprises a hardware module having a plurality of processing units (as illustrated in FIG. 6). In some embodiments, the first at least one processing unit 710 comprises a plurality of CPUs (as illustrated in FIG. 4) whilst the second at least one processing unit 720 comprises an FPGA (as illustrated in FIG. 5). In some embodiments, the first at least one processing unit 710 comprises a hardware module having a plurality of processing units (as illustrated in FIG. 6) whilst the second at least one processing unit 720 comprises an FPGA (as illustrated in FIG. 5).

Figure 11:
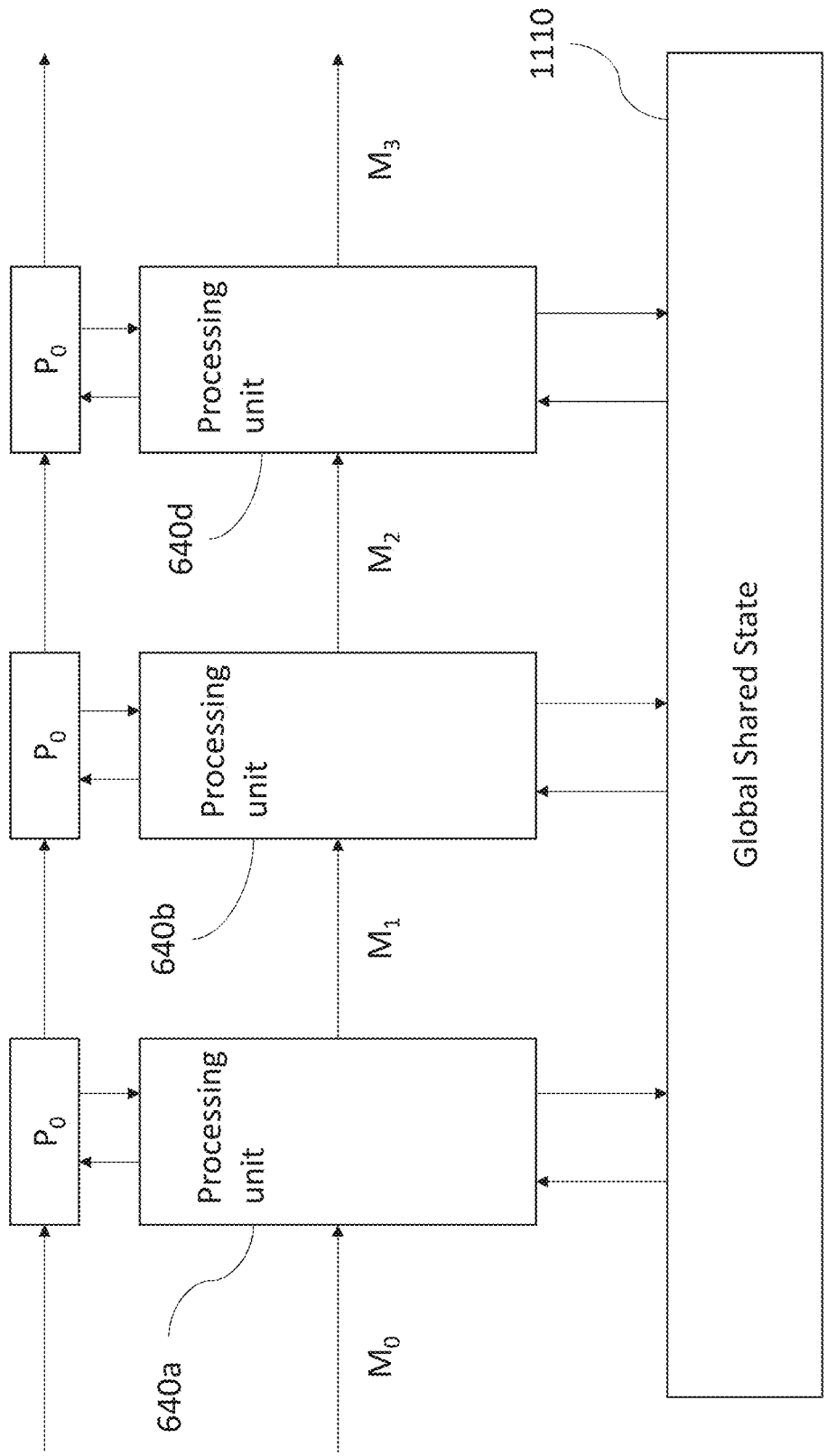
FIG. 11 illustrates an example of processing a data packet by a plurality of processing units.

Reference is made to FIG. 11, which illustrates how the connected plurality of processing units 640a, 640b, 640d may perform its respective at least one operations with respect to a data packet. Each of the processing units is configured to perform its respective at least one operation with respect to a received data packet.

The at least one operation of each processing unit may represent a logic stage in the function (e.g. a function of an eBPF program). The at least one operation of each processing unit may be expressible by an instruction that is executed by the processing unit. The instruction may determine the behaviour of an atom.

FIG. 11 illustrates how the packet ($P_0$) progresses along the processing stages implemented by each processing unit.

Each processing unit performs processing with respect to the packet in a particular order specified by the compiler. The order may be such that some of the processing units are configured to perform their processing in parallel. This processing may comprises accessing at least part of the packet held in a memory. Additionally or alternatively, this processing may comprises performing a look up into a look up table to determine an action to be carried out for the packet. Additionally or alternatively, this processing may comprises modifying state 1110.

The processing units exchange Metadata $M_0$, $M_1$, $M_2$, $M_3$ with one another. The first processing unit 640a is configured to perform its respective at least one predefined operation and generate metadata $M_1$ in response. The first processing unit 640a is configured to pass the metadata $M_1$ to the second processing unit 640b.

At least some of the processing units perform their respective at least one operation in dependence upon at least one of: the content of the data packet, its own stored state, the global shared state, and metadata (e.g. $M_0$, $M_1$, $M_2$, $M_3$) associated with the data packet. Some of the processing units may be stateless.

Each of the processing units may perform its associated type of operation for the data packet ($P_0$) during at least one clock cycle. In some embodiments, each of the processing units may perform its associated type of operation during a single clock cycle. Each of the processing units may be individual clocked for performing their operations. This clocking may be an addition to the clocking of the processing pipeline of processing units.

Examining the operation of the second processing unit 640b in more detail, the second processing unit 640b is configured to be connected to the first processing unit 640a configured to perform a first at least one predefined operation with respect to the first data packet. The second processing unit 640b is configured to receive from the first further processing unit, results of the first at least one predefined operation. The second processing unit 640b is configured to perform a second at least one predefined operation in dependence upon the results of the first at least one predefined operation. The second processing unit 640b is configured to be connected to the third processing unit 640d configured to perform a third at least one predefined operation with respect to the first data packet. The second processing unit 640b is configured to send results of the second at least one predefined operation to the third processing unit 640d for processing in the third at least one predefined operation.

The processing units may similarly operate in order so as to provide the function with respect to each of a plurality of data packets.

Embodiments of the application are such that multiple packets may be simultaneously be pipelined if the function permits.

Figure 12:
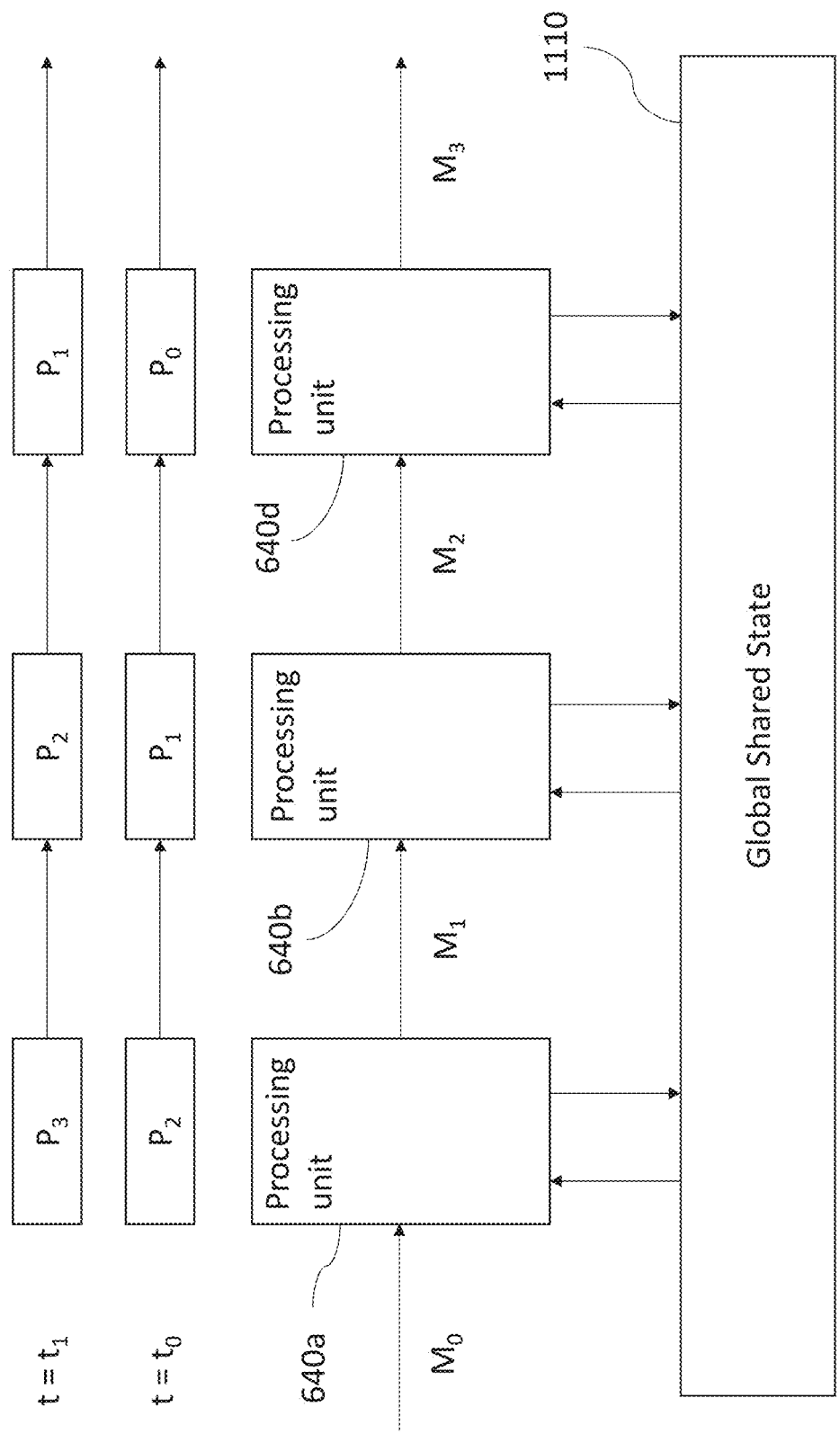
FIG. 12 illustrates an example of processing a data packet by a plurality of processing units.

Reference is made to FIG. 12, which illustrates the pipelining of data packets. As shown, different packets may be processed at the same time by different processing units. A first processing unit 640a is executing its respective at least one operation at a first time ($t_0$) with respect to a third data packet ($P_2$). A second processing unit 640b is executing its respective at least one operation at the first time ($t_0$) with respect to a second data packet ($P_1$). A third processing unit 640d is executing its respective at least one operation at the first time ($t_0$) with respect to a first data packet ($P_0$).

After the respective at least operations have been executed by each of the processing units, each of the packets moves along one stage in the sequence. For example, at a subsequent second time ($t_1$), the first processing unit 640a is executing its respective at least one operation at a first time ($t_0$) with respect to a fourth data packet ($P_3$). The second processing unit 640b is executing its respective at least one operation at the first time ($t_0$) with respect to the third data packet ($P_2$). The third processing unit 640d is executing its respective at least one operation at the first time ($t_0$) with respect to the first data packet ($P_1$).

It should be appreciated that in some embodiments, there may be a plurality of packets will be present in a given stage.

In some embodiments, packets may move from one stage to the next, not necessarily in lock step.

So long as there are no pipeline hazards, such a pipeline operating on a fixed clock may have a constant bandwidth. This may reduce jitter in the system.

In order to avoid hazards (such as conflicts when accessing shared state) when executing instructions, each of the processing units may be configured to execute a no operation (i.e. the processing unit stalls) instruction when necessary.

In some embodiments, operations (such as simple arithmetic, increment, add/subtract constant values, shift, add/subtract values from a data packet or from metadata) require one clock cycle to be executed by a processing unit. This can mean that values in shared state that are required by one processing unit have not yet been updated by another processing unit. Out of date values in the shared state 1110 may therefore be read by the processing unit requiring them. Hazards may therefore occur when reading and writing values to shared state. On the other hand, operations on intermediate values may be passed along as metadata without hazards occurring.

An example of a hazard when reading and writing to share state 1110 that may be avoided can be given in the context of an increment operation. Such an increment operation may be an operation to increment a packet counter in shared state 1110. In one implementation of an increment operation, during a first time slot of the pipeline, the second processing unit 640b is configured to read the value of a counter from shared state 1110, and provide the output of this read operation (e.g. as metadata $M_2$) to the third processing unit 640d. The third processing unit 640d is configured to receive the value of the counter from the second processing unit 640b. During a second time slot, the third processing unit 640d increments this value and writes the new incremented value to the shared state 1110.

A problem may occur when executing such an increment operation, which is that if, during the second time slot, the second processing unit 640b attempts to access the counter stored in shared state 1110, the second processing unit 640b may read the previous value of the counter before the counter value in shared state 1110 is updated by the third processing unit 640d.

Therefore, in order to address this problem, the second processing unit 640b may be stalled during the second time slot (through the execution by the second processing unit

640b of a no operation instruction or a pipeline bubble). A stall may be understood to be a delay in the execution of the next instruction. This delay may be implemented by execution of a "no operation" instruction instead of the next instruction. The second processing unit 640b then reads the counter value from shared state 1110 during a following third time slot. During the third time slot, the counter in shared state 1110 has been updated, and so it is ensured that the second processing unit 640b reads the updated value.

In some embodiments, the respective atoms are configured to read from the state, update the state and write the updated state during a single pipeline time slot. In this case, the stalling of the processing units described above may not be used. However, stalling the processing units may reduce the cost of the memory interface required.

In some embodiments, in order to avoid hazards, the processing units in the pipeline may wait until other processing units in the pipeline have finished their processing before performing their own operations.

As noted, the compiler builds the data-path by linking an arbitrary number of processing stage instances, where each instance is built from one of a predefined number (three in the example given) of pre-synthesised processing stage templates. The processing stage templates are logic stage templates (e.g. providing arithmetic operations over registers, scratch pad memory, and metadata), packet access state templates (e.g. providing packet data loads and/or packet data stores), and map access stage templates (e.g. map lookup algorithms, map table sizes).

Each processing stage instance may be implemented by a single one of the processing units. That is each processing stage comprises the respective at least one operation carried out by a processing unit.

Figure 13:
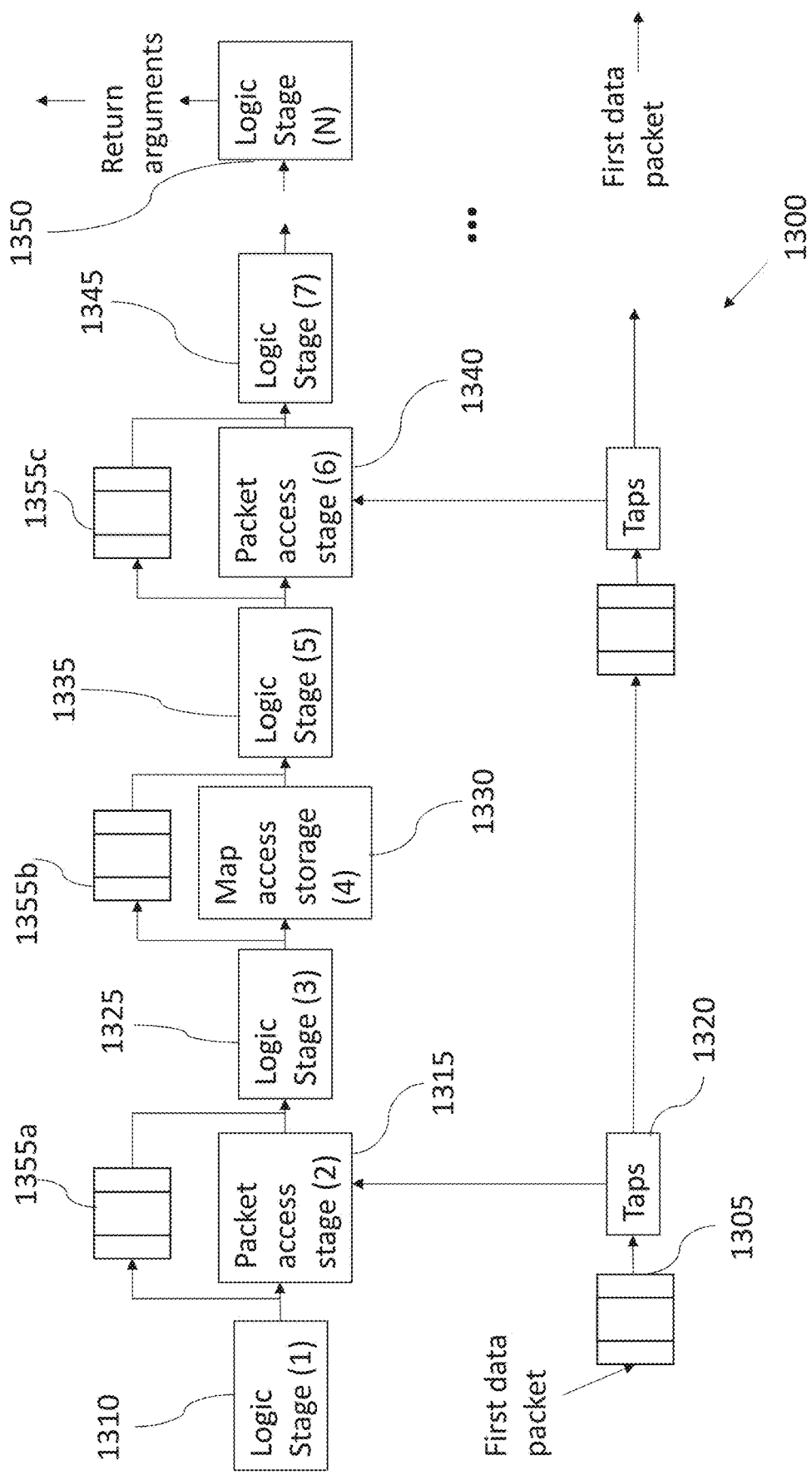
FIG. 13 illustrates an example of a pipeline of processing stages for processing a data packet.

FIG. 13 illustrates an example of a how the processing stages may be connected together in a pipeline 1300 to process a received data packet. A shown in FIG. 13, a first data packet is received at and stored in a FIFO 1305. One or more calling arguments are received at a first logic stage 1310. The calling arguments may comprise a program selector which identifies the function to be executed for a received data packet. The calling arguments may comprise an indication of a packet length of the received data packet. The first logic stage 1310 is configured to process the calling arguments and provide an output to the first packet access stage 1315

The first packet access stage 1315 loads data from the first packet at the network tap 1320. The first packet access stage 1315 may also write data to the first packet in dependence upon the output of the first logic stage 1310. The first packet access stage 1315 may write data to the front of the first data packet. The first packet access stage 1315 may overwrite data in the data packet.

The loaded data and any other metadata and/or arguments are then provided to the second logic stage 1325, which performs processing with respect to the first data packet and provides output arguments to the first map access stage 1330. The first map access stage 1330 uses the output from the second logic stage 1325 to perform a look up into a lookup table to determine an action to be performed with respect to the first data packet. The output is then passed to a third logic stage 1335, which processes this output and passes the result to a second packet access stage 1340.

The second packet access stage 1340 may read data from the first data packet and/or write data to the first data packet in dependence upon the output of the third logic stage 1335. The results of the second packet access stage 1340 are then passed to a fourth logic stage 1345 that is configured to perform processing with respect to the inputs it receives.

The pipeline may comprise a plurality of packet access stages, logic stages, and map access stages. A final logic stage 1350 configured to output the return arguments. The return arguments may comprise a pointer identifying the start of a data packet. The return arguments may comprise an indication of an action to be performed with respect to a data packet. The indication of the action may indicate whether or not the packet is to be dropped. The indication of the action may indicate whether or not the packet is to be forwarded to the host system. The network interface device may comprise at least one processing unit configured to drop the respective data packet in response to an indication that the packet is to be dropped.

The pipeline 1300 may additionally include one or more bypass FIFOs 1355a, 1355b, 1355c. The bypass FIFOs may be used to pass processing data, e.g. data from the first data packet around the map access stages and/or packet access stages. In some embodiments, the map access stages and/or packet access stages do not require data from the first data packet in order to perform their respective at least one operation. The map access stages and/or packet access stages may perform their respective at least one operation in dependence upon the input arguments.

Figure 8:
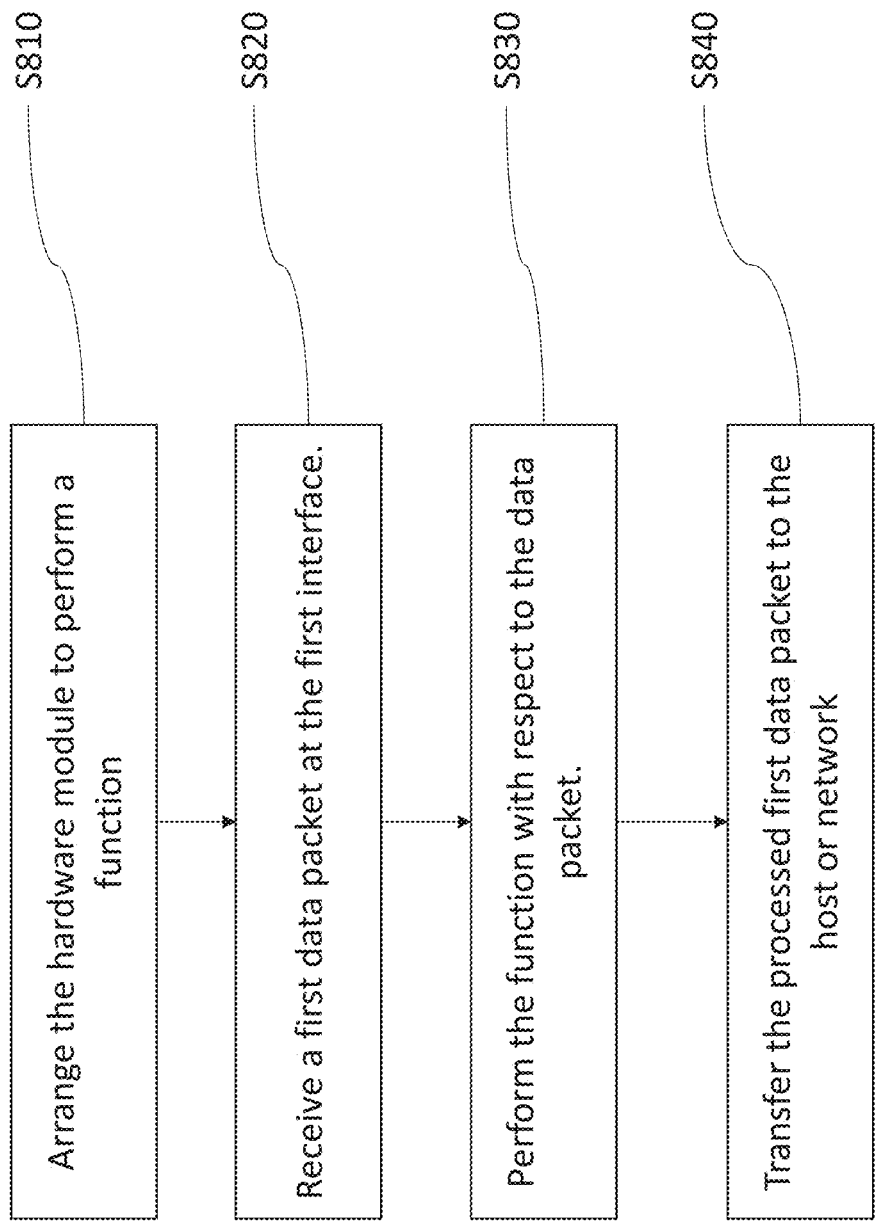
FIG. 8 illustrates a method implemented in a network interface device according to some embodiments.

Reference is made to FIG. 8, which illustrates a method 800 performed by a network interface device 600, 700 according to embodiments of the application.

At S810, a function a hardware module of the network interface device is arranged to perform a function. The hardware module comprises a plurality of processing units, each configured to perform a type of operation in hardware with respect to a data packet. S810 comprises arranging at least some of the plurality of processing units to perform their respective predefined type of operation in a particular order so as to provide a function with respect to each received data packet. Arranging the hardware module as such comprises connecting at least some of the plurality of processing units such that received data packets undergo processing by each of the pluralities of operations of the at least some of the plurality of processing units. The connecting may be achieved by configuring routing hardware of the hardware module to route the data packets and associated metadata between the processing units.

At S820, a first data packet is received from the network at a first interface of the network interface device.

At S830, the first data packet is processed by each of the at least some processing units that were connected during the compilation process in S810. Each of the at least some processing units performs with respect to the at least one data packet the type of operation that it is preconfigured to perform. Hence, the function is performed with respect to the first data packet.

At S840, the processed first data packet is transferred onwards to its destination. This may comprise sending the data packet too the host. This may comprise sending the data packet over the network.

Figure 9:
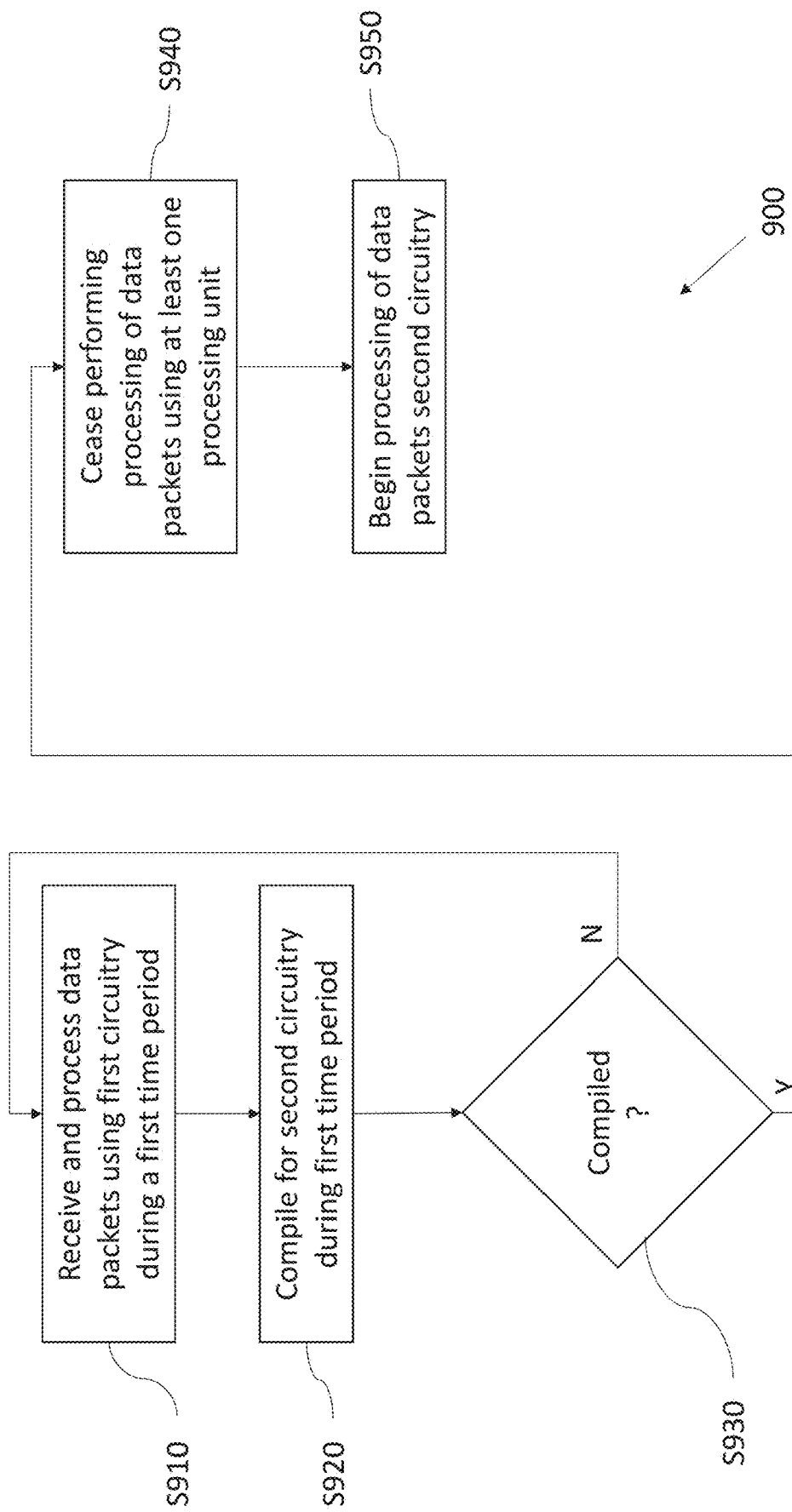
FIG. 9 illustrates a method implemented in a network interface device according to some embodiments.

Reference is made to FIG. 9, which illustrates a method 900 that may be performed in a network interface device 700 according to embodiments of the application.

At S910, the first at least one processing unit (i.e. the first circuitry) of the network interface device is configured to receive and process data packets received from over the network. This processing comprises performing the function with respect to the data packets. The processing is performed during a first time period.

At S920, a second compilation process is performed during the first time period so as to compile the function for performance on a second at least one processing unit (i.e. the second circuitry).

At S930, it is determined whether or not the second compilation process is complete If not, the method returns back to S910 and S920, wherein the first at least one processing unit continues to perform the processing with respect to the data packets received from the network and the second compilation process continues.

At S940, in response to determining that the second compilation is complete, the first at least one processing unit ceases performing the function with respect to the received data packets. In some embodiments, the first at least one processing unit may cease to perform the function only with regard to certain data flows. The second at least one processing unit may then perform the function (at S950) with regard to those certain data flows instead.

At S950, when the second compilation process is complete, the second at least one processing unit is configured to begin performing the function with respect to data packets received from the network.

Figure 16:
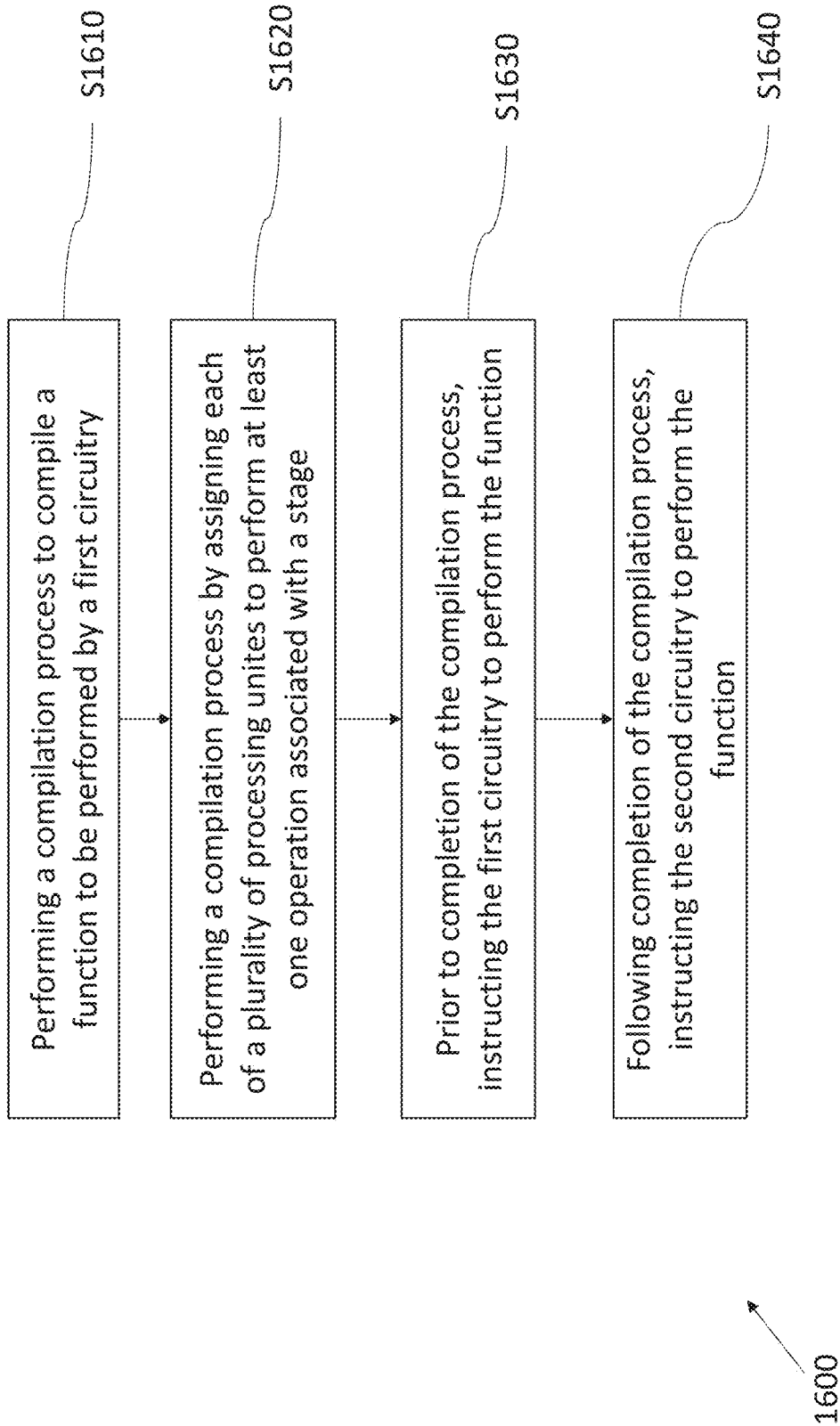
FIG. 16 illustrates an example method of compiling the function.

Reference is made to FIG. 16, which illustrates a method 1600 according to embodiments of the application. The method 1600 could be performed in a network interface device or a host device.

At S1610, a compilation process is performed so as to compile a function to be performed by the first at least one processing unit.

As S1620, a compilation process is performed so as to compile the function to be performed by the second at least one processing unit. This process comprises assigning each of a plurality of processing units of the second at least one processing unit to perform at least one operation associated with a stage of a plurality of stages for processing a data packet so as to provide the first function. Each of the plurality of processing units is configured to a type of processing and the assigning is performed in dependence upon determining that the processing unit is configured to perform a type of processing suitable for performing the respective at least one operation. In other words, the processing units are selected according to their template.

At 1630, prior to completion of the compilation process in S1620, an instruction is sent to cause the first at least one processing unit to perform the function. This instruction may be sent before the compilation process in S1620 begins.

At S1640, following completion of the compilation process in S1620, an instruction is sent to the second circuitry to cause the second circuitry to perform the function with respect to data packets. This instruction may include compiled instructions produced at S1620.

Figure 14:
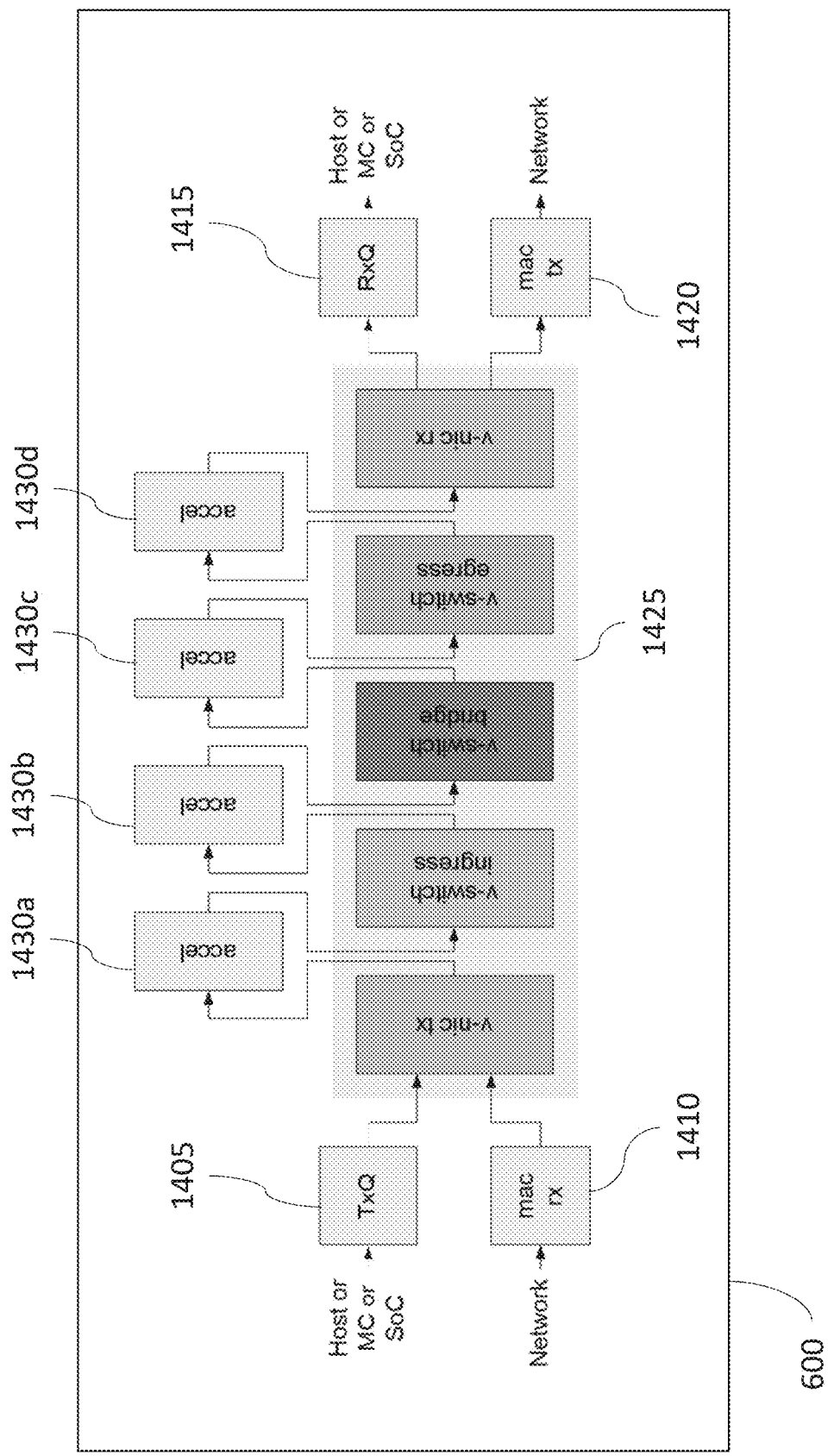
FIG. 14 illustrates an example of a slice architecture having a plurality of pluggable components.

The function according to embodiments of the application may be provided as a pluggable component of a processing slice in the network interface. Reference is made to FIG. 14, which illustrates an example of how a slice 1425 may be used in the network interface device 600. The slice 1425 may be referred to as a processing pipeline.

The network interface device 600 includes a transmit queue 1405 for receiving and storing data packets from the host that are to be processed by the slice 1425 and then transmitted over the network. The network interface device 600 includes a receive queue 1410 for storing data packets received from the network 1410 that are to be processed by the slice 1425 and then delivered to the host. The network interface device 600 includes a receive queue 1415 for storing data packets received from the network that have been processed by the slice 1425 and are for delivery to the host. The network interface device 600 includes a transmit queue for storing data packets received from the host that have been processed by the slice 1425 and are for delivery to the network.

The slice 1425 of the network interface device 600 comprises a plurality of processing functions for processing data packets on the receive path and the transmit path. The slice 1425 may comprise a protocol stack configured to perform protocol processing of data packets on the receive path and the transmit path. In some embodiments, there may be a plurality of slices in the network interface device 600. At least one of the plurality of slices may be configured to process receive data packets received from the network. At least one of the plurality of slices may be configured to process transmit data packets for transmission over the network. The slices may be implemented by hardware processing apparatus, such as at least one FPGA and/or at least one ASIC.

Accelerator components 1430a, 1430b, 1430c, 1430d may be inserted at different stages in the slice as shown. The accelerator components each provide a function with respect to a data packet traversing the slice. The accelerator components may be inserted or removed on the fly, i.e. during operation of the network interface device. The accelerator components are, therefore, pluggable components. The accelerator components are logic regions, which are allocated for the slice 1425. Each of them supports a streaming packet interface allowing packets traversing the slice to be streamed in and out of the component.

For example, one type of accelerator component may be configured to provide encryption of data packets on the receive or transmit path. Another type of accelerator component may be configured to provide decryption of data packet on the receive or transmit path.

The function discussed above that is provided by executing operations performed by a plurality of connected processing units (as discussed above with reference to FIG. 6) may be provided by an accelerator component. Similarly, the function provided by an array of network processing CPUs (as discussed above with reference to FIG. 4) and/or an FPGA application (as discussed above with reference to FIG. 5) may be provided by an accelerator component.

As described, during operation of the network interface device, the processing performed by a first at least one processing unit (such as a plurality of connected processing units) may be migrated from a second at least one processing unit. To implement this migration, a component for processing by the first at least one processing unit in the slice's 1425 components may be replaced by a component for processing by the second at least one processing unit.

The network interface device may comprise a control processor configured to insert and remove the components from the slice 1425. During the first time period discussed above, a component from performing the function by a first at least one processing unit may be present in the slice 1425. The control processor may be configured to, subsequent to the first time period: remove the pluggable component providing the function by the first at least one processing unit from the slice 1425 and insert the pluggable component providing the function by the second at least one processing unit into the slice 1425.

In addition to or instead of inserting and removing the components from the slice, the control processor may load programs into the component and issue control-plane commands to control the flow of frames into the components. In this case, it may be that the components are caused to operate or not operate without being inserted or removed from the pipeline.

In some embodiments, the control plane or configuration information is carried over the data path, rather than requiring separate control buses. In some embodiments, requests to update the configuration of data path components are encoded as messages which are carried over the same buses as network packets. Thus the data path may carry two types of packets: network packets and control packets.

Control packets are formed by the control processor, and injected into the slice 1425 using the same mechanism that is used to send or receive data packets using a slice 1425. This same mechanism may be a transmit queue or receive queue. Control packets may be distinguished from network packets in any suitable way. In some embodiments, the different types of packets may be distinguished by a bit or bits in a metadata word.

In some embodiments, the control packets contain a routing field in the metadata word that determines the path that the control packet takes through the slice 1425. A control packet may carry a sequence of control commands. Each control command may targets one or more components of the slice 1425. The respective data path component is identified by a component ID field. Each control command encodes a request for the respective identified component. The request may be to make changes to the configuration of that component. The request may control whether or not the component is activated, i.e. whether or not the component performs its function with respect to data packets traversing the slice.

Therefore in some embodiments, the control processor of the network interface device 600 is configured to send a message to cause one of the components of the slice to start performing the function with respect to data packets received at the network interface device. This message is a control plane message that is sent through the pluggable components and which causes the atomic switch over of frames into the component for performing the function. This component then executes on all received data packets traversing the slice until it is switched out. The control processor is configured to send a message to cause another of the components of the slice to cause this component to cease performing the function with the respect to data packets received at the network interface device 600.

In order to switch components into and out of the data slice 1425, sockets may be present at various points in the ingress and egress data path. The control processor may plumb additional logic into and out of the slice 1425. This additional logic may take the form of FIFOs placed between the components.

The control processor may send control plane message through the slice 1425 to configured components of the slice 1425. The configuration may determine the function performed by component of the slice 1425. For example, a control message sent through the slice 1425 may cause the hardware module to be configured to perform a function with respect to data packets. Such a control message may cause the atoms of the hardware module to be interconnected into a pipeline of the hardware module so as to provide a certain function. Such a control message may cause the individual atoms of the hardware module to be configured so as to select an operation to be performed by the individually selected atoms. Since each atom is pre-configured to perform a type of operation, the selecting of the operation for each atom is made in dependence upon the type of operation that each atom is pre-configured to perform. Some further embodiments will now be described with reference to FIGS. 19 to 21. In this embodiment a packet processing program or a feed forward pipeline is run in an FPGA. A method for causing subunits of the FPGA to implement the packet processing program or a feedforward pipeline will be described. The packet processing program or feed forward pipeline may be an eBPF program or a P4 program or any other suitable program.

This FPGA may be provided in a network interface device. In some embodiments the packet processing program is deployed or run only after the network interface device is installed with respect to its host.

The packet processing program or feedforward pipeline may implement a logic flow with no loops.

In some embodiments, the program may written in an unprivileged domain or a lower privileged domain such as in the user level. The program may be run on privileged or a higher privileged domain such as a kernel. The hardware running the program may require that there are no arbitrary loops.

In the following embodiments, reference is made to eBPF program examples. However, it should be appreciated that other embodiments may be used with any other suitable program.

It should be appreciated that one or more of the following embodiments may be used in conjunction with one or more of the previous embodiments.

Some embodiments may be provided in the context of an FPGA, an ASIC or any other suitable hardware device. Some embodiments use sub-units of the FPGA or ASIC or the like. The following example is described with reference to an FPGA. It should be appreciated that a similar process may be performed with an ASIC or any other suitable hardware device.

The sub-units may be atoms. Some examples of atoms have been previously described. It should be appreciated that any of those previously described examples of atoms may be alternatively or additionally be used as sub units. Alternatively or additionally these sub-units may be referred to as "slices" or configurable logic blocks.

Each of these sub-units may be configured to perform a single instruction or a plurality of related instructions. In the latter case the related instructions may provide a single output (which may be defined by one or more bits).

A sub-unit can be considered to be a compute unit. The sub-units may be arranged in a pipeline where the packets are processed in order. In some embodiments, the sub-units can be dynamically assigned to execute a respective instruction (or instructions) in a program.

In some embodiments, the sub-unit may be all or part of a unit which is used to define the blocks of, for example, an FPGA. In some FPGAs the blocks of the FPGA are referred to as slices. In some embodiments, a sub-unit or atom equates to a slice.

By mapping a respective atom or subunit to a respective block or slice of the FPGA, an improved resource utilization may be achieved as compared to approaches which map RTL atoms to FPGA resources. Such a latter approach may result in an RTL atom requiring a relatively large number of the individual blocks or slices of the FPGA.

In some embodiments, the compiling may be to the atom level. This may have the advantage that processing is pipelined. The packets may be processed in order. The compilation process may be performed relatively quickly.

In some embodiments, an arithmetic operation may require one slice per byte. A logic operation may require half a slice per byte. A shift operation may require a collection of slices depending on the width of the shift operation. A compare operation may require one slice per byte. A select operation may require half a slice per byte.

As part of a compilation process, placing and routing is performed. Placing is the allocating of a particular physical sub-unit to perform a particular instructions or instructions. Routing ensures that the output or outputs of a particular subunit are routed to the correct destination which may for example be another subunit or subunits.

The placing and routing may use a process where operations are assigned to particular subunits starting from one end of the pipeline. In some embodiments, the most critical operations may be placed before less critical operations. In some embodiments, the routing may be assigned at the same time that particular operations are being placed. In some embodiments, the routes may be selected from a limited set of pre-computed routes. This will be described in more detail later.

In some embodiments, if a route cannot be assigned, the operation will be held for later.

In some embodiments, the pre-computed routes may be byte wide routes. However, this is by way of example only and in other embodiments, different widths of routes may be defined. In some embodiments, there may be a plurality of different sized routes provided.

In some embodiments, the routing may be limited to routing between nearby sub units.

In some embodiments, the sub units may be physically arranged in a regular structure on the FPGA.

In some embodiments, to facilitate routing, rules may be made as to how the sub-units may communicate. For example a sub unit can only provide an output to a sub unit which is next to it, above it or below it.

Alternatively or additionally, limits may be placed on how far away the next sub-unit is, for the purposes of routing. For example a sub unit may output data only to an adjacent sub unit or a sub unit which is within a defined distance (e.g. there is no more than one intervening sub unit).

Figure 19:
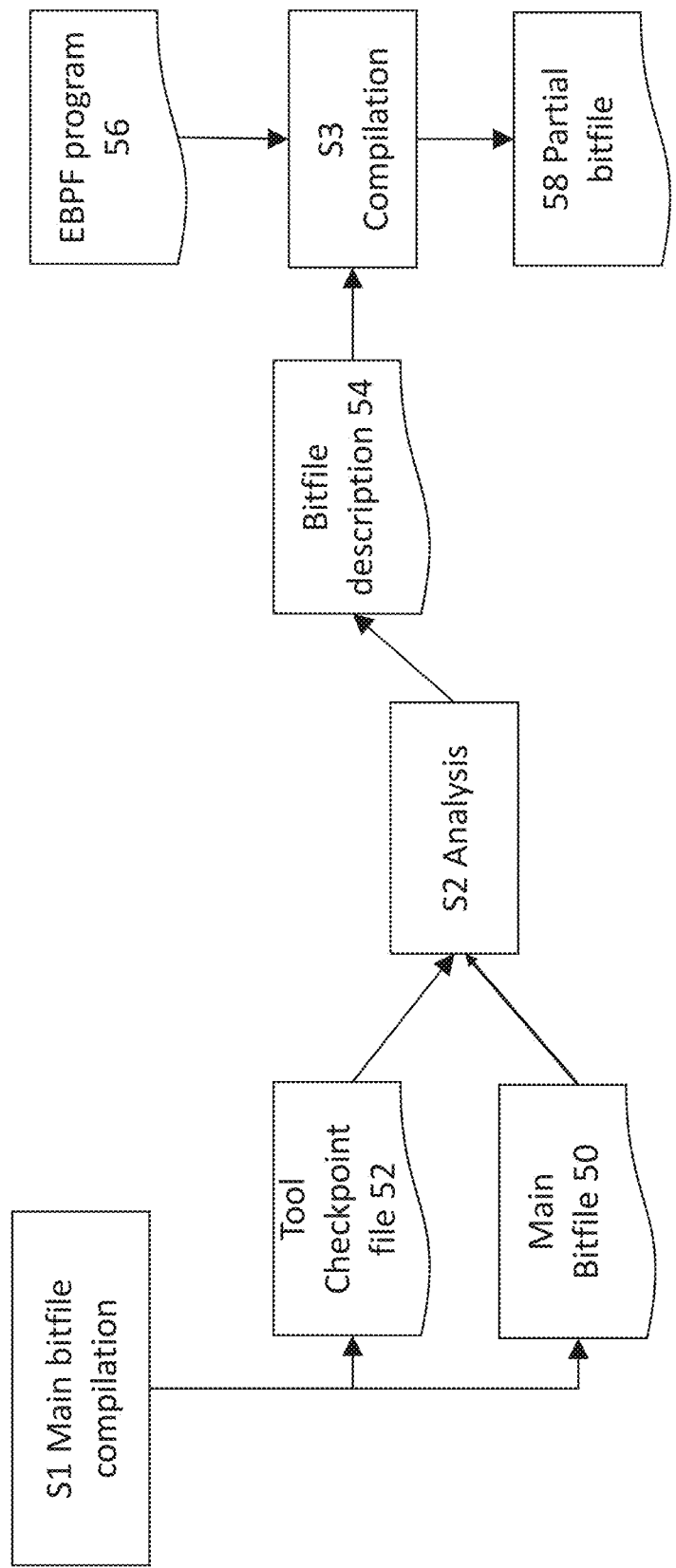
FIG. 19 shows a method of some embodiments.
Figure 20B:
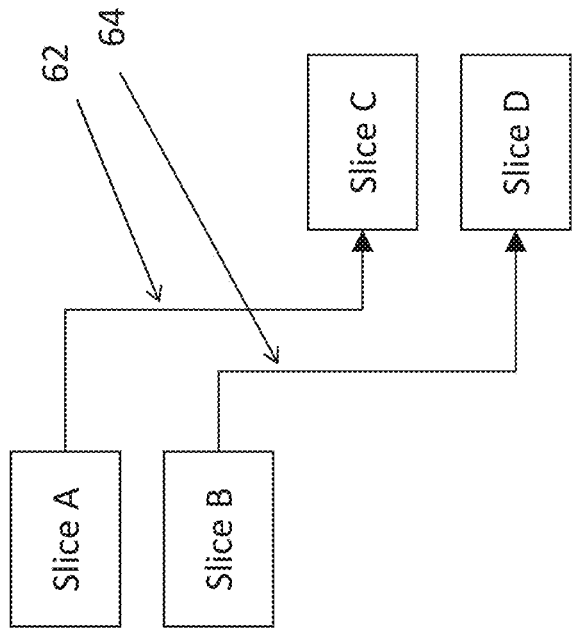
FIGS. 20a and 20b illustrate routing between slices in an FPGA.

Reference is made to FIG. 19 which shows a method of some embodiments.

In some embodiments, the FPGA may have one or more "static" regions and one or more "dynamic" regions. The static region provides a standard configuration and the dynamic function may provide functions in accordance with the requirements of the end user. The static part may for example be defined before an end-user receives the network interface device, for example before the network interface device is installed with respect to the host. For example, the static region may be configured to cause the network interface device to provide certain functions. The static region will be provided with precomputed routes between the atoms. As will be discussed in more detail later, there may routing between one or more static regions which pass through one or more dynamic regions. The dynamic regions may be configured by the end user in dependence on their requirements, when the network interface device is deployed with respect to the host. The dynamic regions may be configured to perform different functions for the end user over the course of time.

In step S1, a first compilation process is performed to provide a first bit file which is referred to as the main bit file 50 and a tool checkpoint 52. This is the bit file for at least a part of the static region in some embodiments. A bit file will when downloaded to the FPGA causes the FPGA to function as specified in a program from which the bit file has been compiled from. In some embodiments, the program which is used in the first compilation process may be any one or more programs or may be a test program which is specifically designed to assist in the determining of the routing within a part of the FPGA. In some embodiments, a series of simple programs may be alternatively or additionally be used.

A program may be modified or have a reconfigurable partition which can be used by the compiler. The program might be modified to make the job of the compiler easier by moving nets out of the reconfigurable partition.

Step S1 may be performed in a design tool. By way of example only, the Vivado tool may be used with Xilinx FPGAs. The checkpoint file may be provided by the design tool. The checkpoint file represents a snapshot of a design at the point at which the bit file is generated. The checkpoint file may comprise one or more a synthesized netlist, design constraints, placement information and routing information.

In step S2, the bit file is analysed taking into account the checkpoint file to provide a bit file description 54. The analysis may be to one or more of detect resources, generate routes, check timing, generate one or more partial bite files and generate a bit file description.

The analysis may be configured to extract routing information from the bit file. The analysis may be configured to determine which wires or routes the signals have propagated.

The analysis phase may be performed at least partially in a synthesizing or design tool. In some embodiments a scripting tool of Vivado may be used. The scripting tool may be TCL (tool command language). TCL can be used to add or modify the capabilities of Vivado. The functions of Vivado may be invoked and controlled by TCL scripts.

The bit file description 54 defines how a given part of the FPGA can be used. For example, the bit file description will indicate which atom can be routed to which other atoms and one or more routes by which it is possible to route between those atoms. For example for each atom, the bit file description will indicate where the inputs to that atom can come from and where the outputs from that atom can be routed to along with one or more routes for the output of data. The bit file description is independent of any program.

A bit file description may contain one or more of route information, an indication of which pairs of routes conflict and a description of how to generate a bit file from the required configuration of atoms.

The bit file description may provide a set of routes available between a set of atoms but before any specific instruction has been performed by a given atom.

The bit file description may be for a portion of the FPGA. The bit file description may be for a portion of the FPGA which is dynamic. The bit file description will include which routes are available and/or which routes are unavailable. For example, the bit file may indicate for the dynamic part of the FPGA which routes are available taking into account any routing across the dynamic part of the FPGA required, by for example the static part(s) of the FPGA.

It should be appreciated that in some embodiments, the bit file description may be obtained in any suitable way. For example, a bit file description may be provided by the provider of the FPGA or ASIC.

In some embodiments, the bit file description may be provided by the design tool. In this embodiment, the analysis step may be omitted. The design tool may output a bit file description. The bit file description may be for the static part of the FPGA including any required routing across the dynamic part of the FPGA.

It should be appreciated that any other suitable technique may be used to generate a bit file description. In the previously described examples, the tool which is used to design the FPGA is used to provide the analysis which is used to generate the bit file.

It should be appreciated that different tools may be used in other embodiments. The tools may be specific to the product or a range of products in some embodiments. For example, a provider of an FPGA may provide an associated tool for managing that FPGA.

In other embodiments, a generic scripting tool may be used.

In some embodiments, a different tool or different technique may be used to determine a partial bit file. For example the main bit file may be analysed in order to determine which features correspond to which features. This may require a plurality of partial bit files to be generated.

It should be appreciated that step S3, is performed when the network interface device is installed with respect to a host and is carried out on the physical FPGA device. Steps S1 and S2 may be performed as part of the design synthesis process to produce the bit file image which implements the network interface device. In some embodiments, steps S1 and/or step S2 are used to characterise the behaviour of FPGA. Once the FPGA has been characterised, the bit file description is stored in memory for all physical network interface devices which are to operate in a given defined manner.

In step S3, a compilation is performed using the bit file description and the eBPF program. The output of the compilation is a partial bit file for the eBPF program. The compiling will add the routes to the partial bit file and the programming to be performed by individual ones of the slices.

It should be appreciated that the bit file description may be provided in the system which is deployed. The bit file description may be stored in memory. The bit file description may be stored on the FPGA, on a network interface device or on the host device. In some embodiments, the bit file description is stored in flash memory or the like, connected to the FPGA on the network interface device. The flash memory may also contain the main bit file.

The eBPF program may be stored with the bit file description or separately. The eBPF program may be stored on the FPGA, on a network interface device or on the host. In the case of eBPF, the program may be transferred from a user-mode program to a kernel, both running on the host. The kernel would transfer the program to the device driver which would then transfer it to the compiler, either running on the host or the network interface device. In some embodiments, an eBPF program may be stored on the network interface device so that it can be run before the host OS has booted.

The compiler may be provided at any suitable location on the network interface device, FPGA or host. By way of example only, the compiler may be run on a CPU on the network interface device.

The compiler flow will now be described. The front end of the compiler receives an eBPF program. The eBPF program may be written in any suitable language. For example, the eBPF program may be written in a C type language. The compiler is configured at the front end to convert the program to an intermediate representation IR. In some embodiments the IR may be a LLVM-IR or any other suitable IR.

In some embodiments, pointer analysis may be performed to create packet/map access primitives.

It should be appreciated, that in some embodiments, an optimization of the IR may be performed by the compiler. This may be optional in some embodiments.

The high level synthesis backend of the compiler is configured to split a program pipeline into stages, generate packet access taps and emit C code. In some embodiments the HLS part of the design tool and/or the design tool being used may be invoked to synthesise the output of the HLS phase.

The compiler backend for the FPGA atoms splits the pipeline into stages and generates packet access taps. If-conversion may be performed to convert control dependencies to data dependencies. The design is placed and routed. The partial bit file for the eBPF program is emitted.

Figure 20A:
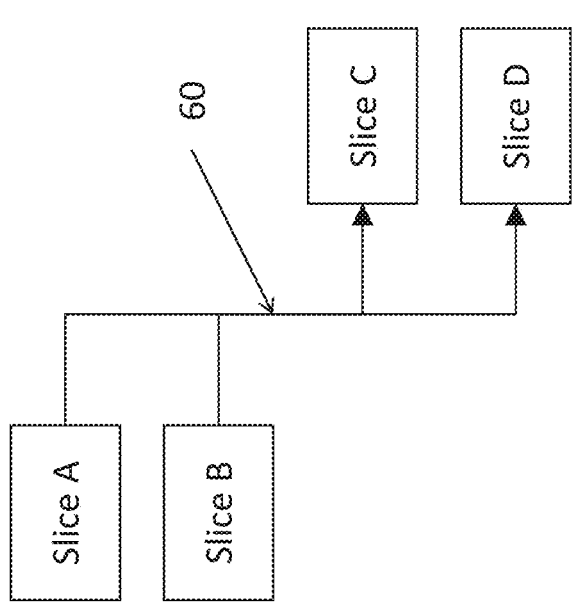

Routing issues could arise, such as shown in FIG. 20*a*, where there is a routing conflict. For example, slice A may communicate with slice C and slice B may communicate with slice D.

In the arrangement of FIG. 20*a*, a common routing part 60 has been allocated to the communication between slice A and slice C as well as to the communication between slice B and D. In some embodiments, this routing conflict may be avoided. In this regard, reference is made to FIG. 20*b*. As can be seen a separate route 62 is provided between slice A and slice C as compared to the route 64 between slice B and slice D.

In some embodiments, the bit file description may include a plurality of different routes for at least some pairs of sub-units. The compiling process will check for routing conflicts such as shows in FIG. 20*a*. In the case of routing conflicts, the compiler can resolve or avoid such conflicts by choosing an appropriate alternative one of the routes.

Figure 21:
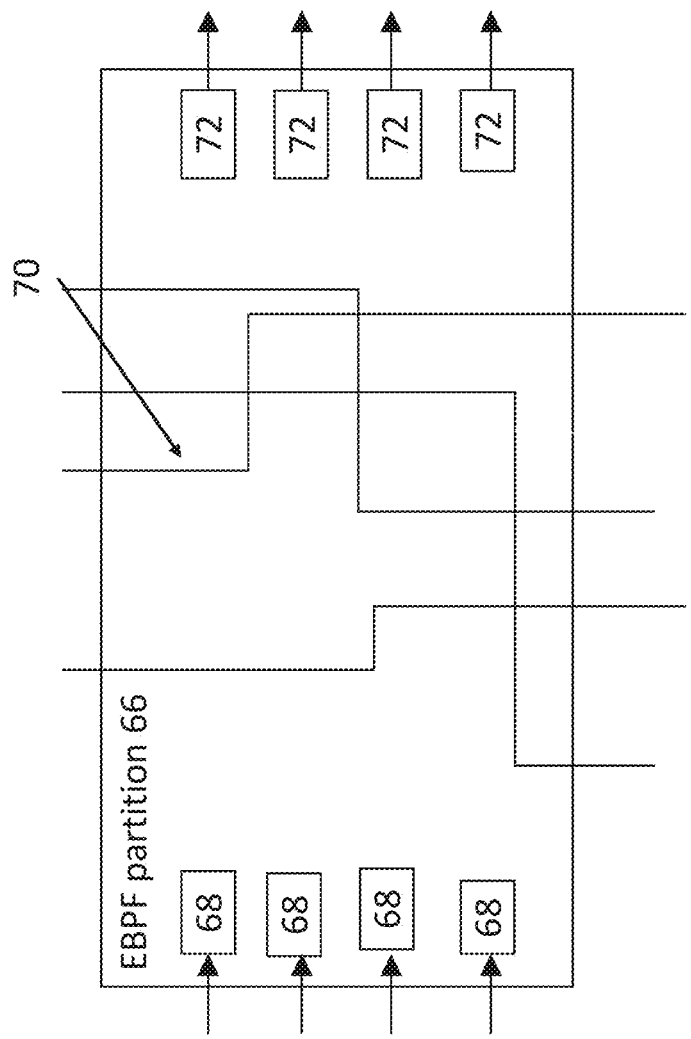
FIG. 21 illustrates schematically a partition on an FGPA.

FIG. 21 shows a partition 66 in the FPGA for performing the eBPF program. The partition will, for example, interface with the static part of the FPGA via a series of input flip-flops 68 and a series of output flip-flops. In some embodiments, there may be routing 70 across the design as previously discussed.

The compiler may need to deal with routing across the area of the FPGA which is being configured by the compiler. The compiler needs to generate a partial bit file which fits into a reconfigurable partition within a main bit file. When a main bit file is generated with a reconfigurable partition, the design tool will avoid using logic resources within the reconfigurable partition so that those resources can be used by the partial bit file. However, the design tool may not be able to avoid using routing resources within the reconfigurable partition.

As a result, the analysis tool will need to avoid using the routing resource which have been used by the design tool which is in the main bit file. The analysis tool may need to make sure its list of available routes in the bit file description does not include any which use resources being used by the main bit file. The available routes may defined in terms of route templates which can be used at a large number of places within the FPGA since the FPGA is highly regular. The routing resources used by the main bit file break the regularity and mean that the analysis tool avoids using those templates in the places where they would conflict with the main bit file. The analysis tool may need to generate new route templates which can be used in those places and/or prevent certain route templates from being used in particular locations.

Some examples of the functions provided by the compiler in converting some example eBPF program fragments into instructions to be performed by atoms will now be described.

Some embodiments may uses any suitable synthesis tool for generating the bit file description. By way of example only, some embodiments may make use Bluespec tools which is based on a mode which uses atomic transactions for hardware.

In a first example, the eBPF program fragment has two instructions:

Instruction 1: r1+=r2
Instruction 2: r1+=r3

The first instruction adds the number in register 1 (r1) to the number in register 2 (r2) and places the result in r1. The second instruction adds r1 to r3 and places the result in r1. Both instructions in this example use 64-bit registers but only use the lowest 32 bits. The upper 32 bits of the results are filled with zeros.

The compiler will convert these to instructions to be performed by atoms. A 32-bit add instruction requires 32 pairs of lookup tables (LUTs), a 32-bit carry chain and 32 flip-flops.

Each pair of lookup tables will add two bits to produce a 2-bit result. The carry chain is the structure which allows a bit to be carried from digit column to the next during an addition and allows a bit to be borrowed from the next column during a subtraction.

The 32 flip-flops are storage elements which accept a value on one clock cycle and reproduce it on the next clock cycle. These may be used to limit the amount of work done per clock cycle and to simplify the timing analysis.

In some embodiments, the FPGA may comprise a number of slices. In some example slices, the carry chain propagates from the bottom of the slice (CIN) to the top of the slice (COUT) which then connects to the CIN input of the next slice up.

In an example where each slice has a 4-bit carry chain, eight slices are used to perform a 32-bit addition. In this embodiment, an atom may be considered to be provided by a pair of slices.

This is because it may be convenient in some embodiments for an atom to operate on 8-bit values.

In an example where each slice has an 8-bit carry chain, four slices are used to perform a 32-bit addition. In this embodiments, an atom may be considered to be provided by a slice.

It should be appreciated that this is by way of example only and as previously discussed, an atom may be defined in any suitable manner.

In this example, the case where the FPGA has slices supporting an 8-bit carry chain will now be used in the compiling of the first example eBPF program fragment.

There are 3 input values which are 32 bits wide and 1 output value which is 32 bits wide. There may be other earlier instructions which produced those 3 input values. In the following, some arbitrary locations of the slices (atoms) will be assumed.

The following numbering convention will be used. The slices (atoms) arranged in a regular row and column arrangement. XnYm indicates the position of the atom in the arrangement. Xn indicates the column and Ym indicates the row. X6Y0 indicates that the slice is in column 6 and in row 0. It should be appreciated that any other suitable numbering scheme may be used in other embodiments.

Suppose the initial values were produced at the same time at the following locations:

r1: slices X6Y0, X6Y1, X6Y2 and X6Y3
r2: slices X6Y4, X6Y5, X6Y6 and X6Y7
r3: slices X6Y8, X6Y9, X6Y10 and X6Y11

The result of the first instruction needs to be calculated by four adjacent slices in the same column so that the carry chain connects up correctly. The compiler might choose to calculate that result in slices X7Y0, X7Y1, X7Y2 and X7Y3. For that to work, the inputs need to be connected up. There would be a connection from X6Y0 to X7Y0, another from X6Y1 to X7Y1, one from X6Y2 to X7Y2 and one from X6Y3 to X7Y3. There also need to be corresponding connections from X6Y4-X6Y7 to X7Y0-X7Y3.

These will be full-byte connections meaning that each of the 8 input bits is connected to the corresponding output bit. For example:

The output from slice X6Y0 flip-flip 0 is connected to input 0 of slice X7Y0 LUT 0.

The output from slice X6Y0 flip-flip 1 is connected to input 0 of slice X7Y0 LUT 1.

and so on until

The output from slice X6Y0 flip-flip 7 is connected to input 0 of slice X7Y0 LUT 7.

During the first clock cycle, the r1 and r2 values from slices X6Y0-X6Y7 will be transferred to the inputs of slices X7Y0-X7Y3, will be processed by the LUTs and the carry chain and the result will be stored in the flip-flops of those slices (X7Y0-X7Y3), ready to be used on the next cycle.

Moving onto instruction 2. The compiler needs to choose a place to calculate the result of instruction 2. It might choose slices X7Y4 to X7Y7. Again, there would full-byte connections from the result of instruction 1 (X7Y0 to X7Y3) to the inputs for instruction 2 (X7Y4 to X7Y7).

The value of r3 is also required. If r1, r2 and r3 were produced in cycle 0 then r1+r2 would be produced in cycle 1. The value of r3 needs to be delayed by a clock cycle so that it is produced in cycle 1. The compiler might choose to produce r3 in cycle 1 using slices X7Y8 to X7Y11. There would then need to be a connection from the original slices which produced r3 in cycle 0 (X6Y8 to X6Y11) to the new slices which produce the same value in cycle 1 (X7Y8 to X7Y11). Having done that, there now needs to be a connection from those new slices to the slices for instruction 2. So the outputs from slice X7Y8 connect to inputs of slice X7Y4 and so on.

The FPGA bit file would then contain the following features (in this regard, reference is made to FIG. 22 which illustrates the connections between the slices in this example):

A full byte connection from X6Y0 to X7Y0 input 0 (initial r1 byte 0)

A full byte connection from X6Y1 to X7Y1 input 0 (initial r1 byte 1)

A full byte connection from X6Y2 to X7Y2 input 0 (initial r1 byte 2)

A full byte connection from X6Y3 to X7Y3 input 0 (initial r1 byte 3)

A full byte connection from X6Y4 to X7Y0 input 1 (initial r2 byte 0)

A full byte connection from X6Y5 to X7Y1 input 1 (initial r2 byte 1)

A full byte connection from X6Y6 to X7Y2 input 1 (initial r2 byte 2)

A full byte connection from X6Y7 to X7Y3 input 1 (initial r2 byte 3)

A full byte connection from X6Y8 to X7Y8 input 0 (initial r3 byte 0)

A full byte connection from X6Y9 to X7Y9 input 0 (initial r3 byte 1)

A full byte connection from X6Y10 to X7Y10 input 0 (initial r3 byte 2)

A full byte connection from X6Y11 to X7Y11 input 0 (initial r3 byte 3)
Slice X7Y0 configured to add input 0 to input 1 (instruction 1 byte 0)
Slice X7Y1 configured to add input 0 to input 1 (instruction 1 byte 1)
Slice X7Y2 configured to add input 0 to input 1 (instruction 1 byte 2)
Slice X7Y3 configured to add input 0 to input 1 (instruction 1 byte 3)
Slice X7Y8 configured to copy input 0 to the output (r3 delayed byte 0)
Slice X7Y9 configured to copy input 0 to the output (r3 delayed byte 1)
Slice X7Y10 configured to copy input 0 to the output (r3 delayed byte 2)
Slice X7Y11 configured to copy input 0 to the output (r3 delayed byte 3)
A full byte connection from X7Y0 to X7Y4 input 0 (instruction 1 byte 0)
A full byte connection from X7Y1 to X7Y5 input 0 (instruction 1 byte 1)
A full byte connection from X7Y2 to X7Y6 input 0 (instruction 1 byte 2)
A full byte connection from X7Y3 to X7Y7 input 0 (instruction 1 byte 3)
A full byte connection from X7Y8 to X7Y4 input 1 (r3 delayed byte 0)
A full byte connection from X7Y9 to X7Y5 input 1 (r3 delayed byte 1)
A full byte connection from X7Y10 to X7Y6 input 1 (r3 delayed byte 2)
A full byte connection from X7Y11 to X7Y7 input 1 (r3 delayed byte 3)
Slice X7Y4 configured to add input 0 to input 1 (instruction 2 byte 0)
Slice X7Y5 configured to add input 0 to input 1 (instruction 2 byte 1)
Slice X7Y6 configured to add input 0 to input 1 (instruction 2 byte 2)
Slice X7Y7 configured to add input 0 to input 1 (instruction 2 byte 3)

The compiler does not need to produce the upper 32 bits of the result of instruction 2 since they are known to be zero. It can just make a note of that fact and use zero whenever they are used.

A second example of the compiling of an eBPF fragment will now be described.
Instruction 1: r1 &=0xff
Instruction 2: r2 &=0xff
Instruction 3: if r1<r2 goto L1
Instruction 4: r1=r2
Label L1.

The first instruction performs a bitwise-AND of r1 with the constant 0xff and places the result in r1. A given bit in the result will be set to one if the corresponding bit was originally set to one in r1 and the corresponding bit is set to one in the constant. It will set to zero otherwise. The constant 0xff has bits 0 to 7 set and has bits 8 to 63 clear, so the result will be that bits 0 to 7 of r1 will be unchanged but bits 8 to 63 will be set to zero. This simplifies things for the compiler since the compiler understands that bits 8 to 63 are zero and does not need to produce them. The second instruction does the same thing to r2.

Instruction 3 checks whether r1 is less than r2 and jumps to label L1 if it is. This skips instruction 4. Instruction 4 simply copies the value from r2 into r1. This sequence of instruction finds the minimum value of r1 byte 0 and r2 byte 0, placing the result in r1 byte 0.

The compiler may use a technique known as "if conversion" to turn the conditional jump into a select instruction:
Instruction 1: r1 &=0xff
Instruction 2: r2 &=0xff
Instruction 5: c1=(r1<r2)
Instruction 6: r1=c1?r1: r2

Instruction 5 compares r1 with r2, setting c1 to one if r1 is less than r2 and setting c1 to zero otherwise. Instruction 6 is the select instruction which copies r1 into r1 (which has no effect) if c1 is set and copies r2 to r1 otherwise. If c1 is equal to one then instruction 3 would have skipped instruction 4 which means that r1 would keep its value from instruction 1. In this case, the select instruction also keeps r1 unchanged. If c1 is equal to zero then instruction 3 would not have skipped instruction 4, so r2 would be copied into r1 by instruction 4. Again, the select instruction will copy r2 into r1 so the new sequence has the same effect as the old sequence.

Instruction 6 is not a valid eBPF instruction. However, the instructions are expressed in LLVM-IR while the compiler is working on them. Instruction 6 would be a valid instruction in LLVM-IR.

These instructions now need to be assigned to atoms. Suppose the input r1 is available in slices X0Y0 to X0Y7 and r2 is available in slices X0Y8 to X0Y15. Instructions 1 and 2 cause the compiler to make a note that the top 7 bytes of r1 and r2 are set to zero.

The compiler might then choose to calculate the result of instruction 5 in slice X1Y0. A full-byte connection is required from the output of slice X0Y0 to input 0 of slice X1Y0 and a full-byte connection from the output of slice X0Y8 to input 1 of slice X1Y0. The way to compare two values is to subtract one from the other and see if the calculation overflows by trying to borrow from the next bit up. The result of this comparison then gets stored in flip-flop 7 of slice X1Y1.

Like the first example, r1 and r2 will need to be delayed by a cycle to present the values at the right time to instruction 6. The compiler might use slices X1Y1 and X1Y2 for r1 and r2 respectively.

The select instruction needs three inputs: c1, r1 and r2. Note that r1 and r2 are one byte wide, but c1 is only one bit wide. Suppose the compile calculates the result of the select instruction slice X2Y0. The selection is performed on a bit by bit basis with each LUT in slice X2Y0 handling one bit:
If c1 is set then bit 0 of the result is r1 bit 0 and r2 bit 0 otherwise.
If c1 is set then bit 1 of the result is r1 bit 1 and r2 bit 1 otherwise.
. . . and so on until
If c1 is set then bit 7 of the result is r1 bit 7 and r2 bit 7 otherwise.

Each LUT may need access to the corresponding bit from r1 and the corresponding bit from r2, but all of the LUTs need access to c1. This means that c1 needs to be replicated across the bits of input 0 of the slice. So the connections for the inputs of instruction 6 would be:
Replicate bit 7 of the output of slice X1Y0 to input 0 of slice X2Y0.
A full byte connection from the output of slice X1Y1 to input 1 of slice X2Y0.
A full byte connection from the output of slice X1Y2 to input 2 of slice X2Y0.

Another issue which needs to be addressed relates to the shift instructions. Consider the following example:

A 16-bit shift left by 5 bits needs to:
Set output bit 0 to zero
Set output bit 1 to zero
Set output bit 2 to zero
Set output bit 3 to zero
Set output bit 4 to zero
Copy input bit 0 to output bit 5
Copy input bit 1 to output bit 6
. . .
Copy input bit 10 to output bit 15

Note that the inputs and outputs here are of the connection. The input of the connection is from the output of the first slice. The output of the connection goes to the input of the second slice.

It may not be possible to make this kind of connection within a slice but rather by the interconnections between the slices. The compiler can assume that the 16-bit input value has been produced by two adjacent slices in the same column since the compiler can make sure the values are produced there.

As an example, suppose the input is produced by slices X0Y4 and X0Y5 and that the output is going to slices X1Y4 and X1Y5. In that case, the following connections are required:
Slice X1Y4 bit 0 is known to be zero so is not needed
Slice X1Y4 bit 1 is known to be zero so is not needed
Slice X1Y4 bit 2 is known to be zero so is not needed
Slice X1Y4 bit 3 is known to be zero so is not needed
Slice X1Y4 bit 4 is known to be zero so is not needed
Slice X1Y4 bit 5 is from slice X0Y4 bit 0
Slice X1Y4 bit 6 is from slice X0Y4 bit 1
Slice X1Y4 bit 7 is from slice X0Y4 bit 2
Slice X1Y5 bit 0 is from slice X0Y4 bit 3
Slice X1Y5 bit 1 is from slice X0Y4 bit 4
Slice X1Y5 bit 2 is from slice X0Y4 bit 5
Slice X1Y5 bit 3 is from slice X0Y4 bit 6
Slice X1Y5 bit 4 is from slice X0Y4 bit 7
Slice X1Y5 bit 5 is from slice X0Y5 bit 0
Slice X1Y5 bit 6 is from slice X0Y5 bit 1
Slice X1Y5 bit 7 is from slice X0Y5 bit 2

The 8 connections to the inputs of slice X1Y5 can be regarded as a shifted connection or shifted route. The same structure can be used for slice X1Y4, but with inputs from X1Y3 and X1Y4 since bits 5-7 are matched and the slice can ignore bits 0-4 so it does not matter what input is presented there.

There may be a need to be able to shift by any amount between 1 and 7 bits. A connection shifting by 0 bits or 8 bits is just the same as a full byte connection since each bit connects to the corresponding bit of another slice in that case.

Shifting by a variable amount may be done in two or three stages, depending on the width of the value being shifted. The stages are:
Stage 1: Shift by 0, 1, 2 or 3.
Stage 2: Shift by 0, 4, 8 or 12.
Stage 3: Shift by 0, 16, 32 or 48 (32-bit or 64-bit only).

As another example, suppose there is an arithmetic shift right of a byte by a variable amount, the value to be shifted is produced by slice X3Y2 and the shift amount is produced by X3Y3.

The arithmetic shift right requires an "arithmetic shift right" type of connection. This type of connection takes the outputs of one slice and connects them to the inputs of another slice, but shifts them right by a constant amount in the process, replicating the sign bit as necessary.

For example, an "arithmetic shift right by 3" connection would have:
Output bit 0 is from input bit 3
Output bit 1 is from input bit 4
Output bit 2 is from input bit 5
Output bit 3 is from input bit 6
Output bit 4 is from input bit 7
Output bit 5 is from input bit 7 (the sign bit)
Output bit 6 is from input bit 7 (the sign bit)
Output bit 7 is from input bit 7 (the sign bit)

Stage 1 might be calculated in slice X4Y2, in which case it would need the following connections:
Full byte from slice X3Y2 to slice X4Y2 input 0
Arithmetic shift right by 1 from slice X3Y2 to slice X4Y2 input 1
Arithmetic shift right by 2 from slice X3Y2 to slice X4Y2 input 2
Arithmetic shift right by 3 from slice X3Y2 to slice X4Y2 input 3
Replicate slice X3Y3 bit 0 to slice X4Y2 input 4
Replicate slice X3Y3 bit 1 to slice X4Y2 input 5

Slice X4Y2 would then be configured to select one of the first four inputs based on input 4 and input 5 as follows:
Input 4 is 0 and input 5 is 0: select input 0
Input 4 is 1 and input 5 is 0: select input 1
Input 4 is 0 and input 5 is 1: select input 2
Input 4 is 1 and input 5 is 1: select input 3

The shift amount may be copied from slice X3Y3 to slice X4Y3 to provide a delayed version.

Stage 2 might be calculated in slice X5Y2, in which case it would need the following connections:
Full byte from slice X4Y2 to slice X5Y2 input 0
Arithmetic shift right by 4 from slice X4Y2 to slice X5Y2 input 1
Replicate slice X4Y3 bit 2 to slice X5Y2 input 2

Slice X5Y2 would then be configured to select input 0 or input 1 based on input 2 as follows:
Input 2 is 0: select input 0
Input 2 is 1: select input 1

The output of slice X5Y2 will be the result of the variable arithmetic shift right operation.

A bit file for a given atom may be as follows:
Identity information of the atom
List of other atoms from which the given atom is able to receive an input and the available routes for that input.
List of other atoms which the given atom is able to provide an output and the available routes for that output It should be appreciated that since the FPGA is a regular structure, there may be a common template which can be used for a plurality of atoms with modifications for individual ones of the atoms where necessary.

By way of example, the bit file description for slice X7Y1 may specify the following possible inputs and outputs:
Input from X6Y1 via route A or route B
Input from X6Y5 via route C or route D
Input from X7Y0 via route E or route F
Output to X8Y1 via route G or route H
Output to X7Y2 via route I or route J
Output to X7Y5 via route K or route L.

The compiler would use this bit file description to provide the partial bit file for the inputs and outputs of the slice X7Y1 for the previously describe first eBPF example of
Input from X6Y1 via route A
Input from X6Y5 via route C
Output to X7Y5 via route K or route L.

By way of example, a bit file description for slice XnYm may specify the following possible inputs and outputs:

Input from Xn-1Ym via route A or route B
Input from Xn-1Ym+4 via route C or route D
Input from XnYm-1 via route E or route F
Output to Xn+1Ym via route G or route H
Output to XnYm+1 via route I or route J
Output to XnYm+4 via route K or route L.

This bit file description maybe modified to remove one or more routes which are not available for the compiler to use, such as previously described. This may because the route is used by another atom or is used for routing across the partition.

It should be appreciated that the compiler may be implemented by a computer program comprising computer executable instructions which may be executed by one or more computer processors. The compiler may run on hardware such as at least one processor operating in conjunction with one or more memories.

It is noted that while the above describes example embodiments, there are several variations and modifications which may be made to the disclosed solution without departing from the scope of the present invention.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto.

The embodiments may be implemented by computer software stored in a memory and executable by at least one data processor of the involved entities or by hardware, or by a combination of software and hardware.

The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory.

The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

What is claimed is:

1. A method performed in a device comprising a programmable logic device, the method comprising:
receiving, at a compiler, a bit file description and a program, the bit file description comprising a description of a plurality of available routes between a plurality of processing units of a part of the programmable logic device, wherein:
the bit file description comprises, for at least one of the plurality of processing units, one or more of the plurality of processing units to which the at least one processing unit can output data or one or more of the plurality of processing units from which the at least one processing unit can receive data;
each of at least some of the plurality of available routes comprises a route between at least two of the plurality of processing units; and
the compiler can select from the plurality of available routes to interconnect two or more of the plurality of processing units, wherein each of the plurality of processing units is configured to perform a respective operation; and
compiling, at the compiler, the program at least in part by selecting one or more of the plurality of available routes of the bit file description to output an output bit file for the program, the output bit file describing interconnection of a first set of at least some processing units of the plurality of processing units of the part of the programmable logic device using the one or more routes selected by the compiler, wherein:
the output bit file comprises information indicating, for a respective one of the first set of the at least some processing units, one or more processing units from which an input is to be provided to the respective processing unit or one or more processing units to which an output is to be provided from the respective processing unit; and
the interconnection of the first set of the at least some processing units provides a first data processing pipeline for processing one or more data packets with the programmable logic device when the output bit file is used to configure the programmable logic device.

2. The method as claimed in claim 1, further comprising configuring the programmable logic device using the output bit file to configure the part of the programmable logic device to perform a function associated with the program.

3. The method as claimed in claim 1, wherein each of the plurality of available routes is usable by the compiler when compiling the program to provide the output bit file for the program.

4. The method as claimed in claim 1, wherein the programmable logic device comprises a field programmable gate array (FPGA).

5. The method as claimed in claim 4, wherein the compiler and the FPGA are provided in a network interface device.

6. The method as claimed in claim 1, wherein the programmable logic device comprises a portion of a field programmable gate array (FPGA) which is dynamically programmable.

7. The method as claimed in claim 1, wherein the program comprises one of an extended Berkeley Packet Filter (eBPF) program and a P4 program.

8. The method of claim 1, wherein the respective operation comprises an atomic operation.

9. The method of claim 1, wherein each of the plurality of processing units is configured to perform a respective operation in a single clock cycle.

10. The method of claim 1, wherein the each of the plurality of processing units comprises a slice of a field programmable gate array (FPGA).

11. The method of claim 1, wherein each of the plurality of processing units comprises a digital circuit configured to perform the respective operation of the processing unit.

12. An apparatus comprising:
a programmable logic device;
at least one processor; and
at least one memory including computer code for one or more programs that, when executed by the at least one processor, causes the at least one processor to:
receive a bit file description and a program, the bit file description comprising a description of a plurality of available routes between a plurality of processing units of a part of the programmable logic device, wherein:
the bit file description comprises, for at least one of the plurality of processing units, one or more processing units to which the at least one processing unit can output data or one or more processing units from which the at least one processing unit can receive data;
each of at least some of the plurality of available routes comprises a route between at least two of the plurality of processing units; and
the compiler can select from the plurality of available routes to interconnect two or more of the at least some processing units, wherein each of the plurality of processing units is configured to perform a respective operation; and
compile the program at least in part by selecting one or more of the plurality of available routes of the bit file description to output an output bit file for the program, the output bit file describing an interconnection of a first set of at least some processing units of the plurality of processing units of the part of the programmable logic device using the one or more routes selected by the compiler, wherein:
the output bit file comprises information indicating, for a respective one of the first set of the at least some processing units, one or more processing units from which an input is to be provided to the respective processing unit or one or more processing units to which an output is to be provided from the respective processing unit; and
the interconnection of the first set of the at least some processing units provides a first data processing pipeline for processing one or more data packets with the programmable logic device when the output bit file is used to configure the programmable logic device.

13. The apparatus of claim 12, wherein the computer code further causes the at least one processor to use the output bit file to configure the part of the programmable logic device to perform a function associated with the program.

14. The apparatus of claim 12, wherein the bit file description comprises information indicating only routes which are usable by the compiler when compiling the program to provide the output bit file for the program.

15. The apparatus of claim 12, wherein the bit file description is of at least a portion of a field programmable gate array (FPGA).

16. A network interface device comprising:
a first interface, the first interface being configured to receive a plurality of data packets;
a programmable logic device comprising a plurality of processing units, each processing unit being associated with a predefined type of operation executable in a single step; and
a compiler, wherein the compiler is configured to:
receive a bit file description and a program, the bit file description comprising a description of a plurality of available routes between the plurality of processing units of the programmable logic device, wherein:
the bit file description comprises, for at least one of the plurality of processing units, one or more processing units to which the at least one processing unit can output data or one or more processing units from which the at least one processing unit can receive data;
each of at least some of the plurality of available routes comprises a route between at least two of the plurality of processing units; and
compile the program using the bit file description to output a bit file for the program, wherein:
the compiling comprises selecting one or more routes from the plurality of available routes of the bit file description to output an output bit file for the program, the output bit file describing interconnection of a first set of at least some processing units of the plurality of processing units of the programmable logic device using the one or more routes selected by the compiler;
the output bit file comprises information indicating, for a respective one of the first set of the at least some processing units, one or more processing units from which an input is to be provided to the respective processing unit or one or more processing units to which an output is to be provided from the respective processing unit; and
the interconnection of the first set of the at least some processing units provides a first data processing pipeline for processing one or more data packets with the programmable logic device when the output bit file is used to configure the programmable logic device.

17. A method comprising:
determining routing information for at least a part of a programmable logic device comprising a plurality of processing units, wherein:
each processing unit is associated with a predefined type of operation executable in a single step;
each of at least some of the plurality of processing units is associated with a different respective predefined type of operation;
the routing information provides information as to a plurality of available routes between the plurality of processing units of the part of the programmable logic device, wherein:
the routing information comprises, for at least one of the plurality of processing units, one or more processing units to which the at least one processing unit can output data or one or more processing units from which the at least one processing unit can receive data; and
each of at least some of the plurality of available routes comprises a route between at least two of the plurality of processing units; and
the routing information can be used by a compiler to select one or more of the plurality of available routes of the routing information to output an output bit file for a program, the output bit file describing interconnection of a first set of at least some processing units of the plurality of processing units of the part of the programmable logic device using the one or more routes selected by the compiler, wherein:

the output bit file comprises information indicating, for a respective one of the first set of the at least some processing units, one or more processing units from which an input is to be provided to the respective processing unit or one or more processing units to which an output is to be provided from the respective processing unit; and the interconnection of the first set of the at least some processing units provides a first data processing pipeline for processing one or more data packets with the programmable logic device when the output bit file is used to configure the programmable logic device that can be used to interconnect at least some of the plurality of processing units.

18. A non-transitory computer readable medium comprising program instructions for:

determining routing information for at least a part of a programmable logic device comprising a plurality of processing units, wherein:

each processing unit is associated with a predefined type of operation executable in a single step;

each of the plurality of processing units is associated with a different respective predefined type of operation; and the routing information provides information as to available routes between the plurality of processing units of the part of the programmable logic device, wherein:

the routing information comprises, for at least one of the plurality of processing units, one or more processing units to which the at least one processing unit can output data or one or more processing units from which the at least one processing unit can receive data; and each of at least some of the plurality of available routes comprises a route between at least two of the plurality of processing units; and the routing information can be used by a compiler to select one or more of the plurality of available routes of the routing information to output an output bit file for a program, the output bit file describing interconnection of a first set of at least some processing units of the plurality of processing units of the part of the programmable logic device using the one or more routes selected by the compiler, wherein:

the output bit file comprises information indicating, for a respective one of the first set of the at least some processing units, one or more processing units from which an input is to be provided to the respective processing unit or one or more processing units to which an output is to be provided from the respective processing unit; and the interconnection of the first set of the at least some processing units provides a first data processing pipeline for processing one or more data packets with the programmable logic device when the output bit file is used to configure the programmable logic device.

\* \* \* \* \*